US005943996A

United States Patent [19]

Sogawa et al.

[11] Patent Number: 5,943,996

[45] Date of Patent: Aug. 31, 1999

[54] DIRECT INJECTION SYSTEM FOR ENGINES

[75] Inventors: Masafumi Sogawa; Masahiko Kato, both of Hamamatsu, Japan

[73] Assignee: Sanshin Kogyo Kabushiki Kaisha, Hamamatsu, Japan

[21] Appl. No.: 09/124,309

[22] Filed: Jul. 29, 1998

[30] Foreign Application Priority Data

| | | | |
|---|---|---|---|
| Jul. 29, 1997 | [JP] | Japan | 9-203657 |
| Aug. 8, 1997 | [JP] | Japan | 9-227401 |

[51] Int. Cl.[6] .............................. F02M 39/00; F02F 7/00

[52] U.S. Cl. ........................................ 123/509; 123/195 P

[58] Field of Search ................................ 123/509, 195 P, 123/73 AD, 495, 198 R; 440/88, 85

[56] References Cited

U.S. PATENT DOCUMENTS

| | | | |
|---|---|---|---|
| 4,811,717 | 3/1989 | Nakahama | 123/509 |
| 4,846,124 | 7/1989 | Suzuki | 123/195 P |
| 4,909,226 | 3/1990 | Nakahama | 123/509 |
| 5,421,298 | 6/1995 | Ming | 123/195 P |
| 5,425,336 | 6/1995 | Nakayama | 123/195 P |
| 5,617,821 | 4/1997 | Tsunoda | 123/195 P |
| 5,722,360 | 3/1998 | Tsunoda | 123/195 P |

FOREIGN PATENT DOCUMENTS

| | | | |
|---|---|---|---|
| 0029766 | 2/1984 | Japan | 123/509 |

*Primary Examiner*—Carl S. Miller

*Attorney, Agent, or Firm*—Knobbe, Martens, Olson & Bear LLP

[57] ABSTRACT

A number of embodiments of direct injected V-type outboard motors. In each embodiment, a high pressure pump is driven off of the upper end of the crankshaft and is disposed at a high level in the protective cowling. The drive for the high pressure pump is disposed in the path of air flow from an opening in the protective cowling to the engine induction system. On the other hand, the high pressure pump is out of this air flow to avoid corrosion. Various alternative locations for the components of the engine including specifically the high pressure pump, an alternator, a fuel vapor separator, an ECU control unit and a fuel injector solenoid driver are disclosed.

37 Claims, 74 Drawing Sheets

DIRECT INJECTION SYSTEM FOR ENGINES

BACKGROUND OF THE INVENTION

This invention relates to a direct injection system for engines and more particularly to an improved outboard motor incorporating a direct injection system.

As is well known, in all fields of engine design there is an increasing emphasis on obtaining more effective emission control, better fuel economy and, at the same time, continued high or higher power output. This trend has resulted in the substitution of fuel injection systems for carburetors as the engine charge former. In order to obtain still further improvements, direct fuel injection systems are being considered. These systems inject fuel directly into the combustion chamber and thus have significant potential advantages.

In many applications, the incorporation of direct injection is relatively straightforward. However, in connection with outboard motors, the very compact nature of the outboard motor renders this further sophistication in engine design difficult to obtain. The problems in connection with direct fuel injection systems for outboard motors is related primarily to the space that is available and the fact that the confinement of the engine within the protective cowling can give rise to heat problems.

These problems arise, in part, because of the number of components required for fuel injection and the very nature of some of these components. For example, with manifold injection systems for outboard motors, it has been the practice to provide a fuel injection system that includes at last the following components:

a low pressure fuel pump, a high pressure fuel pump, a pressure regulator, a vapor separator; and a fuel rail for delivering the fuel to the injectors.

The use of a vapor separator is required primarily because of the confined space and the fact that fuel vapors or air in the fuel, conditions primarily resulting from heat, can cause erratic injection and poor performance.

For the same reasons, it has also been the practice to position the high pressure fuel pump in the vapor separator so as to permit it being cooled and to minimize the amount of heat that is generated in the system and to remove the heat from the fuel that is delivered to the injectors. This also saves space. However, this necessitates the use of an electrically operated fuel pump. Such pumps have has limited capacity in the pressure which they can generate.

With direct injection systems, however, the fuel must be injected directly into the combustion chamber. This means that the pressure into which the fuel is injected is higher than with manifold injection systems wherein the pressure is at substantially atmospheric or even below. Electric pumps are not totally capable of supplying such high pressures.

Therefore, in order to employ direct injection systems, it is necessary to mount the components in different locations and also to provide an arrangement wherein the high pressure pump may be driven off of the engine so as to achieve higher pressure as opposed to manifold injected engines.

It is, therefore, a principle object of this invention to provide an improved direct injection system and component layout therefore that can be utilized with outboard motors.

Another problem that somewhat complicates the positioning of components in outboard motors is the fact that the engine normally rotates with its crankshaft about a vertical axis rather than a horizontal axis in most other applications. This provides unique spatial problems, particularly when accessories are driven off of the engine crankshaft.

It is, therefore, a still further object of this invention to provide an improved fuel pump drive system and component layout for a direct injected outboard motor.

In conjunction with outboard motors as in many other applications, there is a demand for higher outputs. This results in the use of multiple cylinder engines. However, again because of the compact nature of outboard motors, if four or more cylinders are utilized, they are frequently positioned in a V arrangement. This further limits the space available for the mounting of components.

It is, therefore, a still further object of this invention to provide an improved, direct injected, V-type multi-cylinder outboard motor engine arrangement.

As is well known in this art, the air inducted into the engine may include fairly large amounts of water vapor. This may include salt water if operating in marine environments. Although the inlet devices are designed to remove the water, there is still a high water vapor content in the inducted air. This may be detrimental to precision, high pressure pumps.

It is, therefore, a still further object of this invention to provide an improved high pressure fuel pump layout for a direct injected outboard motor where the pump is protected from water vapor.

Although the pump should be protected, its drive should be cooled. It is, therefore, a still further object of this invention to provide an improved fuel pump drive system for a direct injected outboard motor where the drive is cooled by incoming air but the pump is protected from it.

SUMMARY OF THE INVENTION

The features of this invention are adapted to be embodied in an outboard motor that is comprised of a power head consisting of a multi-cylinder internal combustion engine and a surrounding protective cowling. The engine is mounted within the protective cowling so that its crankshaft rotates about a vertically-extending axis. This facilitates coupling of the crankshaft to a drive shaft that depends into a drive shaft housing and lower unit for driving a propulsion device contained within the lower unit. The engine is formed with a number of combustion chambers and a plurality of fuel injectors are employed, each of which injects fuel directly into a respective one of the combustion chambers. A high pressure fuel pump is contained within the protective cowling and is driven from the engine crankshaft for delivering high pressure fuel to the fuel injectors through a fuel supply system.

In accordance with a first feature of the invention, the high pressure fuel pump is driven off the upper end of the crankshaft and is disposed at the upper end of the engine.

In accordance with another feature of the invention, the protective cowling is provided with an air inlet for admitting atmospheric air for ingestion into the engine for its combustion. A fuel pump is positioned out of the path of the air flow path through the protective cowling air inlet and to the engine induction system while the pump drive is positioned to be cooled by the air flow.

DETAILED DESCRIPTION OF THE PREFERRED EMBODIMENTS

Figure 1:
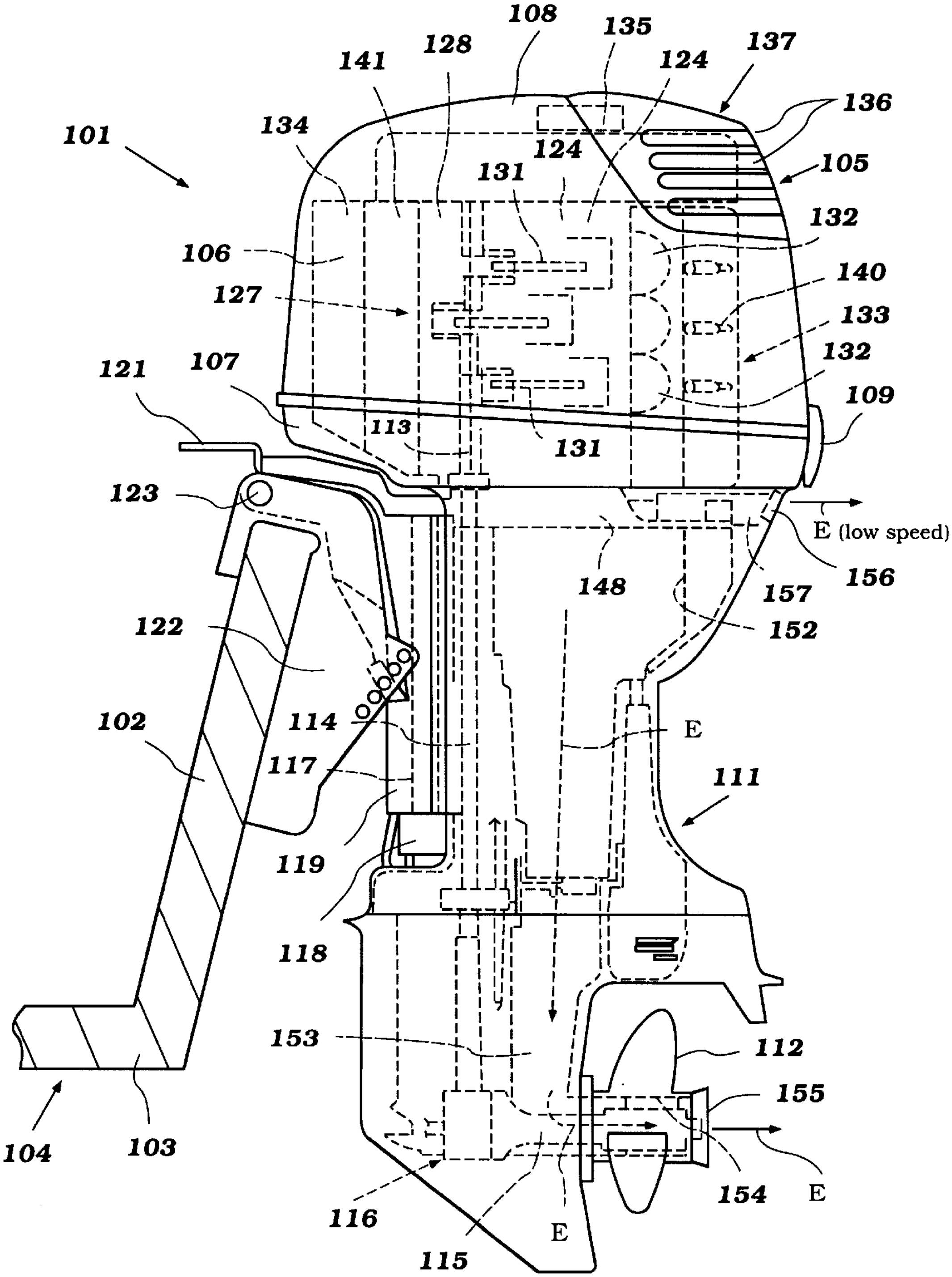
FIG. 1 is a side elevational view of an outboard motor constructed in accordance with a first embodiment of the invention depicted as being attached to the transom of an associated watercraft, which is shown partially and in cross-section. This side elevational view also maybe considered to be typical for that of all embodiments of the invention which will be described later.
Figure 2:
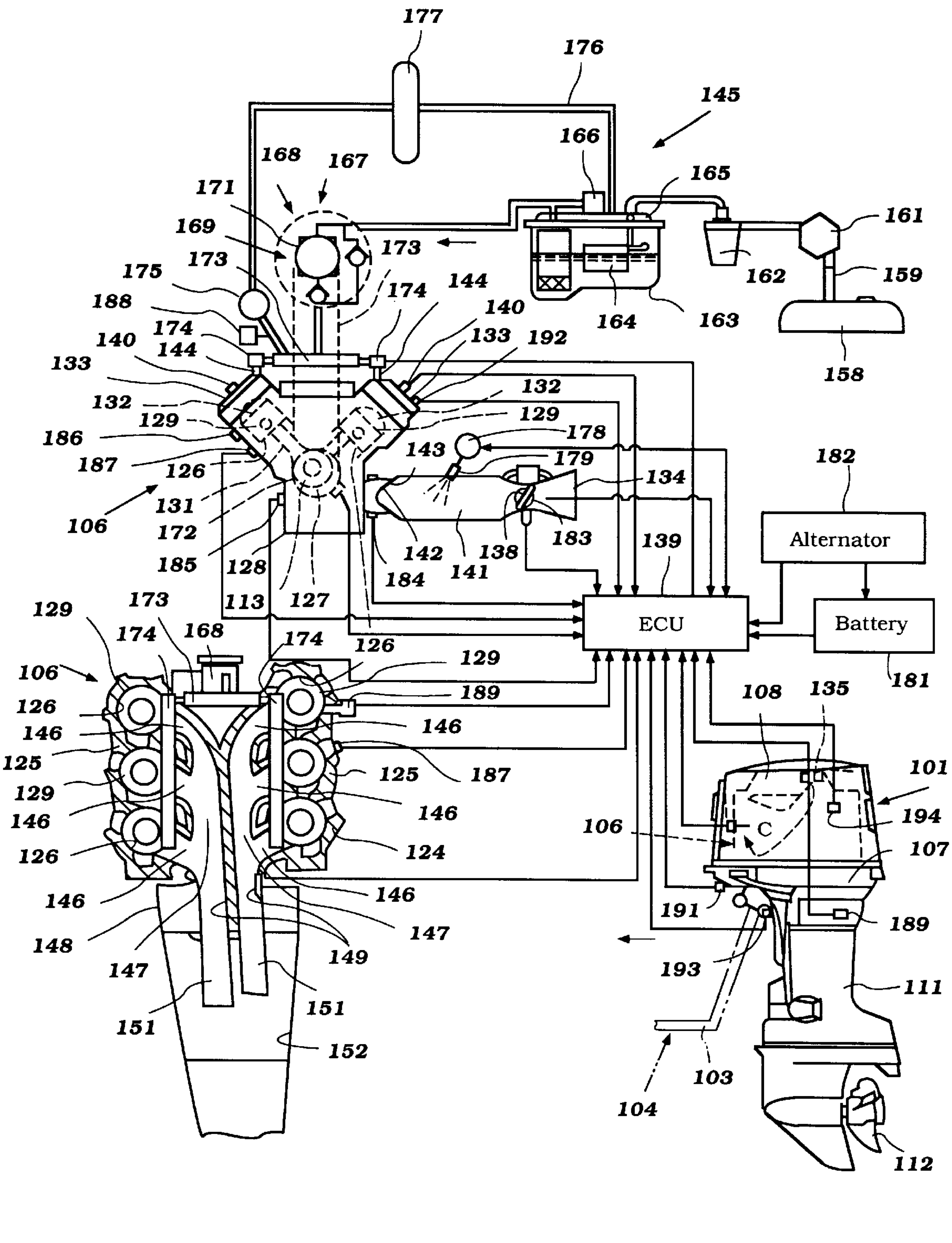
FIG. 2 is a multi-part view showing: in the lower left-hand portion, the outboard motor of FIG. 1 on a reduced scale: in the lower left-hand portion, a rear elevational view of the outboard motor with portions removed so as to more clearly show the construction of the engine: and in the upper view, a top plan view of the engine of the outboard motor with its induction and fuel injection system shown in part schematically. The ECU for the motor links the three views together.

General Construction and Embodiment of FIGS. 1 and 2

Referring now in detail to the drawings and initially to FIGS. 1 and 2, an outboard motor having a general construction that is typical of all of the embodiments is illustrated generally by the reference numeral 101 and is shown attached to the transom 102 of a hull 103 of a watercraft, indicated generally by the reference numeral 104.

The outboard motor 101 is comprised of a power head, indicated generally by the reference numeral 105, which is comprised of a powering internal combustion engine, indicated generally at 106, and a surrounding protective cowling that is comprised of a lower tray portion 107 and an upper, main cowling portion 108. The main cowling portion 108 is detachably connected to the tray portion 107 in a suitable manner, including a latch mechanism 109.

A drive shaft housing and lower unit 111 depends from the power head 105 and carries a propulsion device in the form of a propeller 112 for propelling the associated watercraft 104.

As is typical with outboard motor practice, the engine 106 is supported in the power head 105 so that its crankshaft 113 rotates about a vertically disposed axis. This facilitates connection to a drive shaft 114 that is journaled in the drive shaft housing and lower unit 111 in an appropriate manner. The drive shaft 114 drives a propeller shaft 115 to which the propeller 112 is affixed through a conventional, forward, neutral, reverse transmission, shown schematically at 116.

A steering shaft 117 is affixed to the drive shaft housing 111 by means that include a lower bracket 118. This steering shaft 117 is journaled in a swivel bracket 119 for steering of the outboard motor 101 and the associated watercraft 104 in a known manner. A tiller 121 is affixed to the upper end of the steering shaft 117 so as to control this steering movement.

The swivel bracket 119 is connected to a clamping bracket 122 by means of a pivot pin 123 for tilt and trim movement of the outboard motor 101 in a well known manner. The clamping bracket 122 has a suitable means to provide a detachable connection to the watercraft transom 102.

Referring now in more detail specifically to FIG. 2, the internal combustion engine 106 and certain of its auxiliaries will now be described in more detail. The engine 106 is depicted as being of the V6 type and operates on a two-stroke crankcase compression principle. This specific engine configuration is to be considered as to being typical of those types of engine configurations with which the invention has particular utility. It will be readily apparent, however, to those skilled in the art how the invention may be practiced in conjunction with a wide variety of types of engines and engine configurations. The invention does, however, have particular utility with V-type engines because of their demanding spatial requirements for the various components associated therewith.

The engine 106 is comprised of a cylinder block 124 having a pair of cylinder banks 125 each of which forms three cylinder bores 126. The cylinder bores 126 associated with each cylinder bank 125 are disposed so that their axis lie in vertically spaced, horizontally extending relationship. The angle between the cylinder banks 125 of the cylinder block 124 may be of any appropriate dimension. A longitudinal center plane L (shown in later figures) of the outboard motor 101 bisects the valley between the cylinder banks 125.

The engine crankshaft 113 is rotatably journaled within a crankcase chamber 127 that is formed by the cylinder block 124 and a crankcase member 128 that is detachably affixed to it. As is typical with two-cycle engine practice, the portions of the crankcase chamber 127 associated with each of the cylinder bores 126 are sealed relative to each other in any suitable manner.

Pistons 129 are supported for reciprocation in each of the cylinder bores 126. These pistons 129 are connected by means of connecting rods 131 to the throws of the crankshaft 113 in a manner well known in this art.

An induction system is provided for supplying an air charge to the sections of the crankcase chamber 127 for combustion in respective combustion chambers 132 formed by the cylinder bores 126, the pistons 129 and cylinder head assemblies, indicated generally by the reference numeral 133 that are affixed to the cylinder banks 125 in a suitable manner.

This induction system includes an intake air silencer which is shown partially in phantom in FIG. 1 and is identified generally by the reference numeral 134. This intake air silencer draws air from within the protective cowling through a pair of transversely spaced air inlet openings 135 formed in the rearward area of the main cowling member 108. Air is delivered to these inlet openings 135 through rearwardly facing air inlet slots 136 formed in a cover plate 137 that is detachably connected to the cover main cowling member 108 in a suitable fashion.

Referring now primarily to FIG. 2, where the air inlet device and silencer 134 is shown schematically, it delivers the intake air to throttle bodies in which throttle valves 138 are supported. These throttle valves 138 are operated by a linkage system that will be described when referring to subsequent embodiments.

The throttle valves 138 control the flow of air through intake manifold runners 141 that are connected to intake ports 142 formed in the crankcase member 128 and which communicate with the individual sections of the crankcase chamber 127. Reed-type check valves 143 are provided in these intake ports 142 so as to permit an air charge to flow into the sections of the crankcase chamber 127 when the pistons 129 are moving upwardly in the cylinder bores 126. As the pistons move downwardly to compress the charge in these chambers, however, the check valves 143 will close so that the intake charge can be compressed.

The compressed intake charge is then transferred through scavenge passages (not shown) to the combustion chambers 132.

At an appropriate time during the intake cycle, fuel is injected directly into the combustion chambers 132 by means of fuel injectors 144 that are mounted in the cylinder head assemblies 133. Fuel is supplied to these fuel injectors 144 through a fuel supply system, which will be described in due course and which is shown in part schematically in FIG. 2 wherein this fuel supply system is indicated generally by the reference numeral 145.

A combustible mixture is then formed in the combustion chambers 132. This is fired by means of spark plugs 140 which are also mounted in the cylinder head assembly 133. The timing of injection and duration of the fuel injection by the injectors 144 and the timing of firing of the spark plugs 140 is also controlled by the ECU 139 in a manner which will be described.

The charge ignited by the spark plugs 145 will burn and expand so as to drive the pistons 129 downwardly to effect rotation of the crankshaft 113 in a known manner. At a time determined by the positioning of exhaust port (not shown), the exhaust gases will be discharged through exhaust manifold passage runners 146 formed integrally in the banks 125 of the cylinder block 124. These exhaust passages 146 communicate with exhaust manifolds 147 that also are formed integrally in the cylinder block 124.

The engine 106 is supported upon an exhaust guide plate 148 that has exhaust passages 149 formed in it which communicate with a pair of exhaust pipes 151 that depend downwardly into an expansion chamber 152 formed within the drive shaft housing 111. This expansion chamber 152 communicates, as best seen in FIG. 1, with a further chamber 153 formed in the lower unit portion of the drive shaft housing, lower unit 111. From there, the exhaust gases may pass through passages 154 formed in a hub 155 of the propeller 112 for discharge to the atmosphere through this underwater high speed exhaust gas discharge. The flow of the exhaust gases is indicated but the arrows E in FIG. 1.

As is also well known in the outboard motor art, under low speeds the through the hub exhaust discharges 154 are relatively deeply submerged. Also, at this time, the exhaust pressure will be quite low. Thus, there is also provided for relieving the exhaust gases under this condition an above-the-water, low speed exhaust gas discharge 156. This discharge 156 may be formed in an upper portion of the drive shaft housing lower unit 111. Exhaust gases are delivered to this discharge 156 from the expansion chamber 152 through a low speed exhaust gas discharge path 157 which may include suitable silencing means for silencing the exhaust gases and precluding the flow of large volumes of exhaust gases through this path when the engine is operating at higher speeds.

The fuel supply system 145 for supplying fuel to the injectors 144 will now be described by primary reference to FIG. 2. As is typical with outboard motor practice, a main fuel storage tank 158 is positioned within the hull 103 of the watercraft 104 at an appropriate location. A conduit 159, which preferably includes a quick disconnect coupling (not shown) connects the fuel tank 158 with one or more low pressure fuel pumps 161 that are mounted in the power head 105. These low pressure fuel pumps 161 may be driven, for example, by means of pressure variations in the sections of the crankcase chamber 127.

The fuel is passed from the pumps 161 through a fuel filter 162 to a vapor separator 163. Various preferred locations for the vapor separator 163 will be described by reference to later figures. The vapor separator 163 has an internal reservoir in which fuel is maintained at a predetermined level by means of a float 164 that operates a needle valve 165 to control the admission of fuel to the vapor separator 163 from the low pressure pumps 161. Fuel is then delivered through a low pressure regulator 166 to a high pressure fuel system, indicated generally by the reference numeral 167. This high pressure system 167 includes a high pressure pump 168 which is driven and located in manners which will also be described by particular reference to the remaining figures.

The high pressure fuel pump 168 is driven by a drive assembly, indicated schematically at 169 and which includes a drive pulley 171 fixed to a drive shaft of the high pressure pump 168. This pulley 171 is driven by a crankshaft pulley 172 that is affixed to an upper end of the crankshaft 113 as will be described. A belt 170 which may be a toothed type interconnects the pulleys 171 and 172 for driving the high pressure pump 168.

The high pressure pump delivers fuel to a main fuel manifold 173 which is mounted at a relatively high position with respect to the engine 106 and which, in turn, delivers the fuel to a pair of fuel rails 174 each of which is associated with the injectors 144 of a respective one of the cylinder banks 125.

A high pressure regulator 175 is provided in the main fuel manifold 173 and controls the pressure in the fuel rails 174 by dumping fuel back to the vapor separator 163 through a return line 176. A heat exchanger 177 is provided in this return line 176 for cooling the fuel and thus further assisting in ensuring that vapor will not be present in the fuel that is delivered to the injectors 144. The heat exchanger 177 may receive cooling water that is delivered to the engine 106 for its cooling so as to assist in dissipation of heat from the fuel to achieve these goals.

The engine 106 may also be provided with a suitable lubrication system such as one embodying one or more lubricant pumps 178 located and drive by a manner to be described in the various embodiments. These pumps spray oil via nozzles 179 into the intake manifold runners 141 for lubrication of the engine in a manner known in two-cycle art. The ECU 139 controls these oil pumps 178 in addition to the fuel injectors 144 and spark plugs 140 by means of a suitable strategy that employs certain sensors now to be described.

The ECU 139 receives electrical power from a battery 181 that is appropriately positioned within the watercraft hull 103 and/or an alternator 182 that is driven by the engine crankshaft 113 in manner to be described. The alternator 182 also supplies a charge to maintain the charge of the battery 181 in a known manner. The subsequent embodiments will describe various possible alternative locations for the alternator 182, ECU 139 and driving arrangements for the alternator 182.

Referring now specifically to the control strategy, as has been noted various sensors are provided for sensing various engine and ambient conditions so as to determine the strategy for controlling the amount and timing of fuel injection by the injectors 144 and timing of firing the spark plugs 140. The following description is only by way of reference to enable those skilled in the art to understand how various control strategies using various control inputs may be employed.

Operator demand is sensed by means of a throttle position sensor 183 that is associated with one of the throttle valves 138. Intake air temperature is sensed by an intake temperature sensor 184 that is positioned at a suitable position in the induction system, for example, in one of the intake ports 142.

Crankcase pressure in the crankcase chamber 127 is sensed by a crankcase pressure sensor 185. It has been found that the volume of intake air flow can be easily determined by measuring crankcase pressure at specific crank angles.

A crankshaft position sensor 186 is associated with the crankshaft 113 and outputs a signal indicative of crank angles and accordingly engine speed.

An in-cylinder pressure sensor 186 may be mounted in either the cylinder block 124 or cylinder head assembly 133 so as to sense the actual pressure in the combustion chambers.

Engine cylinder temperature is sensed by a temperature sensor 187 which is mounted either in the cylinder block 124 as illustrated or in the cylinder head assembly 133 and which cooperates with the engine cooling jacket to sense the running temperature of the engine.

A fuel pressure sensor 188 is associated with the pressure relief valve 175 and senses the pressure in the main fuel delivery manifold 173.

Preferably, the engine operates on a feedback control system and, accordingly, a combustion condition sensor 189 is provided in communication with the exhaust of the engine so as to sense the residual oxygen and, accordingly, determine the running air/fuel ratio.

Exhaust back pressure is measured by a pressure sensor 189 that is mounted in the drive shaft housing 111 and which senses the pressure in the expansion chamber 152 or in either one of the exhaust pipes 151 or the passages 149 in the exhaust guide 148.

A transmission condition sensor 191 is provided which is associated with the shift mechanism for the transmission 116 so as to determine the gear in which the transmission is operating or, alternatively when the transmission is in neutral.

A knock sensor 192 may be mounted in one of the cylinder head assemblies 133 for sensing vibrations in the engine and, accordingly, conditions indicating knocking or potential knocking conditions.

A trim angle sensor 193 may be associated with the trim pin 123 or swivel bracket 119 so as to sense the trim condition of the outboard motor 101.

The temperature of coolant delivered to the engine may be sensed by a coolant temperature sensor 194 which senses the temperature of cooling water before it has entered the engine cooling jackets.

Obviously, the aforenoted sensors are only typical of the types of sensors which can be utilized in order to practice the invention. Since the invention deals primarily with the mounting, drive, and location of certain components and specifically those associated with the direct injection system, further description of the control system or its strategy is not believed to be necessary to permit those skilled in the art to understand or practice the invention.

The foregoing description is generally a description of the construction of the outboard motor as will be found in each of the following embodiments. Generally, the invention deals with the fuel injection system, the mounting, drive and location for the high pressure pump 168 and the positioning of these and other control components relative to the flow of cool air from the cowling air inlets 135 to the induction system air inlet device 134 so as to avoid the generation of excess heat and to protect the pump 168 from corrosion.

Thus, except for these features, the foregoing description should be considered as a teaching to those skilled in the art as to the general environment in which the invention can be practiced. As has been noted, the invention can be utilized in conjunction with engines having varying cylinder numbers and cylinder types and operating on various operating cycles. Thus, some of the components as described may be considered to be generally conventional and where any components of the outboard motor have not been described in detail, it will be readily apparent from the foregoing description how the invention can be utilized with any types of constructions known to the user.

As has been noted, the important features are the uppermost positioning of the high pressure fuel pump 168 in the protective cowling so that it is not in the air flow path but is located so that it can be driven off of the upper end of the crankshaft 113 and its drive will be cooled by that air flow. Next will be described specific detailed embodiments showing how the various components are mounted in accordance with the invention.

Figure 3:
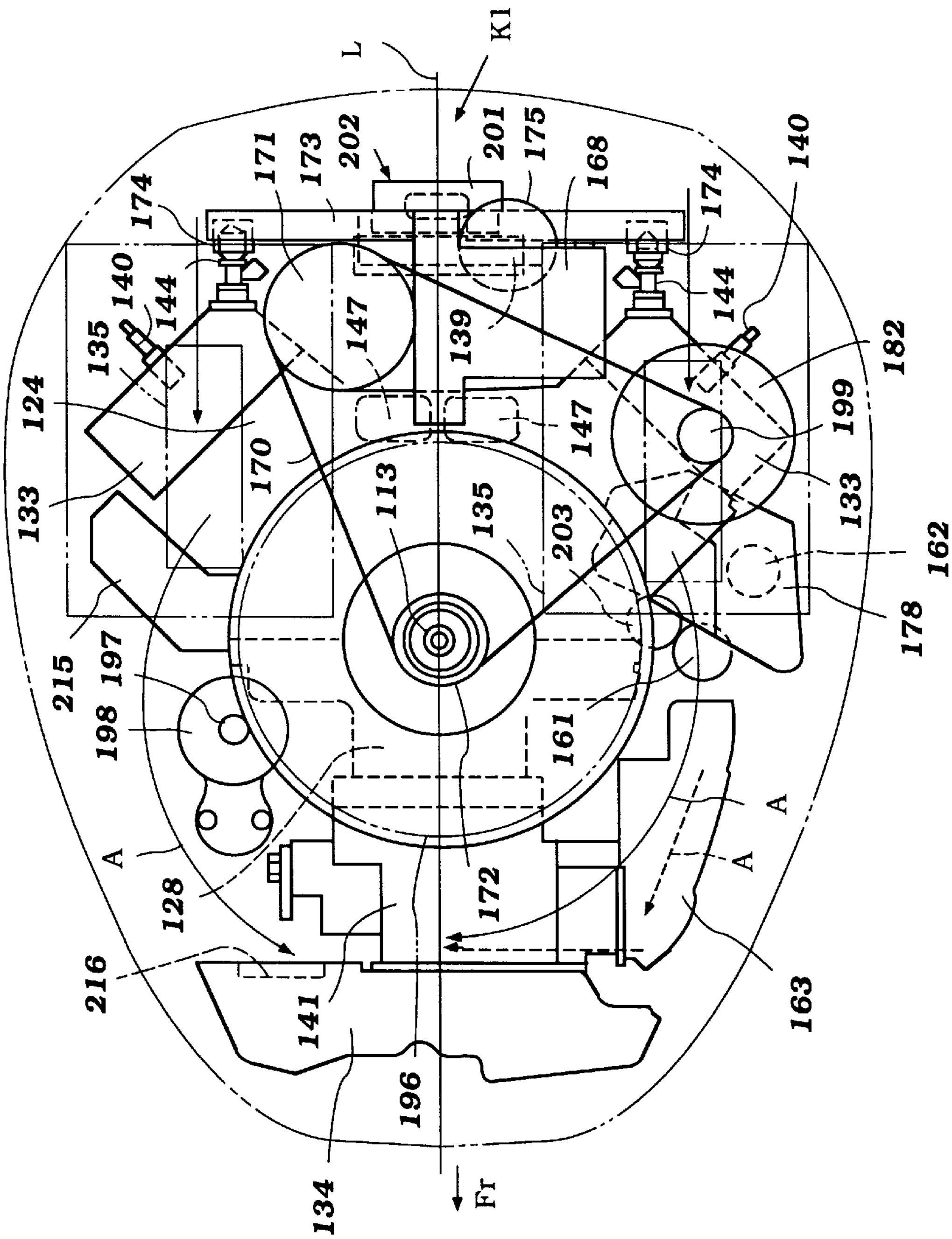
FIG. 3 is a top plan view of a second embodiment of the invention showing the power head with the protective cowling being illustrated in phantom.
Figure 4:
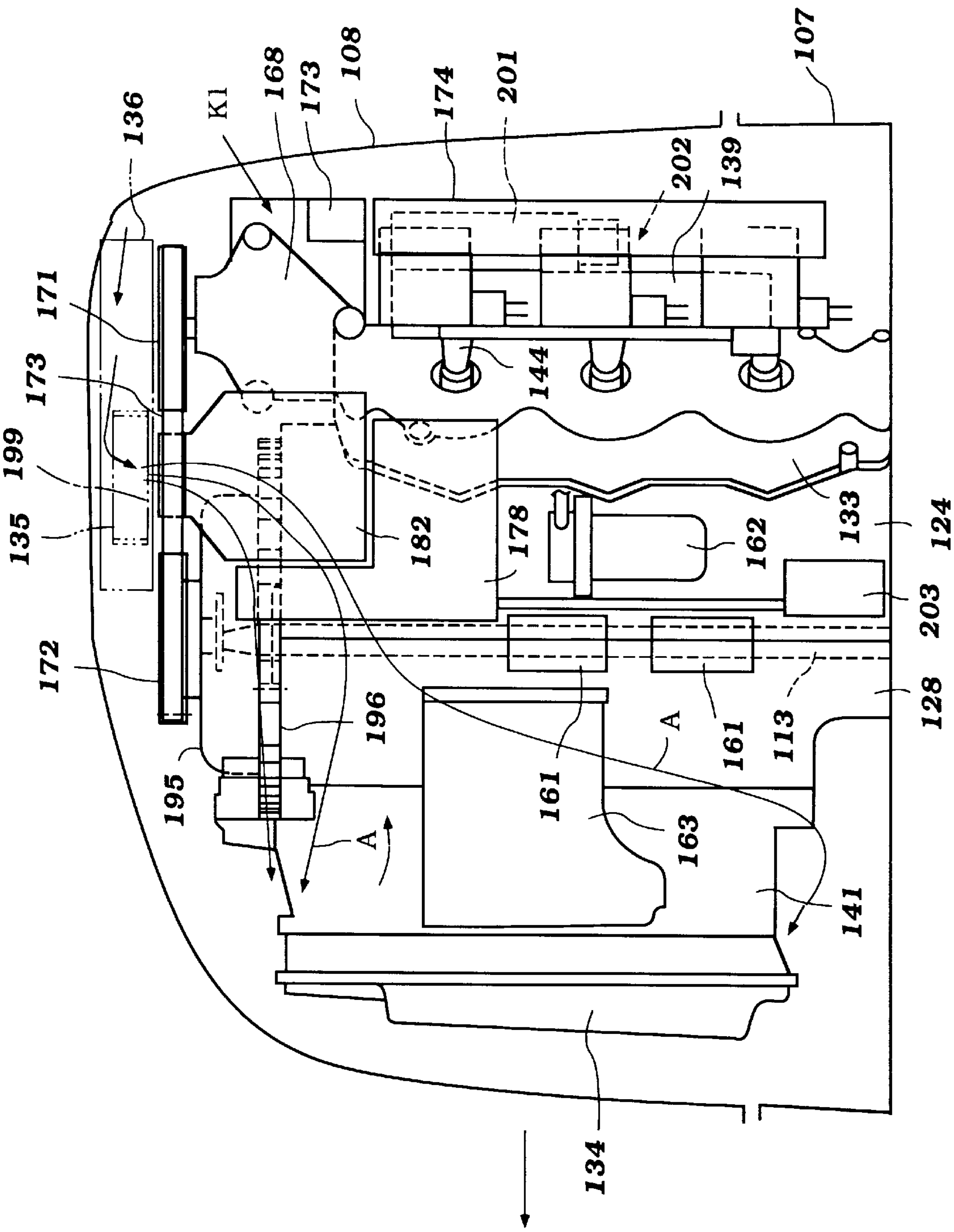
FIG. 4 is a left side elevational view of the power head with portions of the protective cowling shown in line view and other components shown in phantom.
Figure 5:
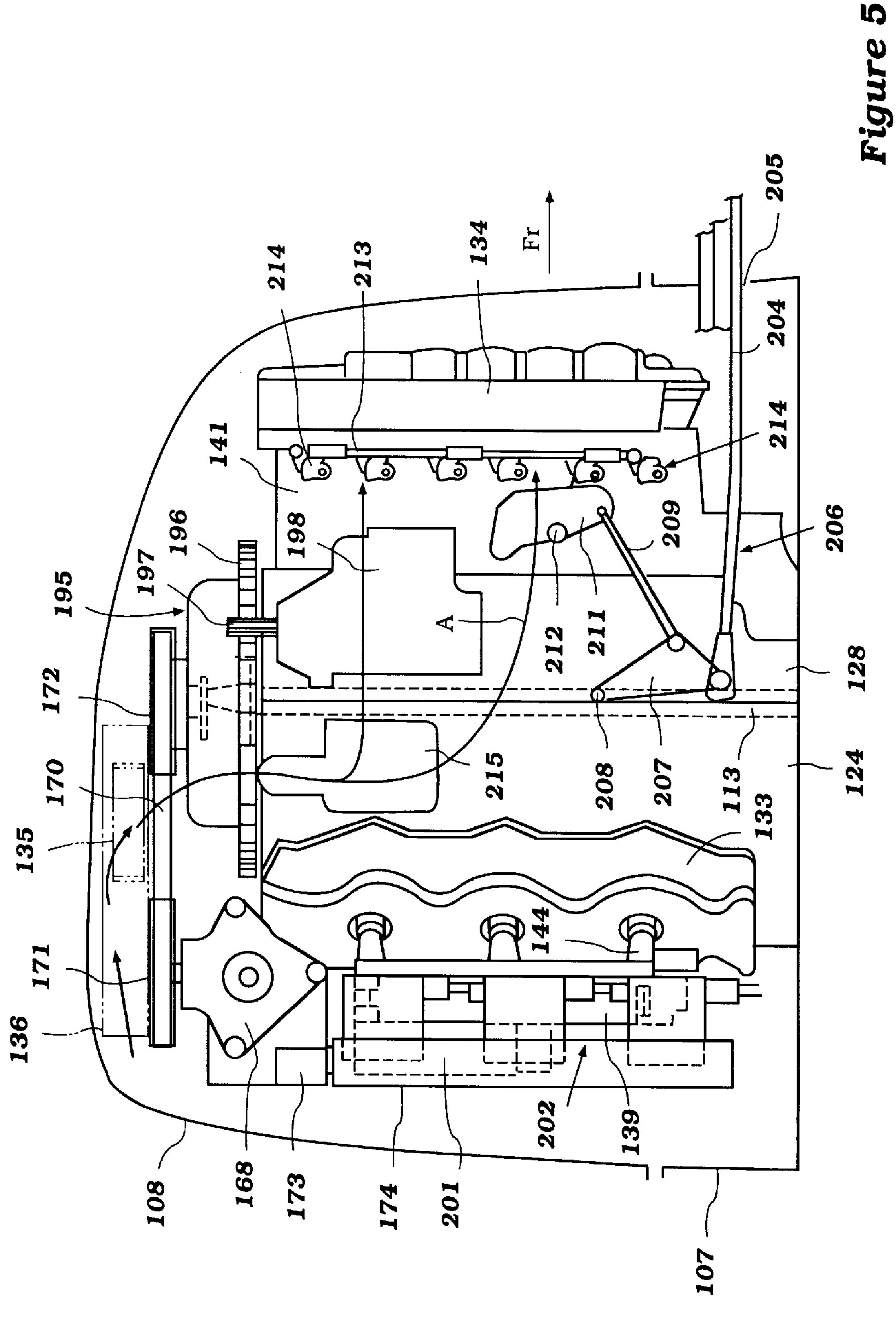
FIG. 5 is a side elevational view looking in the opposite direction from FIG. 4.

Embodiment of FIGS. 3–5

In describing this and the subsequent embodiments, a number of the components which have been shown only schematically in FIGS. 1 and 2 are illustrated in their full form rather than schematically. These components will be described again primarily in connection to their physical relationship in the power head 105 and location with respect to the air inlet system, where relevant. In addition, certain components which were not shown in the previous figures will be illustrated and described in conjunction with either this first detailed embodiment or those which will be described later.

In this embodiment, it will be seen that the high pressure fuel pump 168 is mounted on the upper portion of the engine in the valley between the cylinder banks in an otherwise open area, indicated at K1. However the positioning is away from the air inlets 135 and the flow path A to the air inlet device 134, as will be described.

The pump drive sprocket or pulley 171 is positioned high in the engine and is driven, as aforenoted, by the belt 173. The high pressure fuel pump 168 is disposed above the main fuel manifold 173 and thus can supply it with fuel with a minimum of external conduits.

The main fuel manifold 173 is, in turn, disposed to extend transversely across the power head from the longitudinal center plane L and terminates above each of the individual fuel rails 174 for the respective cylinder banks. As a result, external conduits are substantially avoided or substantially minimized.

As may also be best seen in these figures, there is provided a flywheel magneto assembly, indicated generally by the reference numeral 195, that is affixed to the upper end of the crankshaft 113 but below its drive sprocket 172. This flywheel magneto 195 has a starter gear 196 affixed to it that is engaged by a pinion gear 197 of a starter motor 198. As may be best seen in FIG. 5, this starter motor 198 is conveniently mounted on one side of the crankcase member 128 in an otherwise unoccupied space.

The drive belt 170 which drives the high pressure fuel pump sprocket 172 also drives a sprocket or pulley 199 of the alternator 182. The alternator 182 is, as best seen in FIG. 4 positioned on the opposite side of the engine from the starter motor 198 and can be mounted adjacent and slightly above the cylinder head 133 of this cylinder bank. This alternator 182 may be mounted for movement relative to the cylinder head so as to adjust the tension on the drive belt 170.

As may best be seen in FIG. 3, the pressure regulator 175 is also mounted on the upper portion of the engine adjacent the main fuel manifold 173 so as to provide a compact construction. In this same area, the ECU 139 is mounted as is a fuel injector driver circuit 201 for operating the electronic portion of the fuel injectors 144. This forms a complete control assembly 202 consisting of the ECU 139 and the injector driver 201 which is also mounted in the generally open area K1.

Mounted adjacent one of the cylinder banks on the left-hand side of the engine is the oil pump 178 which is disposed slightly above the fuel filter 162. Thus, these components which may require servicing are in a very accessible area.

A further oil pump 203 is also mounted on this side of the engine below the oil pump 178. This further oil pump 203 may supply oil to other components of the engine, for example through an internal oil gallery.

Also, the low pressure fuel pumps 161 are positioned on this side of the engine where they communicate with the crankcase chamber through the crankcase member 128 so as to drive them, as aforenoted.

In this embodiment, the fuel/vapor separator 163 is also located on this side of the engine so as to be conveniently positioned in an open area where it can be easily serviced, if required.

FIG. 5 shows the aforenoted throttle linkage for operating the throttle valves 138. This throttle linkage includes a wire actuator element 204 that extends through an opening 205 in the protective cowling tray 107 and which operates a throttle linkage mechanism, indicated generally by the reference numeral 206.

This linkage system includes a bell crank 207 pivotally journaled on the crankcase member 128 by a pivot pin 208. A link, 209 connects another portion of this bell crank 207 to a throttle actuating cam 211 pivotally mounted on the intake manifold 141 by a pivot pin 212. This throttle cam 211 operates with a throttle linkage mechanism including a synchronizing link 213 and a plurality of throttle levers 214 each of which is mounted to a respective throttle valve shaft on which the throttle valves 138 are mounted.

Also appearing in FIG. 5 and also in FIG. 3, is a cover plate 215 that is provided over the aforenoted oxygen sensor 189 so as to protect it from damage while still placing it in a readily accessible position for servicing.

Thus, it should be readily apparent that the layout of this embodiment is such that all of the components are positioned in readily serviceable areas and also the high pressure fuel pump 168 can be easily driven off the upper end of the crankshaft 113. In addition, the arrangement is such so that the components will also be cooled but the high pressure pump 168 is protected from corrosion.

It has been noted that the protective cowling for the outboard motor is provided with air inlet slots 136 that cooperate with a pair of upwardly extending air inlet ducts 135. As may be best seen in FIGS. 3 and 4, these air inlet ducts 135 are disposed in an area adjacent the drive belt 170 for the high pressure fuel pump 168. Also, the air will flow downwardly over the various components of the fuel injection system as shown by the air flow lines A across these various components to cool them and then flow into a rearwardly facing air inlet opening 216 (FIG. 3) of the air inlet silencer 134.

Thus, the air flow through the protective cowling will be such that the components and particularly those associated with the high pressure side of the fuel injection system other than the pump 168 itself will be well cooled. Nevertheless, the flow pattern is such that water vapor that may be entrained with this incoming air flow will not likely impinge upon these various components and specifically the pump 168.

Embodiment of FIGS. 6–9

FIGS. 6–9 show another embodiment which is generally similar to the embodiments thus far described but differs in the placement of certain of the components. In this embodiment, the fuel vapor separator 163 is positioned adjacent the main fuel manifold 173 and between the two fuel rails 174. This will reduce the length of the fuel conduits to interconnect the components of the fuel supply system.

In this embodiment, the control is also relocated so that the ECU 139 is positioned adjacent the air inlet device 134 and in a path where air will flow across it as seen by the arrows A. The solenoid driver 204 for the fuel injectors is also relocated into this area so as to further promote cooling. In addition, this arrangement moves these electrical components away from the fuel supply so that there will not be heat exchange between these heat sensitive systems.

Also, in this embodiment, the alternator 182 is moved to a position to the side of the cylinder bank over which it was mounted in the previously described embodiment. Thus, the alternator 182 can be positioned in the void area so as to further promote accessibility. It is still on the opposite side of the centerline L from the starter motor 198.

Figure 9:
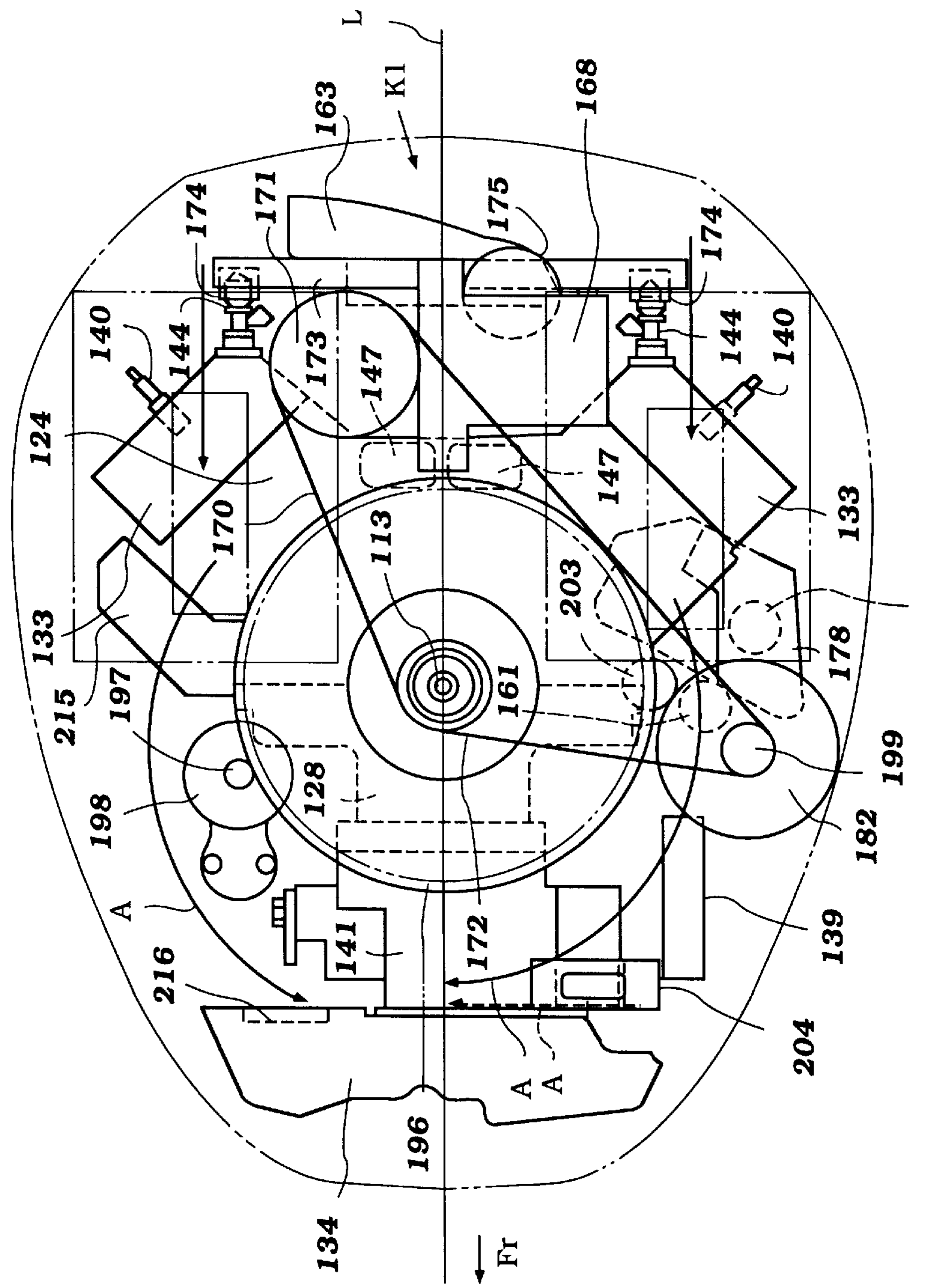
FIG. 9 is a top plan view, in part similar to FIGS. 3 and 6, showing a fourth embodiment of the invention.
Figure 10:
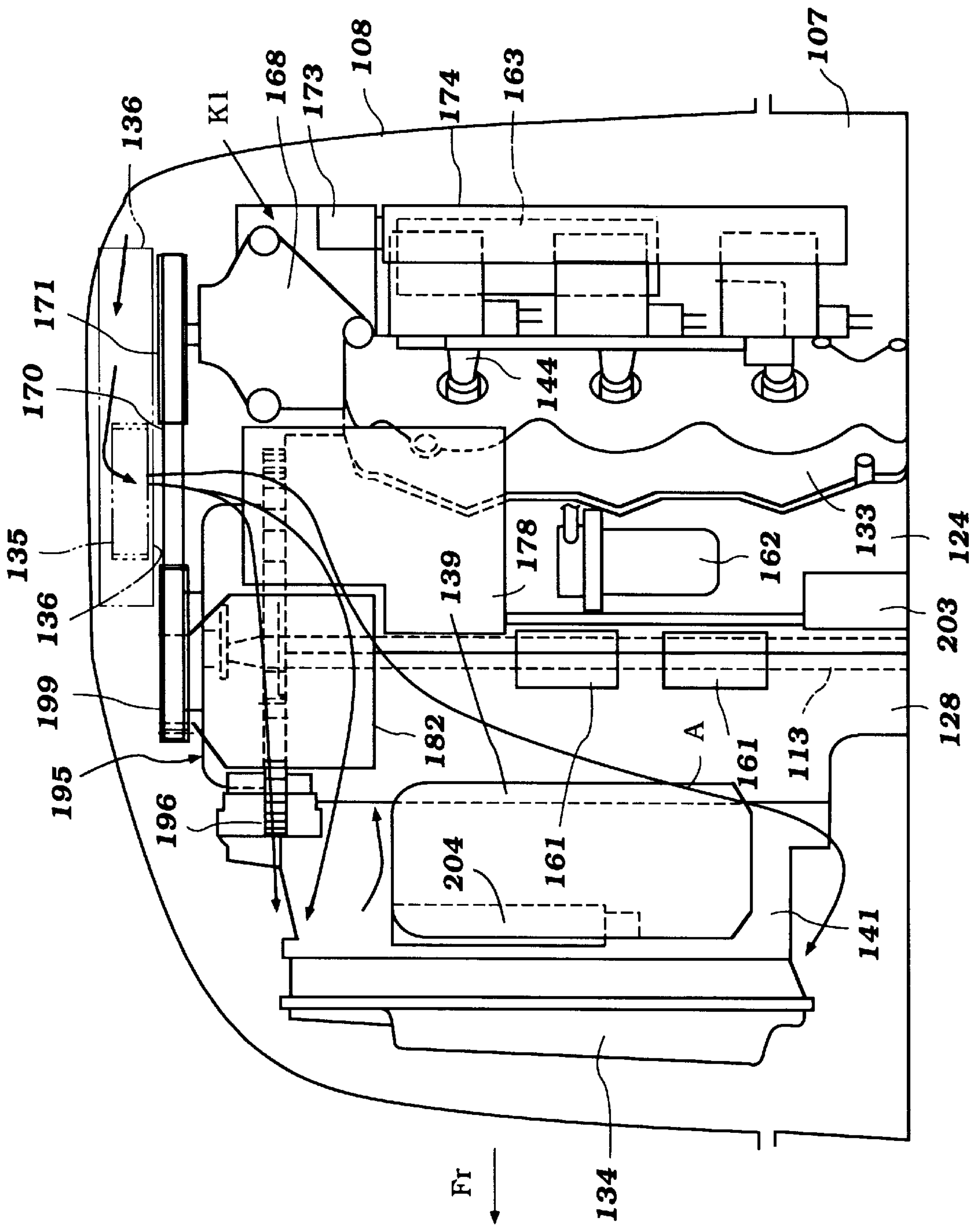
FIG. 10 is a side elevational view, in part similar to FIGS. 4 and 7, for this fourth embodiment.
Figure 11:
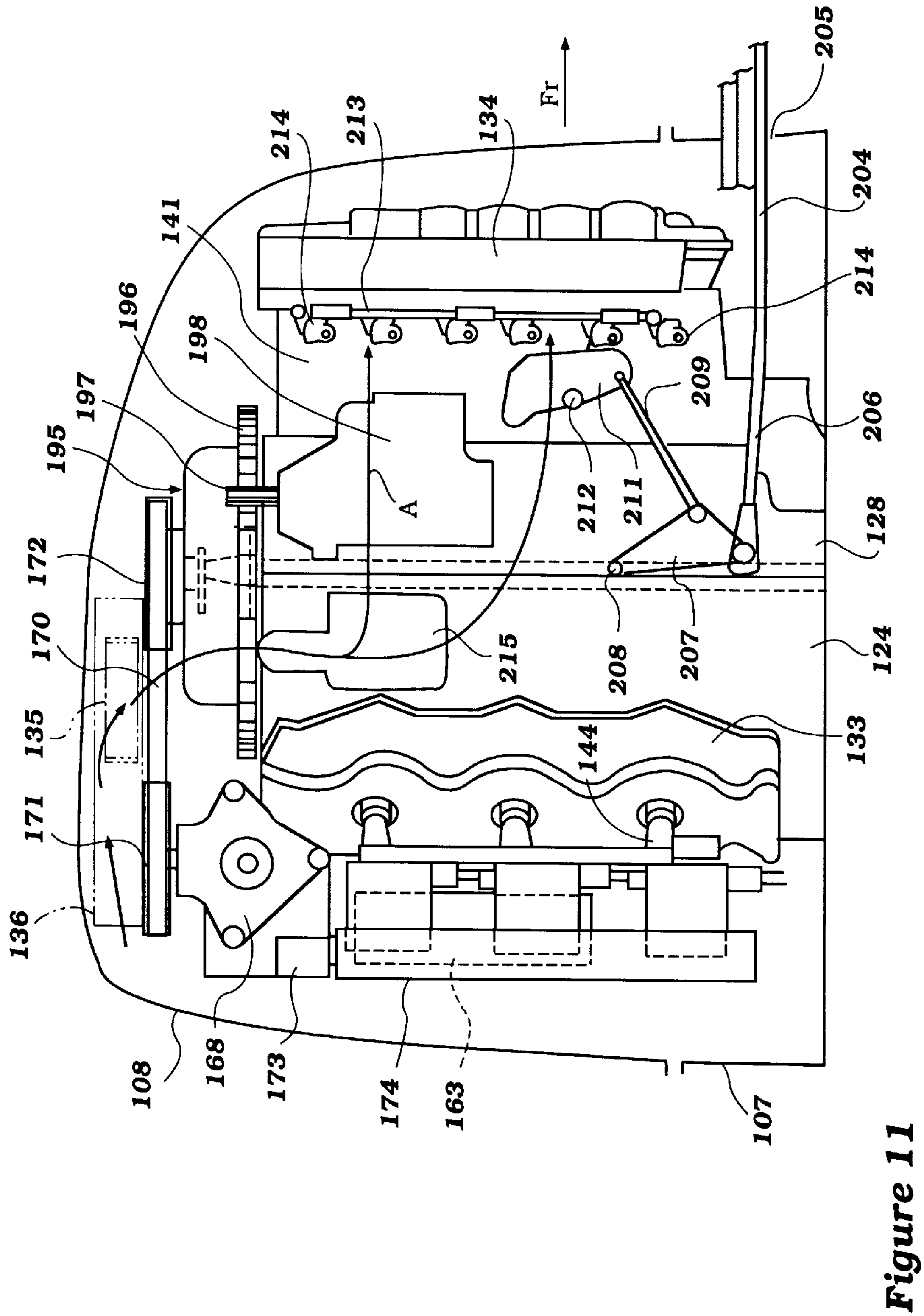
FIG. 11 is a side elevational view of the opposite side for this embodiment and is in part similar to FIGS. 5 and 8.

Embodiment of FIGS. 9–11

These figures illustrate a further embodiment of the invention. This embodiment differs from the embodiment of FIGS. 6–8 only in the positioning of the ECU 139 and the injector solenoid driver 204. In this embodiment, the positions are reversed so that the injector driver 204 is mounted on the backside of the air inlet and silencing device 134. This is useful because the injector driver circuit 204 will generate more heat than the ECU 139 and thus requires a greater degree of cooling. Aside from this, this embodiment is the same as that previously described and, therefore, further description of this embodiment is not believed to be necessary to permit those skilled in the art to practice the invention of this embodiment.

Figure 12:
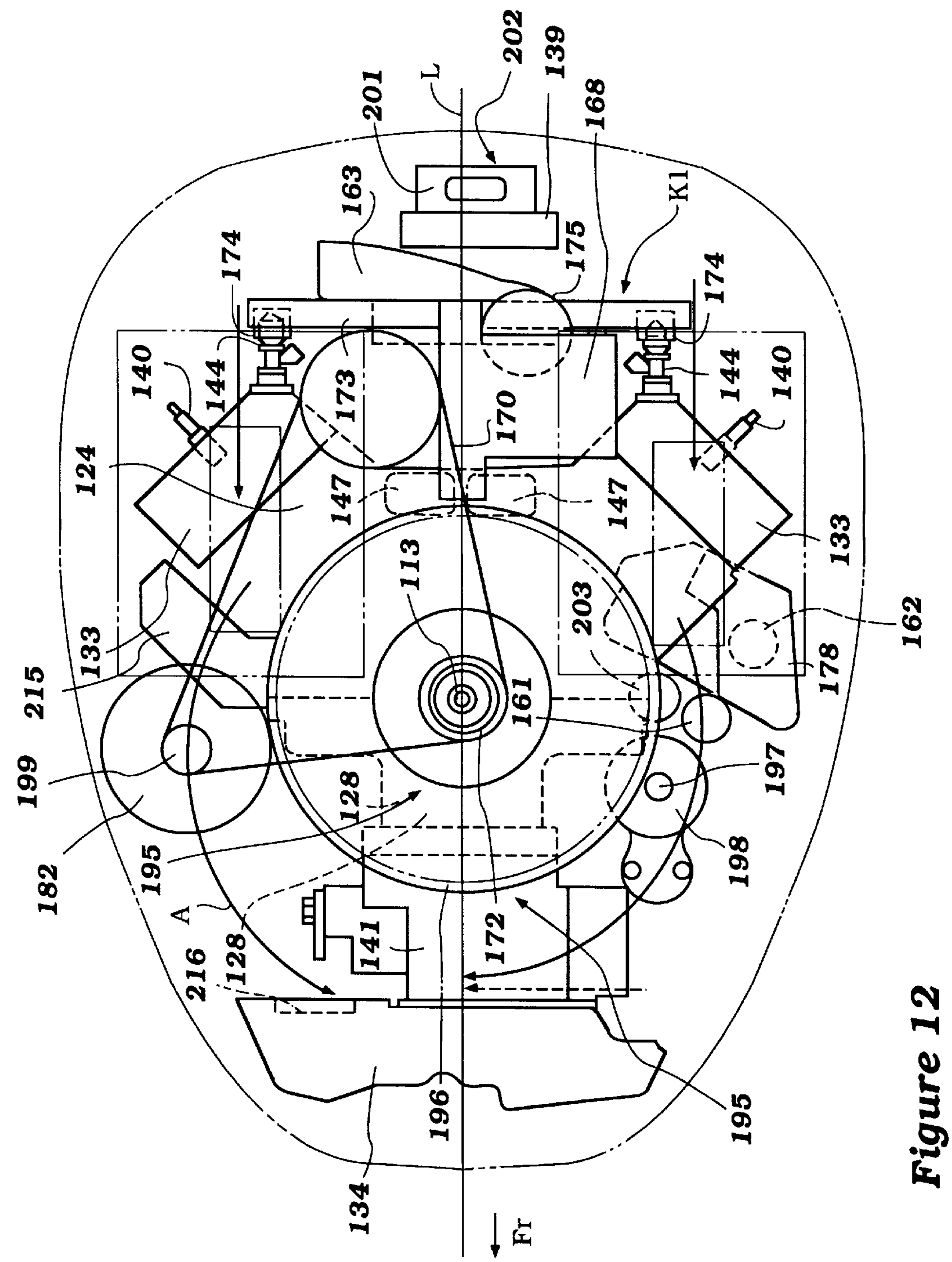
FIG. 12 is a top plan view, in part similar to FIGS. 3, 6 and 9, for a fifth embodiment of the invention.
Figure 13:
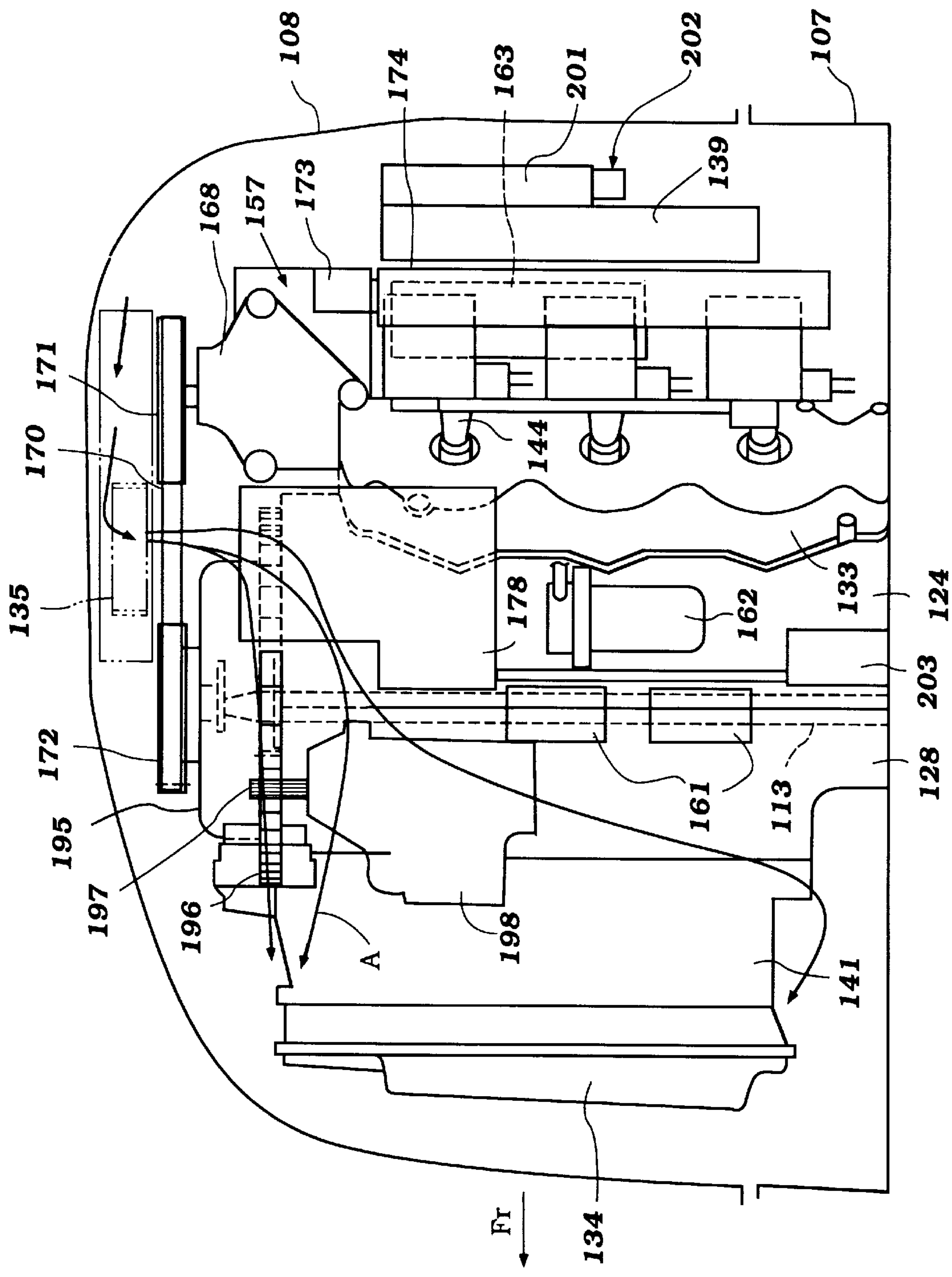
FIG. 13 is a side elevational view, in part similar to FIGS. 4, 7 and 10, for this fifth embodiment of the invention.
Figure 14:
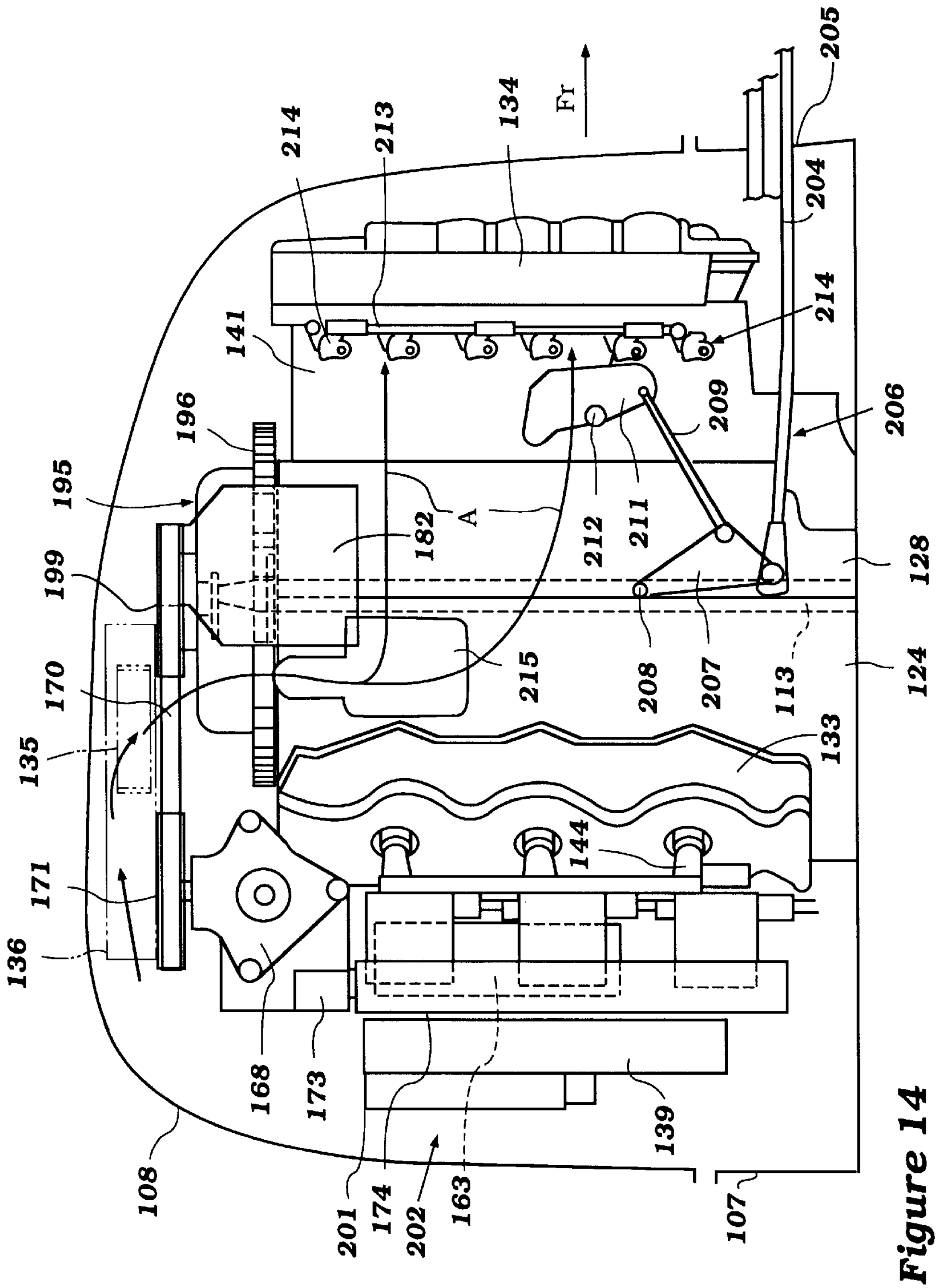
FIG. 14 is a side elevational view of the opposite side of this fifth embodiment and is in part similar to FIGS. 5, 8 and 11.

Embodiment of FIGS. 12–14

FIGS. 12–14 show another embodiment of the invention which differs from the preceding embodiments again only in the way in which the various components are located. In this embodiment, the alternator 182 and its driving pulley 199 is positioned adjacent the heat shield 215 of the oxygen sensor and in a void area between the intake manifold 141 and one cylinder bank.

Also in this embodiment, the vapor separator 163 is positioned immediately adjacent the main fuel manifold 173.

The ECU 139 and solenoid driver 201 for the fuel injectors comprising the control unit 202 is positioned adjacent to and upwardly from the vapor separator 163 in the void K1 at the rear of the engine.

In this embodiment, the starter motor 198 and its pinion gear 197 that cooperates with the ring gear 196 on the flywheel magneto assembly 195 is disposed on the opposite side of the intake manifold 141 from the alternator 182.

In all other regards, this embodiment is the same as those previously described and, therefore, further description of this embodiment is not believed to be necessary to permit those skilled in the art to understand or practice the invention.

Figure 15:
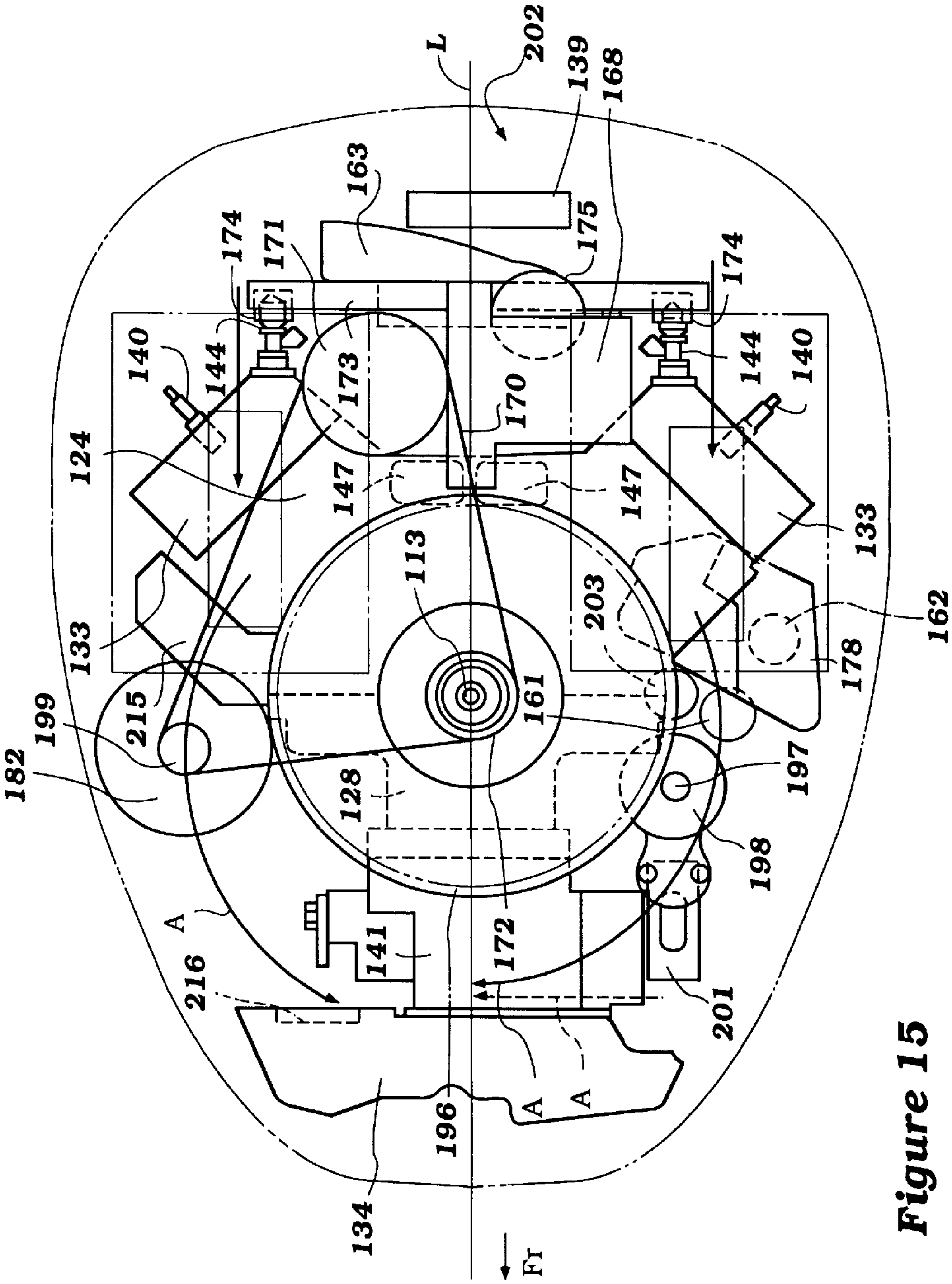
FIG. 15 is a top plan view, in part similar to FIGS. 3, 6, 9 and 12, and shows a sixth embodiment of the invention.
Figure 16:
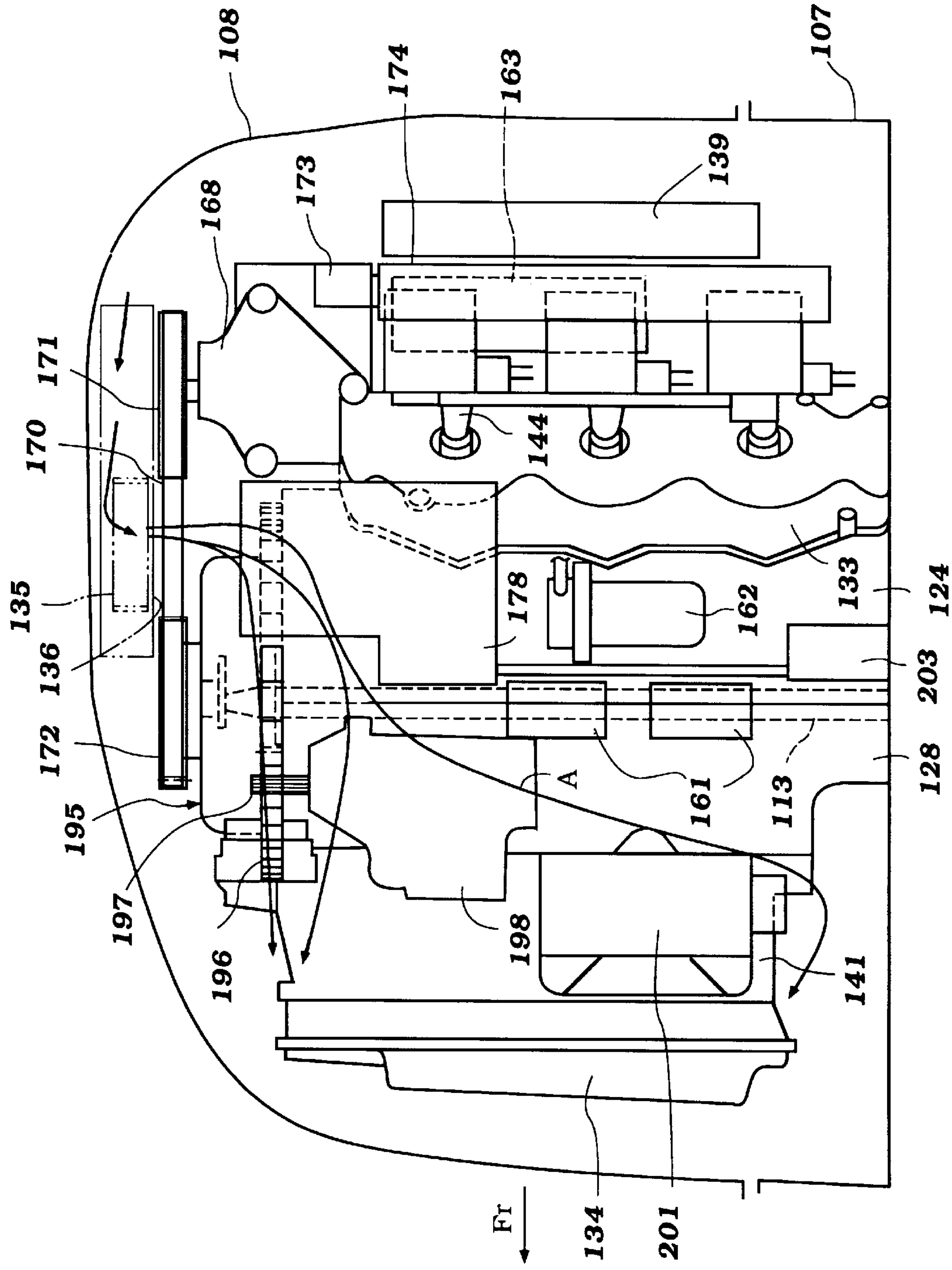
FIG. 16 is a left side elevational view, in part similar to FIGS. 4, 7, 10 and 13, of this sixth embodiment of the invention.
Figure 17:
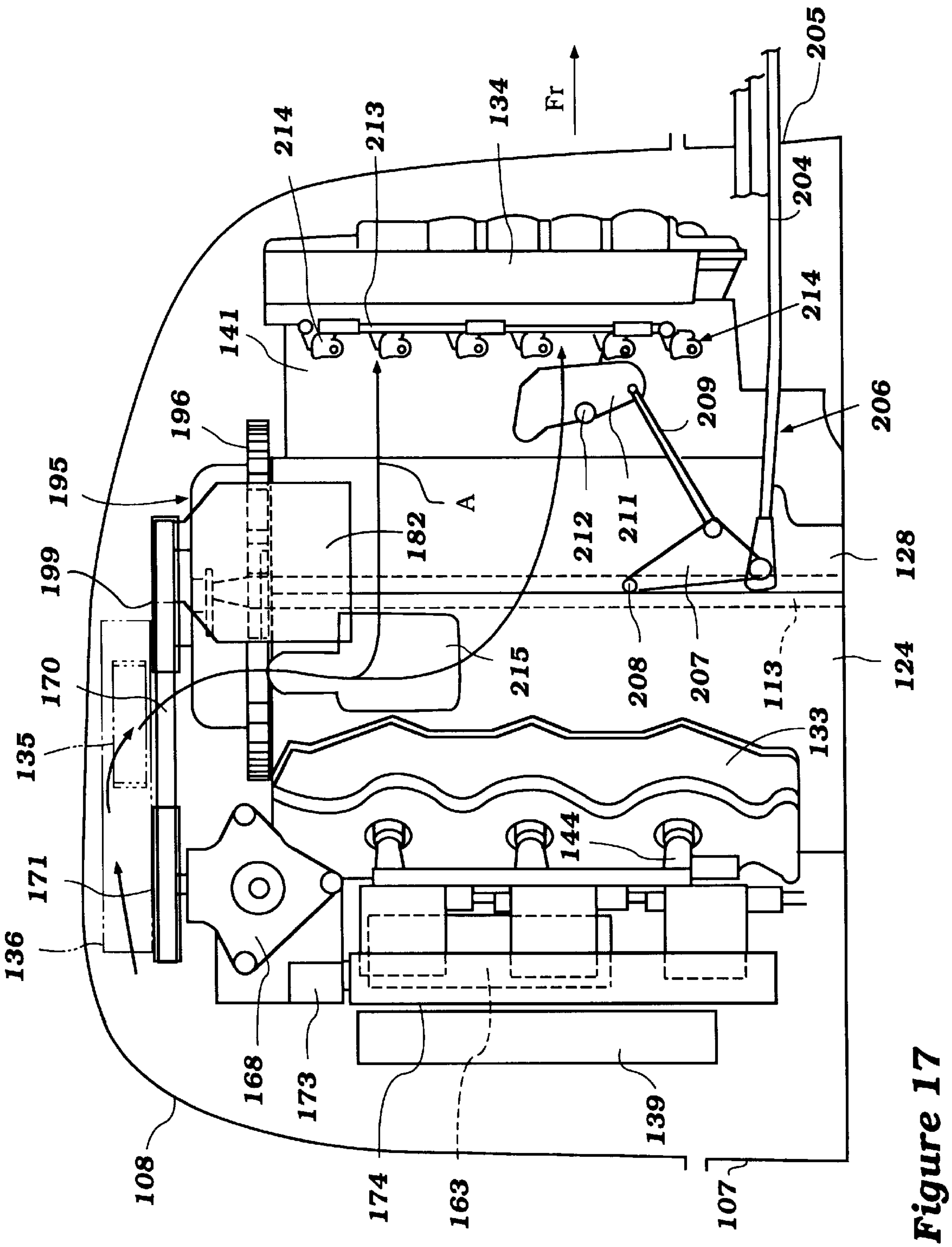
FIG. 17 is a side elevational view of the opposite side of this sixth embodiment and is in part similar to FIGS. 5, 8, 11 and 14.

Embodiment of FIGS. 15–17

FIGS. 15–17 show an embodiment which is substantially the same as the embodiment of FIGS. 12–14. In this embodiment, however, the solenoid driver 201 for the fuel injectors 144 is positioned on one side of the manifold 141 and thus is in a position where there will be cool air flowing by it and it will be removed from the heat of the main body of the engine.

In all other regards, this embodiment is the same as those previously described and, therefore, further description of this embodiment is believed to be unnecessary to permit those skilled in the art to understand this embodiment.

Figure 18:
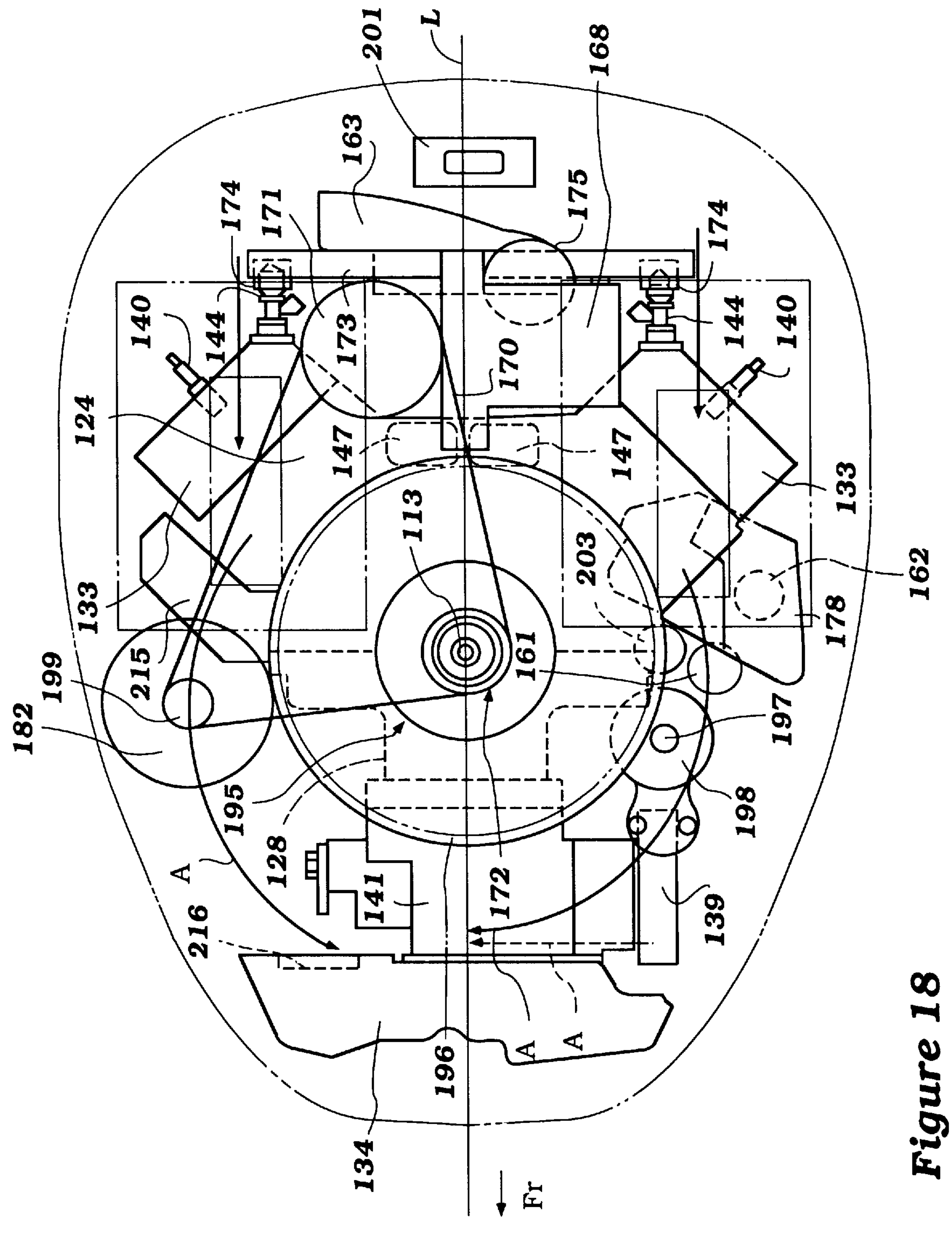
FIG. 18 is a top plan view, in part similar to FIGS. 3, 6, 9, 12 and 15, and shows a seventh embodiment of the invention.
Figure 19:
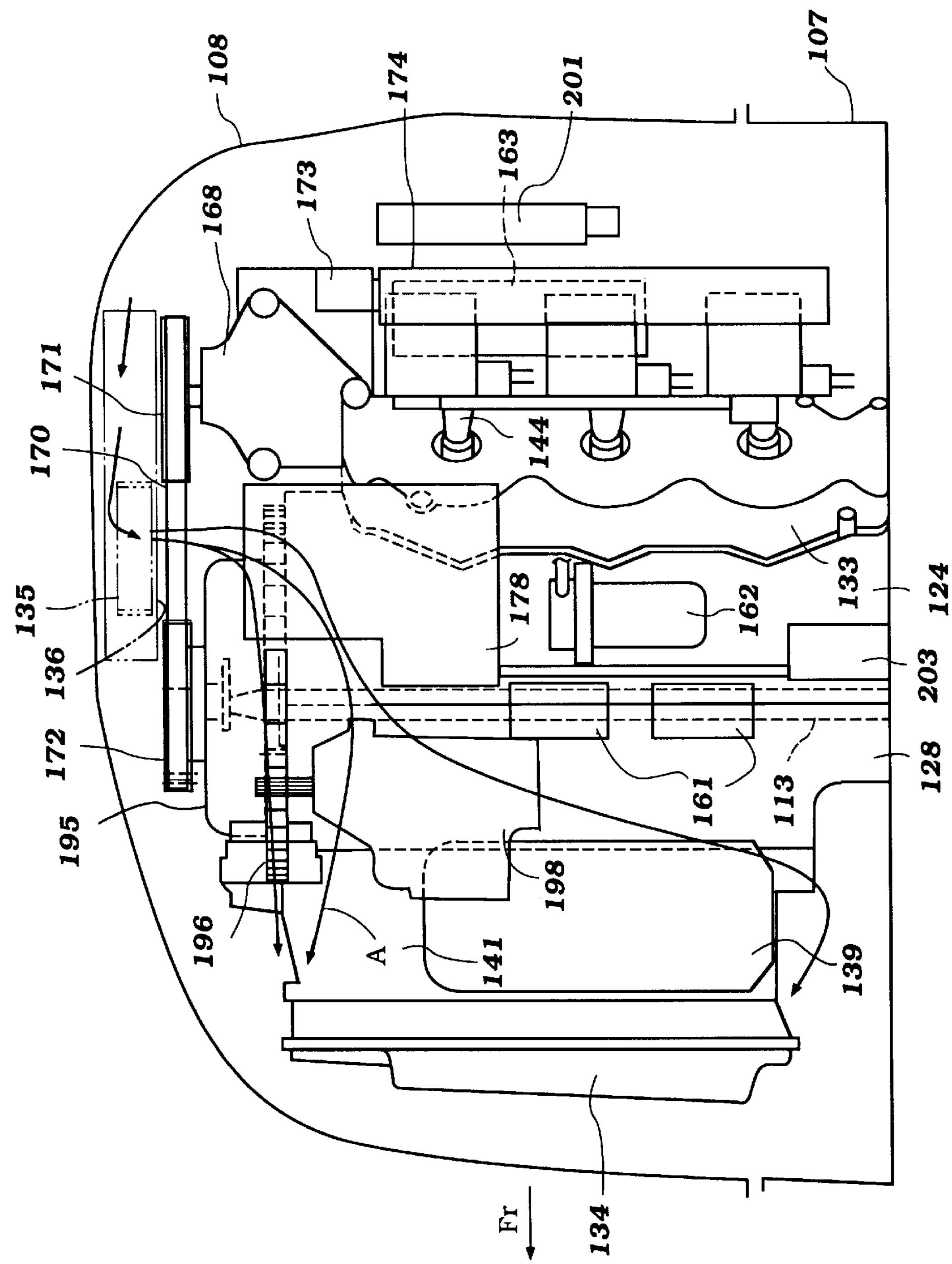
FIG. 19 is a right side elevational view, in part similar to FIGS. 4, 7, 10, 11 and 16, for this seventh embodiment.
Figure 20:
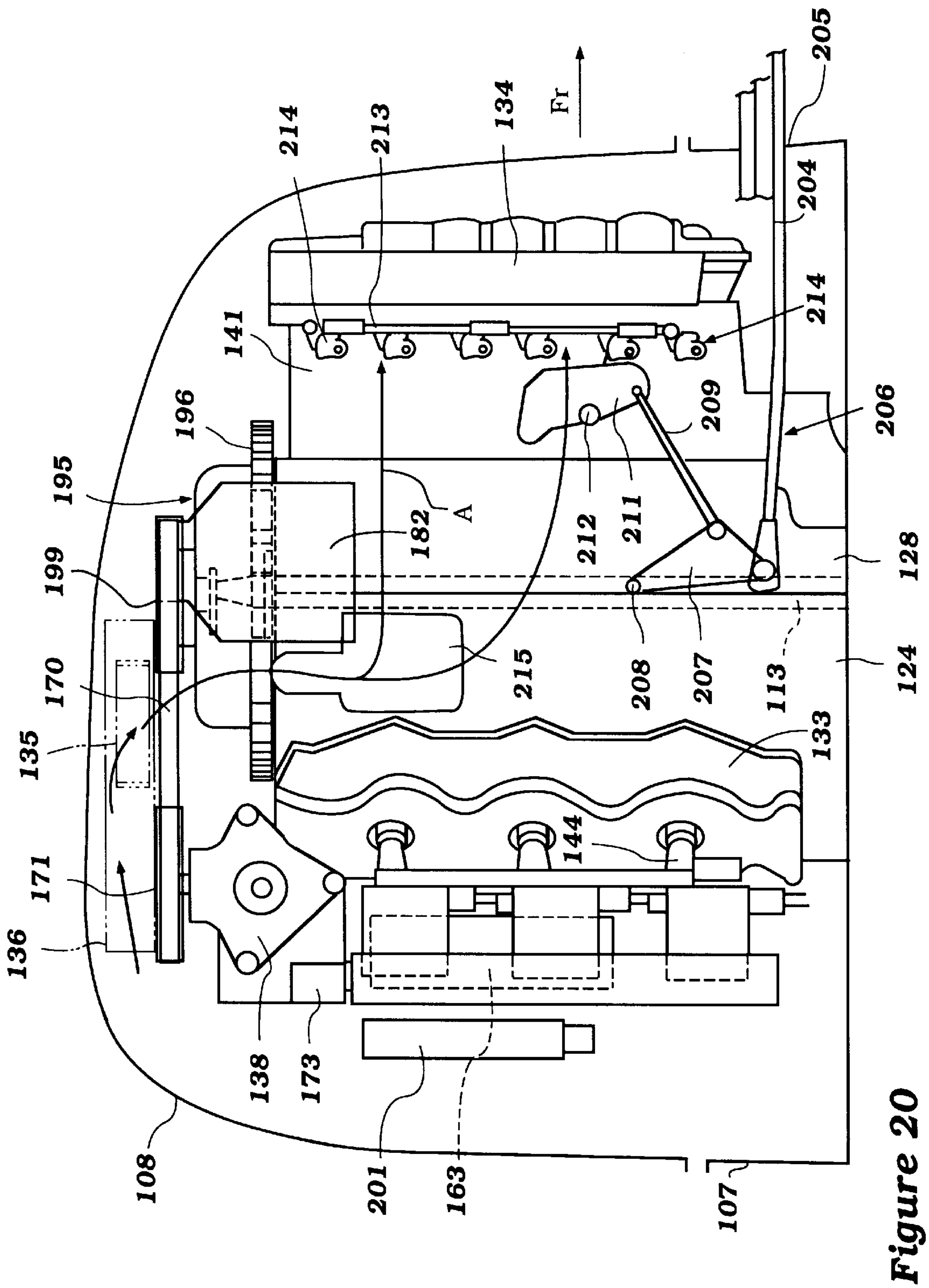
FIG. 20 is a side elevational view of the opposite side of this seventh embodiment and is in part similar to FIGS. 5, 8, 11, 14 and 17.

Embodiment of FIGS. 18–20

These figures illustrate another embodiment which is quite similar to the embodiment of FIGS. 12–14 and 15–17. In this embodiment, like the embodiment of FIGS. 15–17, the two elements of the control unit 202, i.e., the ECU 139 and the solenoid driver 201 for the fuel injectors 144 are separated from each other. Their positions are reversed from that shown in the embodiment of FIGS. 15–17 in this particular embodiment. That is, the sensitive ECU 139 is positioned adjacent the intake manifold runners 141 and the solenoid driver unit 201 for the fuel injectors 144 is placed in closer proximity to them.

In all other regard, this embodiment is the same as those previously described and, for that reason, further description of this embodiment is not believed to be necessary to permit those skilled in the art to practice the invention.

Figure 21:
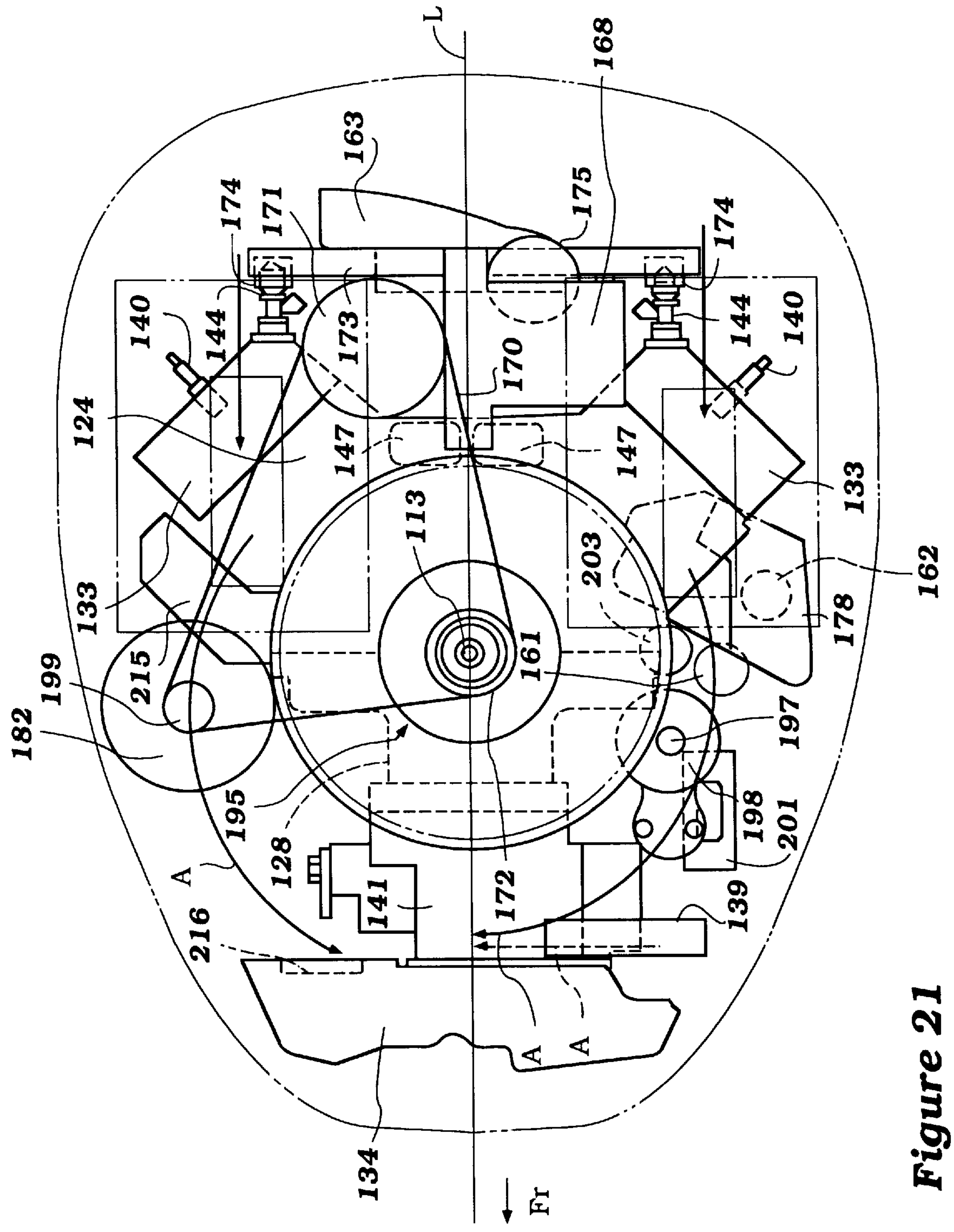
FIG. 21 is a top plan view, in part similar to FIGS. 3, 6, 9, 12, 15 and 18, for an eighth embodiment of the invention.
Figure 22:
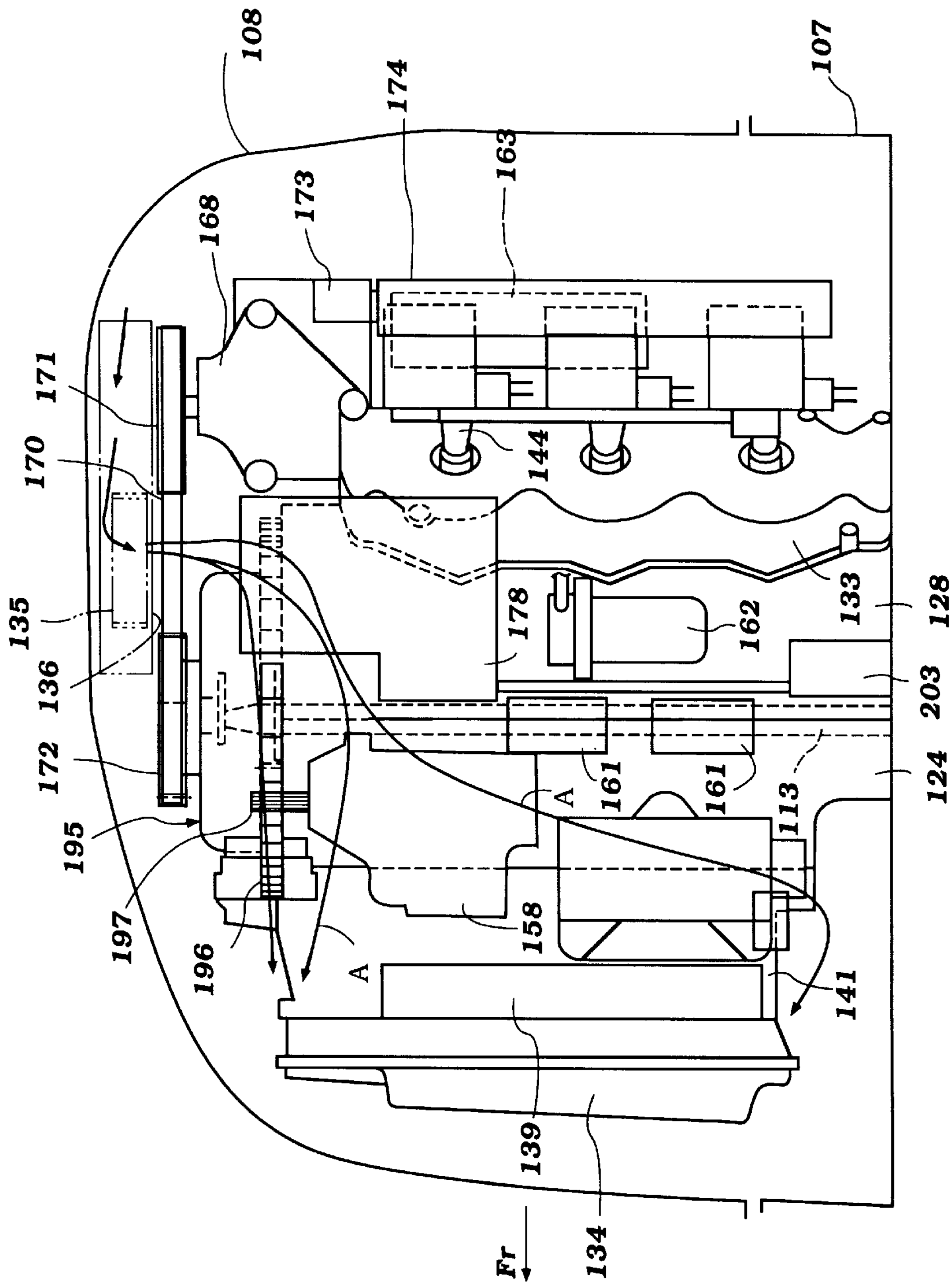
FIG. 22 is a right side elevational view, in part similar to FIGS. 4, 7, 10, 13, 16 and 19, for this eighth embodiment.
Figure 23:
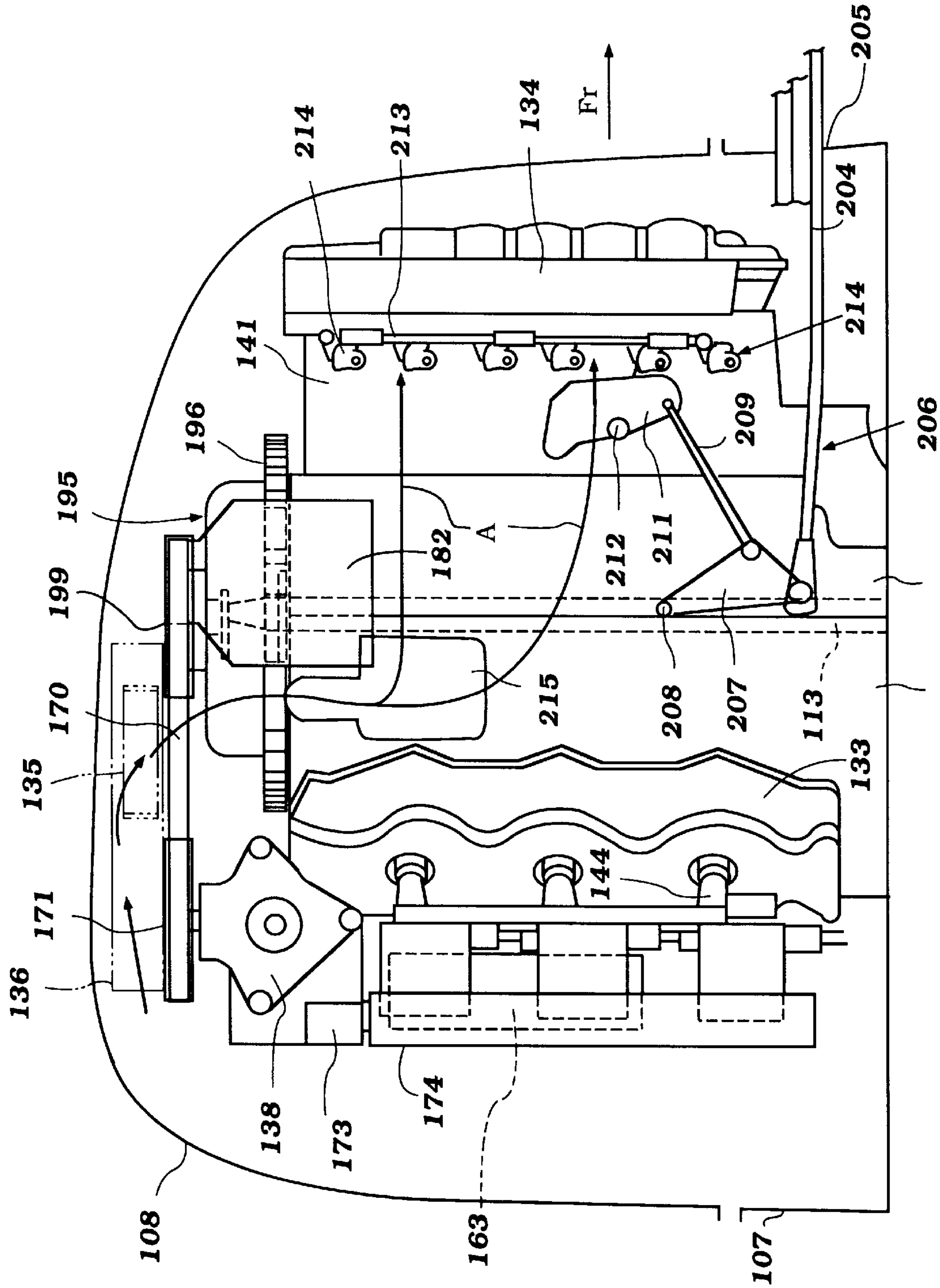
FIG. 23 is a side elevational view of the opposite side of this eighth embodiment and is in part similar to FIGS. 5, 8, 11, 17 and 20.

Embodiment of FIGS. 21–23

This embodiment is similar to the embodiment of FIGS. 12–14, 15–17, and 18–20 and differs from those embodiments only in the positioning of the two components of the control unit 202. This embodiment places both of those components in proximity to the intake manifold 141.

The ECU 139 is mounted on the backside of the intake device 134. The solenoid driver circuit 201 for the fuel injectors 144 is positioned below the starter motor 168 and on the side of the intake manifold 141.

In all other regards, this embodiment is the same as those previously described and, for that reason, further description of this embodiment is not believed to be necessary to permit those skilled in the art to practice the invention.

Figure 24:
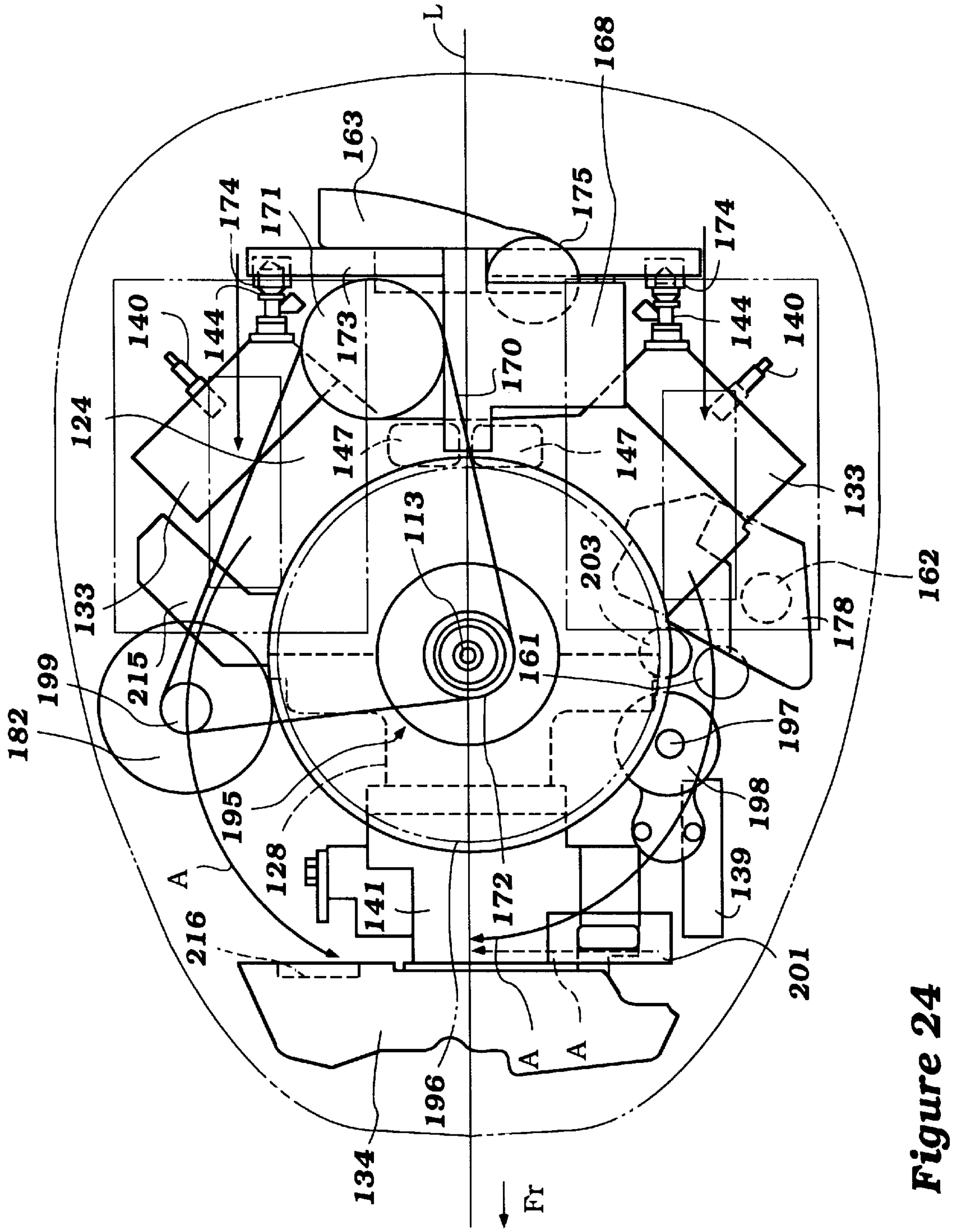
FIG. 24 is a top plan view, in part similar to FIGS. 3, 6, 9, 12, 15, 18 and 21, and shows a ninth embodiment of the invention.
Figure 25:
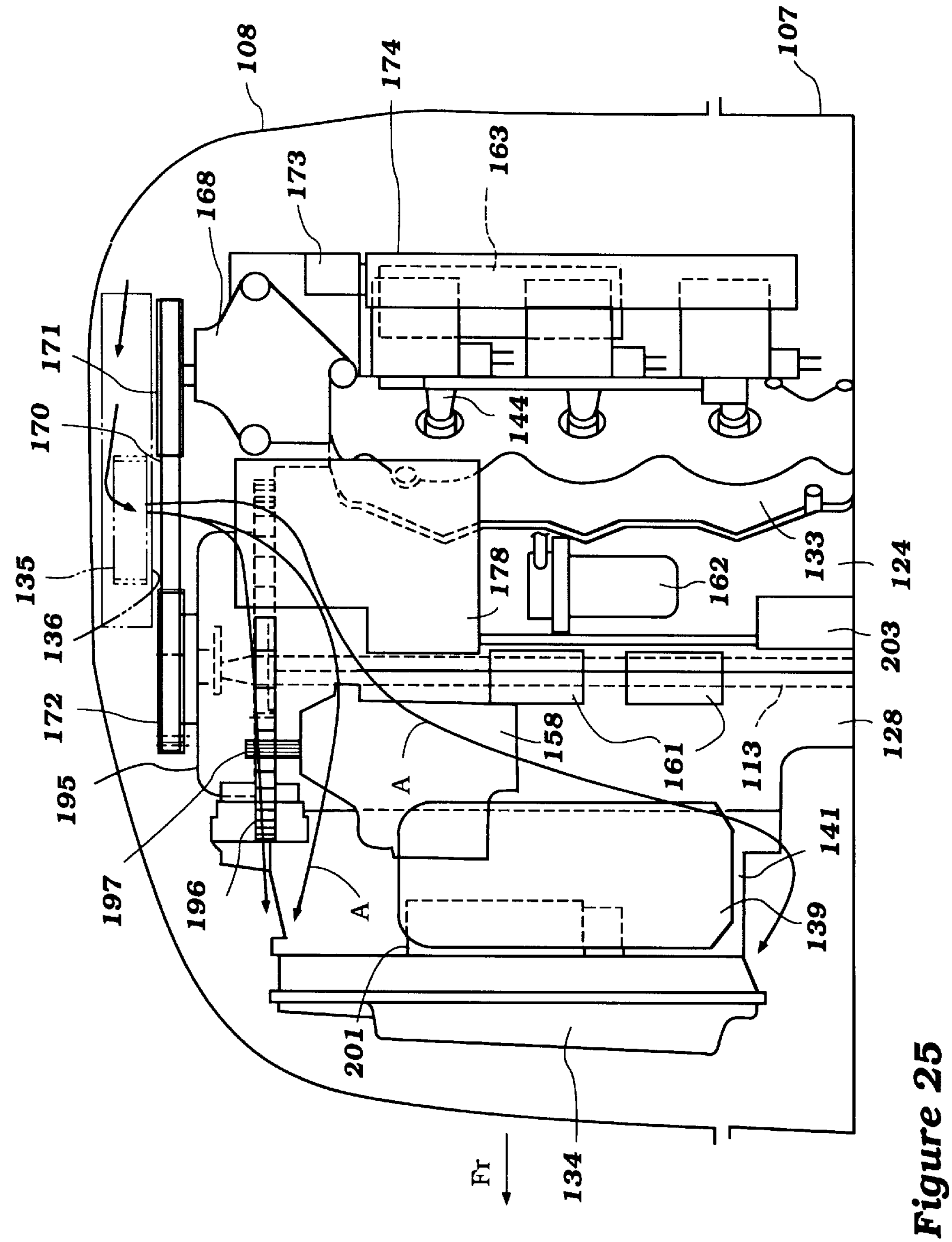
FIG. 25 is a right side elevational view, in part similar to FIGS. 4, 7, 10, 13, 16, 19 and 22, for this ninth embodiment.
Figure 26:
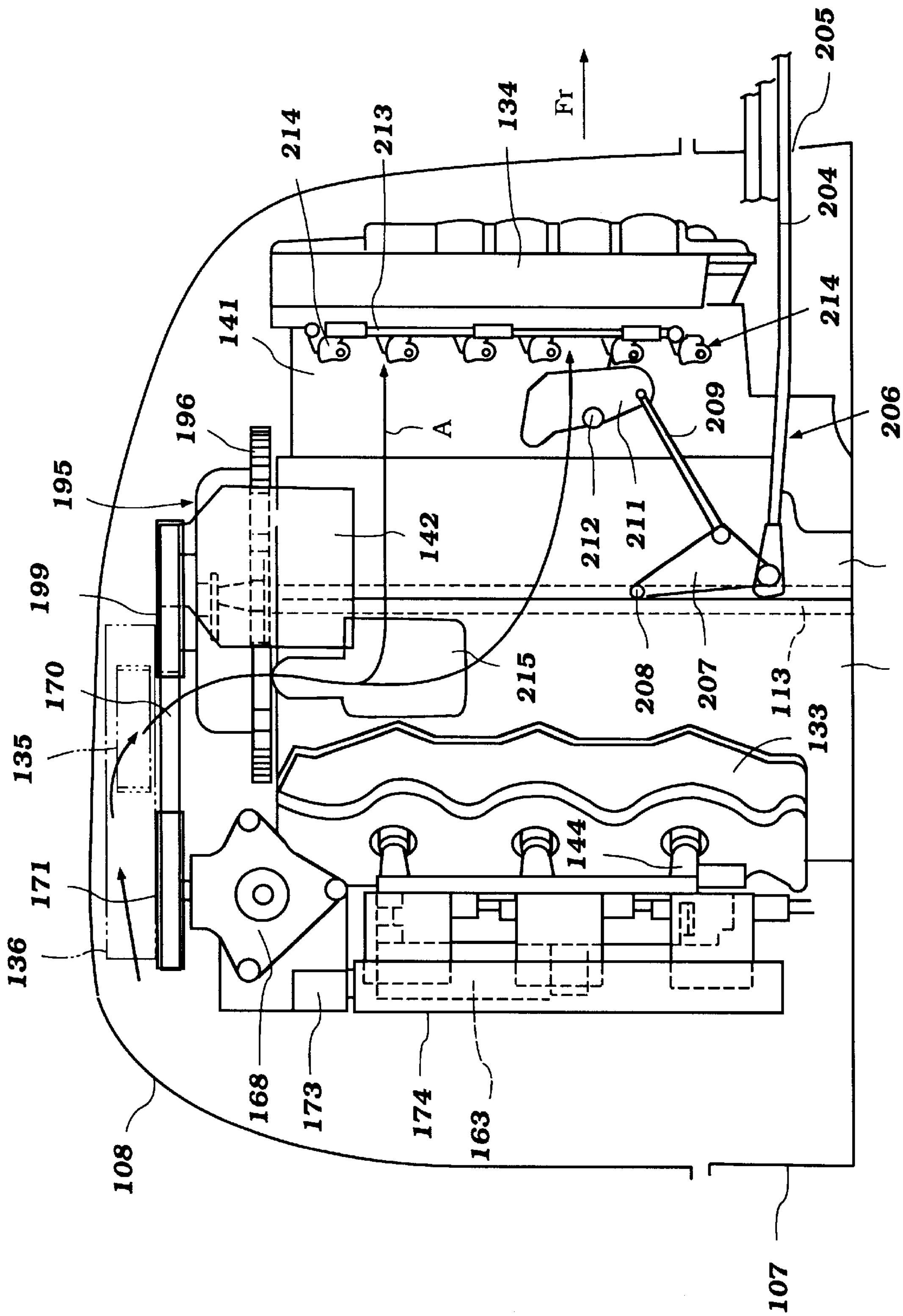
FIG. 26 is a side elevational view of the opposite side of this ninth embodiment and it is in part similar to FIGS. 5, 8, 11, 14, 17, 20 and 23.

Embodiment of FIGS. 24–26

This embodiment is quite similar to the embodiment of FIGS. 21–23. In this embodiment, however, the positioning of the two components of the control unit 202, i.e., the ECU 139 and the fuel injector solenoid driver 201 are reversed from the previous embodiment. That is, the solenoid driver 201 is mounted on the backside of the air inlet device and silencer 134. The ECU 139 is mounted on the side of the intake manifold 141 and below the starter motor 198.

Figure 27:
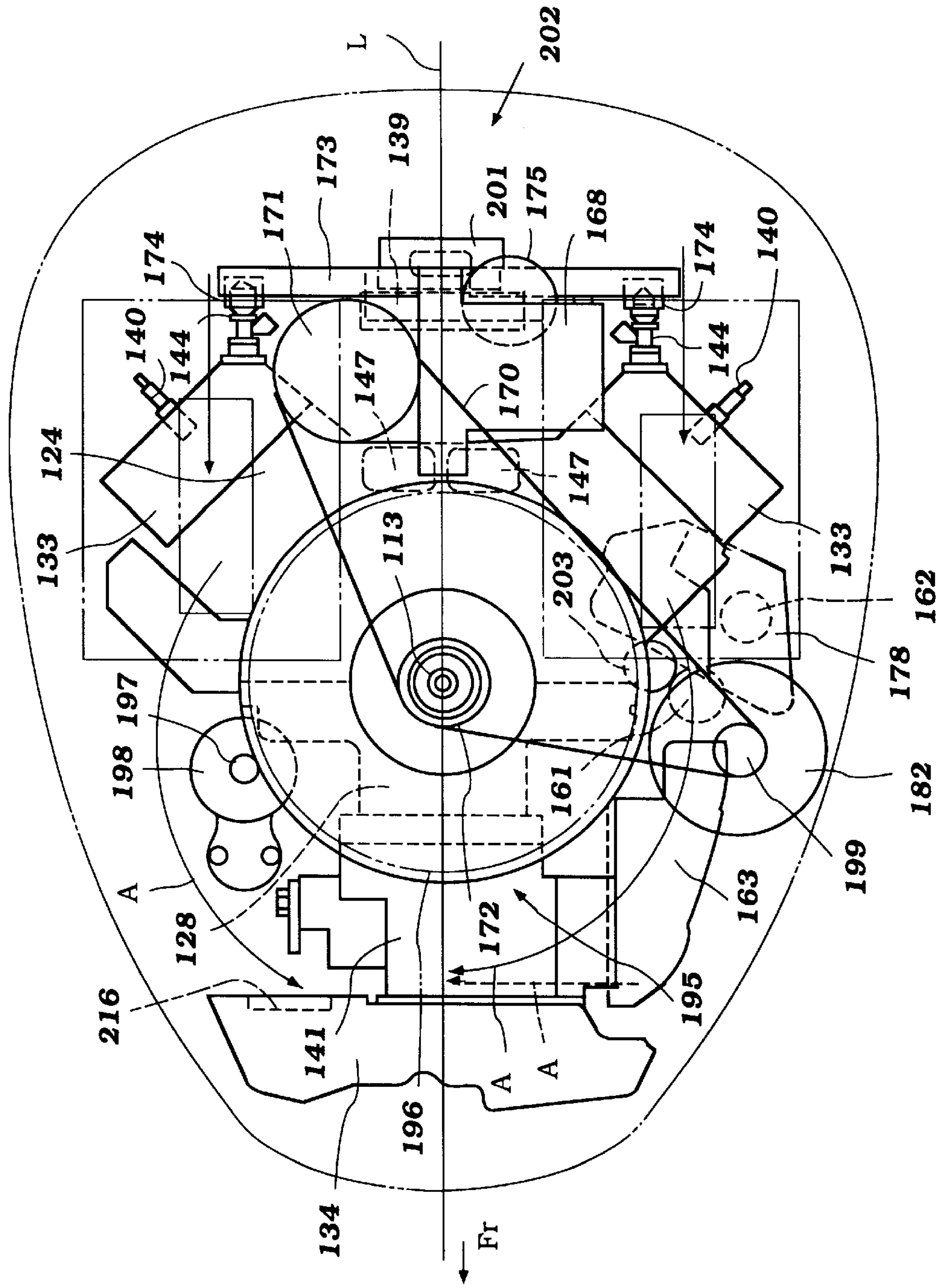
FIG. 27 is a top plan view, in part similar to FIGS. 3, 6, 9, 12, 15, 18, 21 and 24, and shows a tenth embodiment of the invention.
Figure 28:
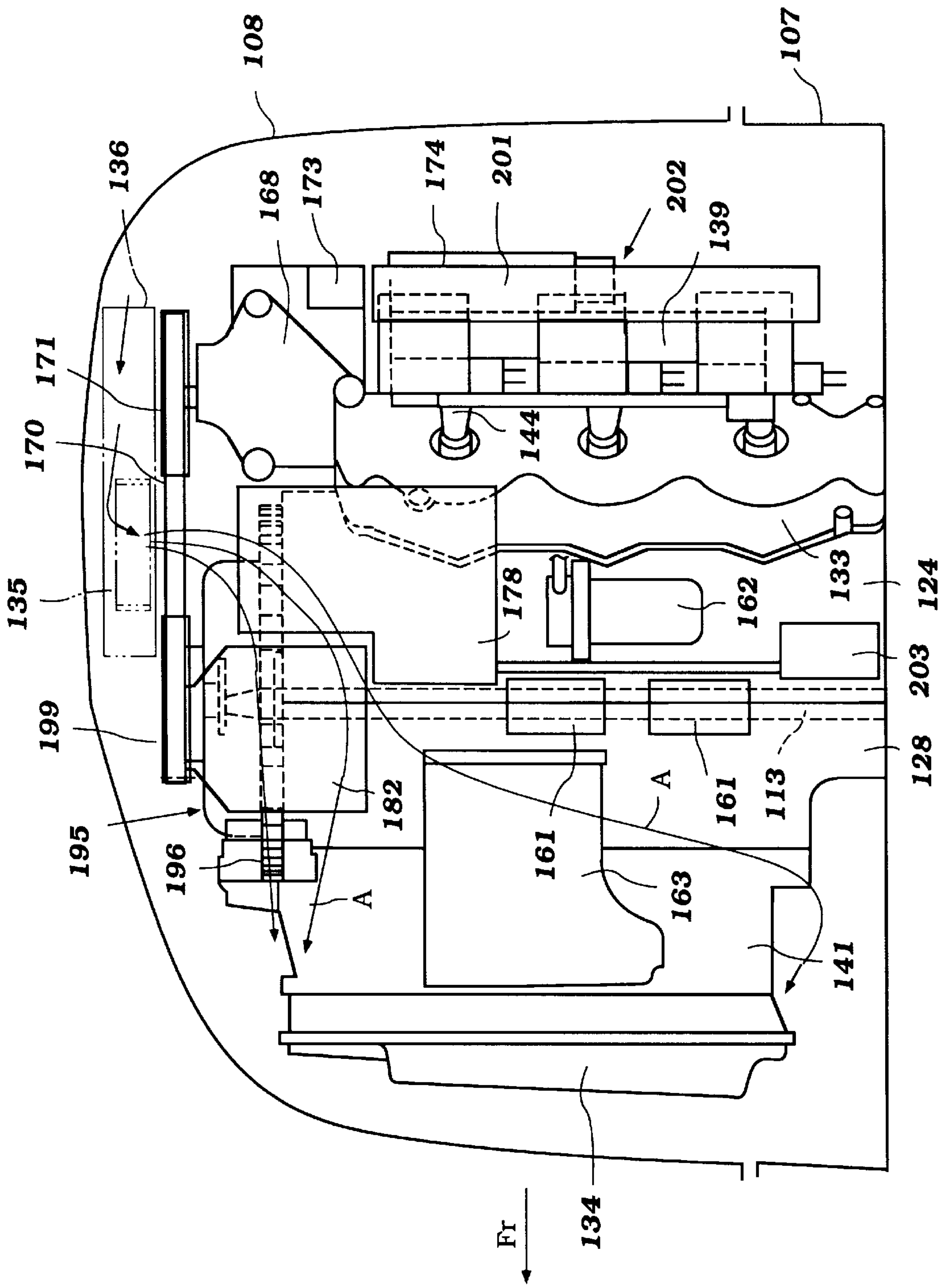
FIG. 28 is a right side elevational view, in part similar to FIGS. 4, 7, 10, 13, 16, 19, 22 and 25, for this tenth embodiment of the invention.
Figure 29:
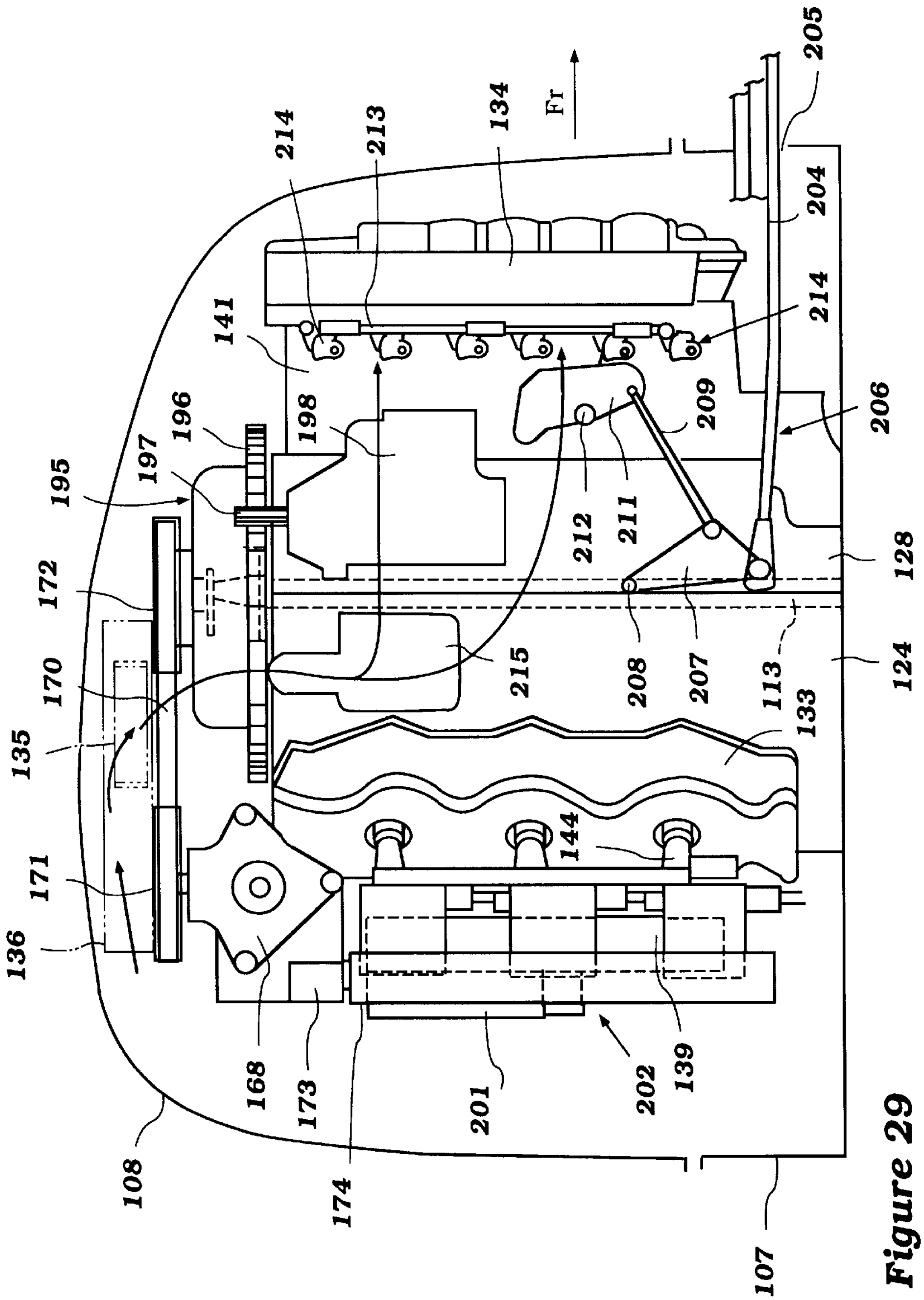
FIG. 29 is a view of the opposite side of this tenth embodiment and is in part similar to FIGS. 5, 8, 11, 14, 17, 20, 23 and 26.

Embodiment of FIGS. 27–29

This embodiment is basically similar to the embodiments of FIGS. 6–8 and 9–12 and differs from those embodiments only in the elements of the control unit 202 and the location of the fuel vapor separator 163. That is, with this embodiment, the starter motor 198 and the alternator 182 are still positioned on opposite sides of the intake manifold 141 and crankcase assembly 128 and the center line L.

In this embodiment, the fuel vapor separator 163 is positioned below the alternator 182. The control unit 202 including the ECU 139 and the fuel injector solenoid driver 201 are mounted as a unit below the main fuel manifold 173 and between the fuel rails 174. Again, this positions the components in a location where they will receive cooling air and are readily accessible for servicing.

Figure 30:
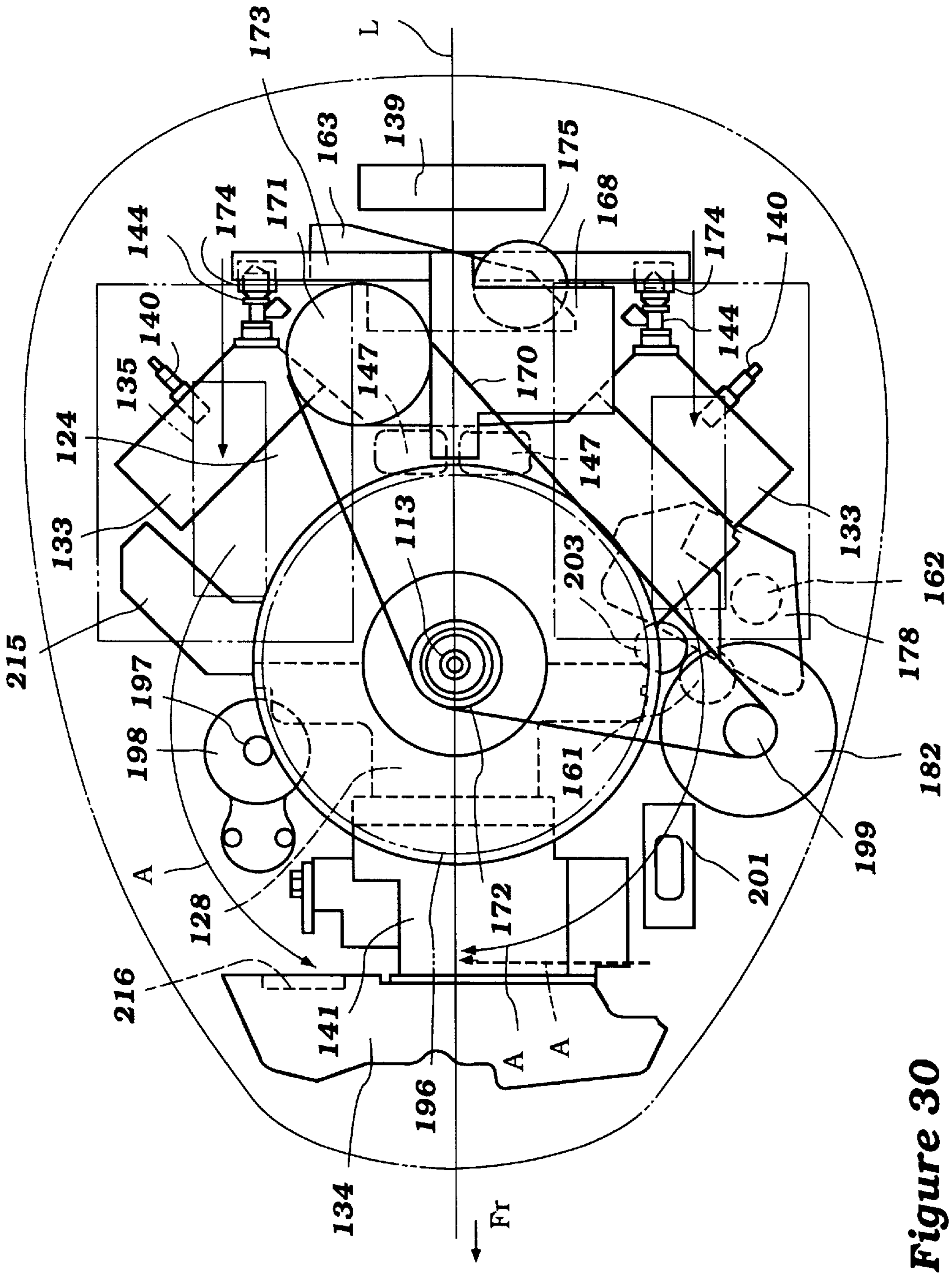
FIG. 30 is a top plain view, in part similar to FIGS. 3, 6, 9, 12, 15, 18, 21, 24 and 27, and shows an eleventh embodiment of the invention.
Figure 31:
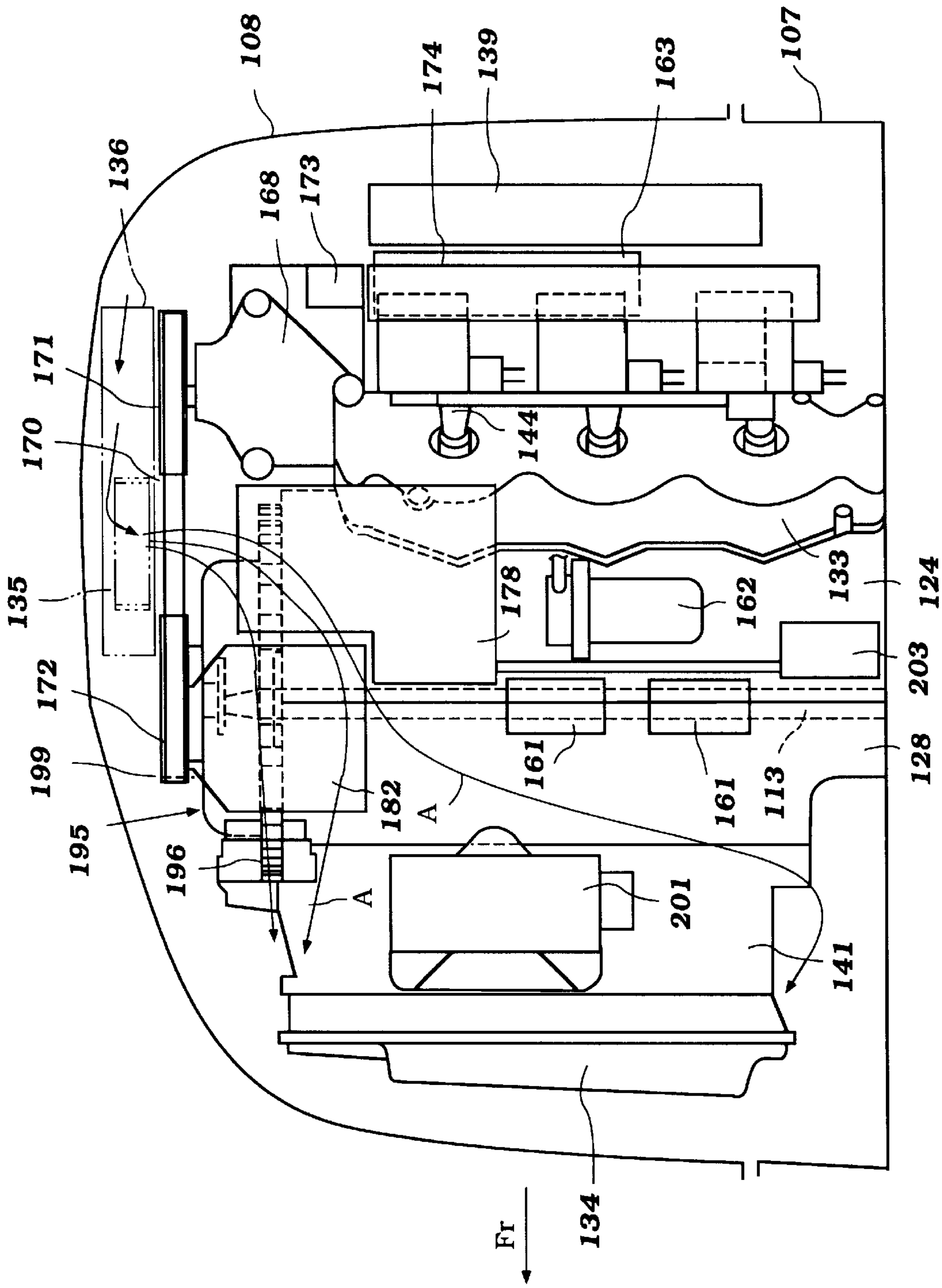
FIG. 31 is a right side elevational view, in part similar to FIGS. 4, 7, 10, 13, 16, 19, 22, 25 and 28, for this eleventh embodiment.
Figure 32:
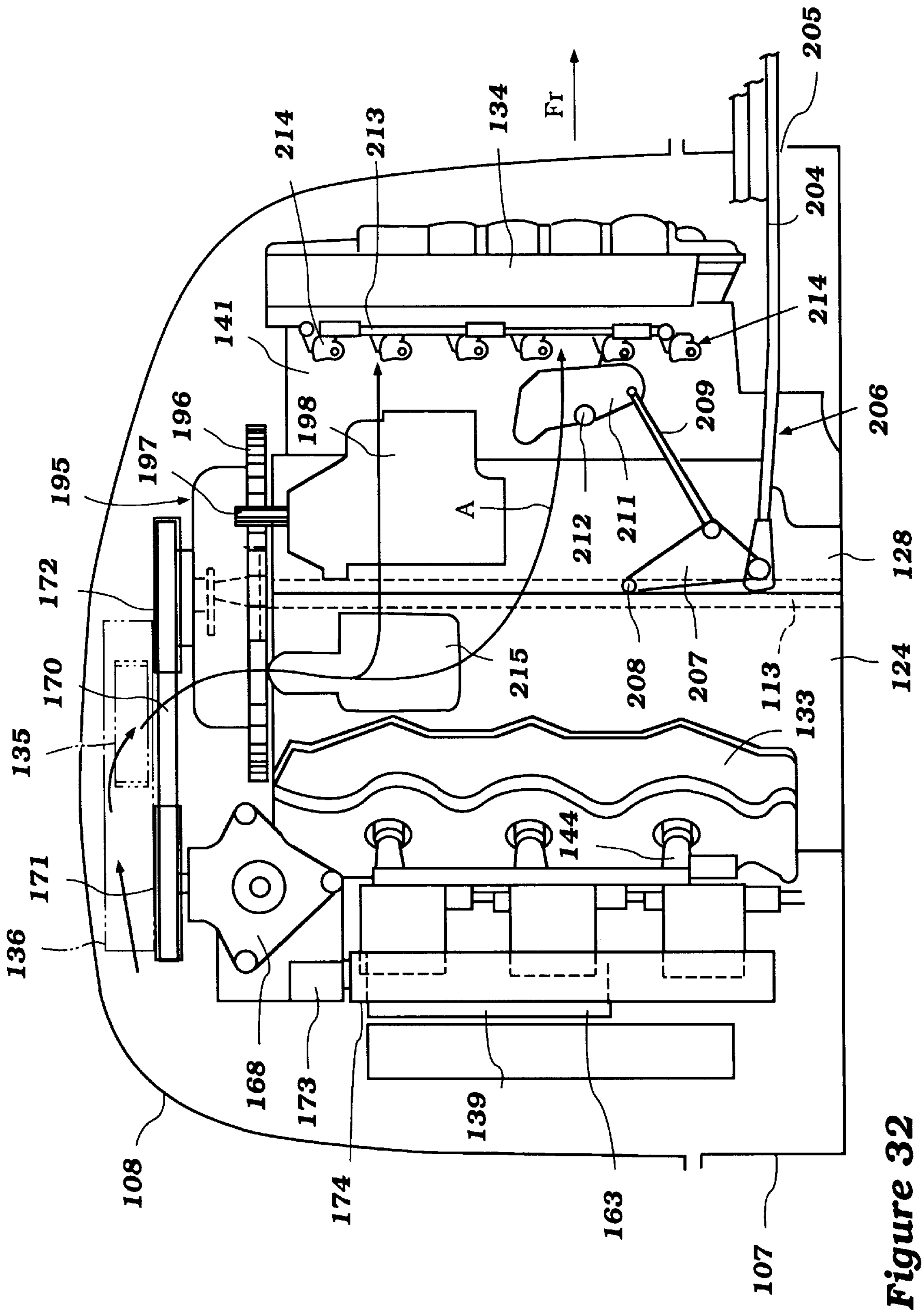
FIG. 32 is a side elevational view of the opposite side of this eleventh embodiment and is in part similar to FIGS. 5, 8, 11, 14, 17, 20, 23, 26 and 29.

Embodiment of FIGS. 30–32

This embodiment is generally similar to the embodiment of FIGS. 27–29. It differs from that embodiment in the positioning of only three components these being the vapor separator 163, the ECU 139 and the fuel injector solenoid driver 201.

In this embodiment, the vapor separator 163 is mounted in proximity to the remaining components of the fuel injection system. That is it is positioned below the main fuel manifold 173 and between the fuel rails 174.

The ECU 139 is mounted outwardly of it at the back end of the power head.

The fuel injector solenoid driver 201 is, on the other hand, mounted on one side of the intake manifold 141.

In all other regards, this embodiment is the same as those previously described and, for that reason, further description of it is not believed to be necessary to permit those skilled in the art to practice the invention.

Figure 33:
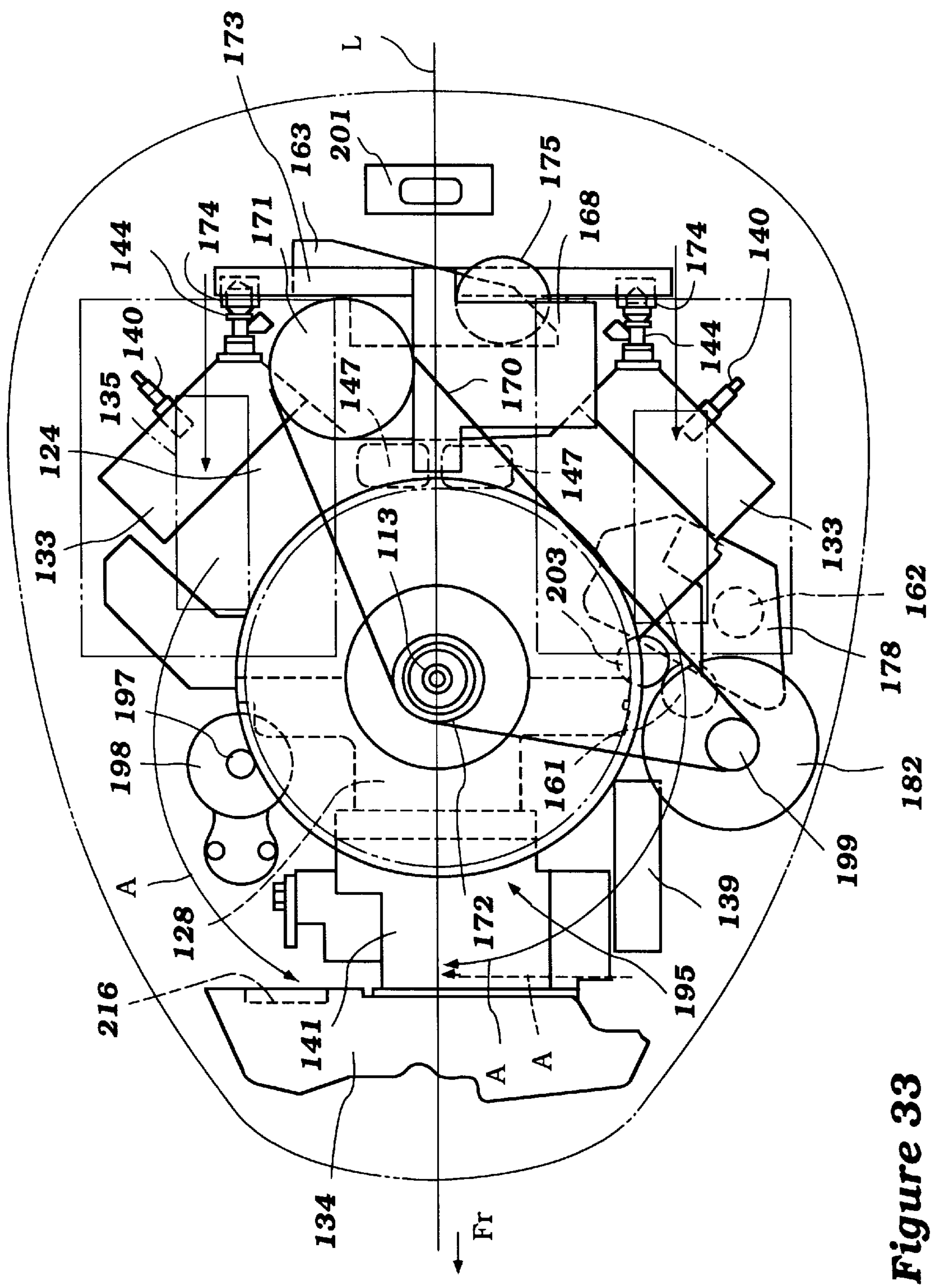
FIG. 33 is a top plan view, in part similar to FIGS. 3, 6, 9, 12, 15, 18, 21, 24, 27 and 30, and shows a twelfth embodiment of the invention.
Figure 34:
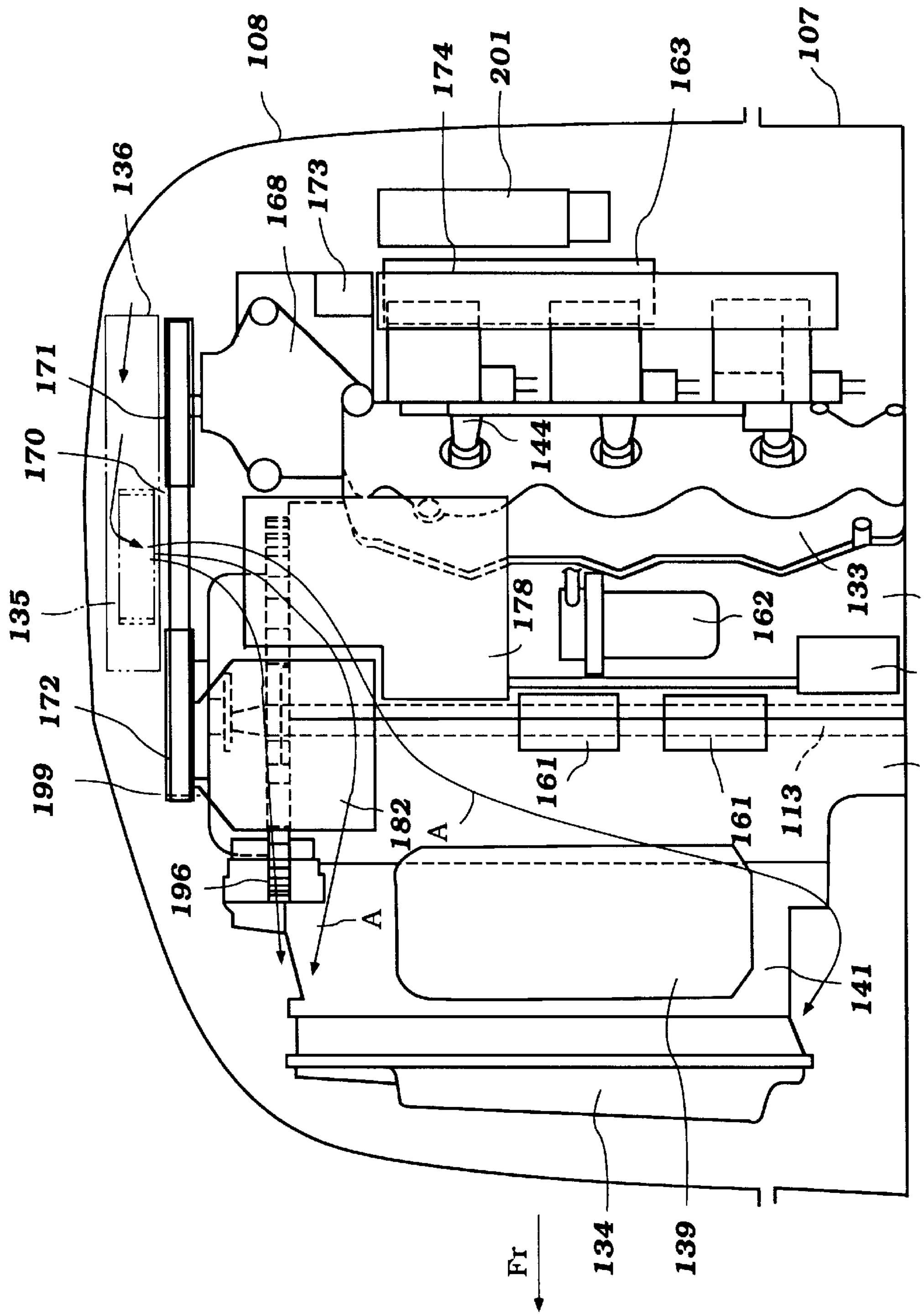
FIG. 34 is a right side elevational view of this twelfth embodiment of the invention and is in part similar to FIGS. 4, 7, 10, 13, 16, 19, 22, 25, 28 and 31.
Figure 35:
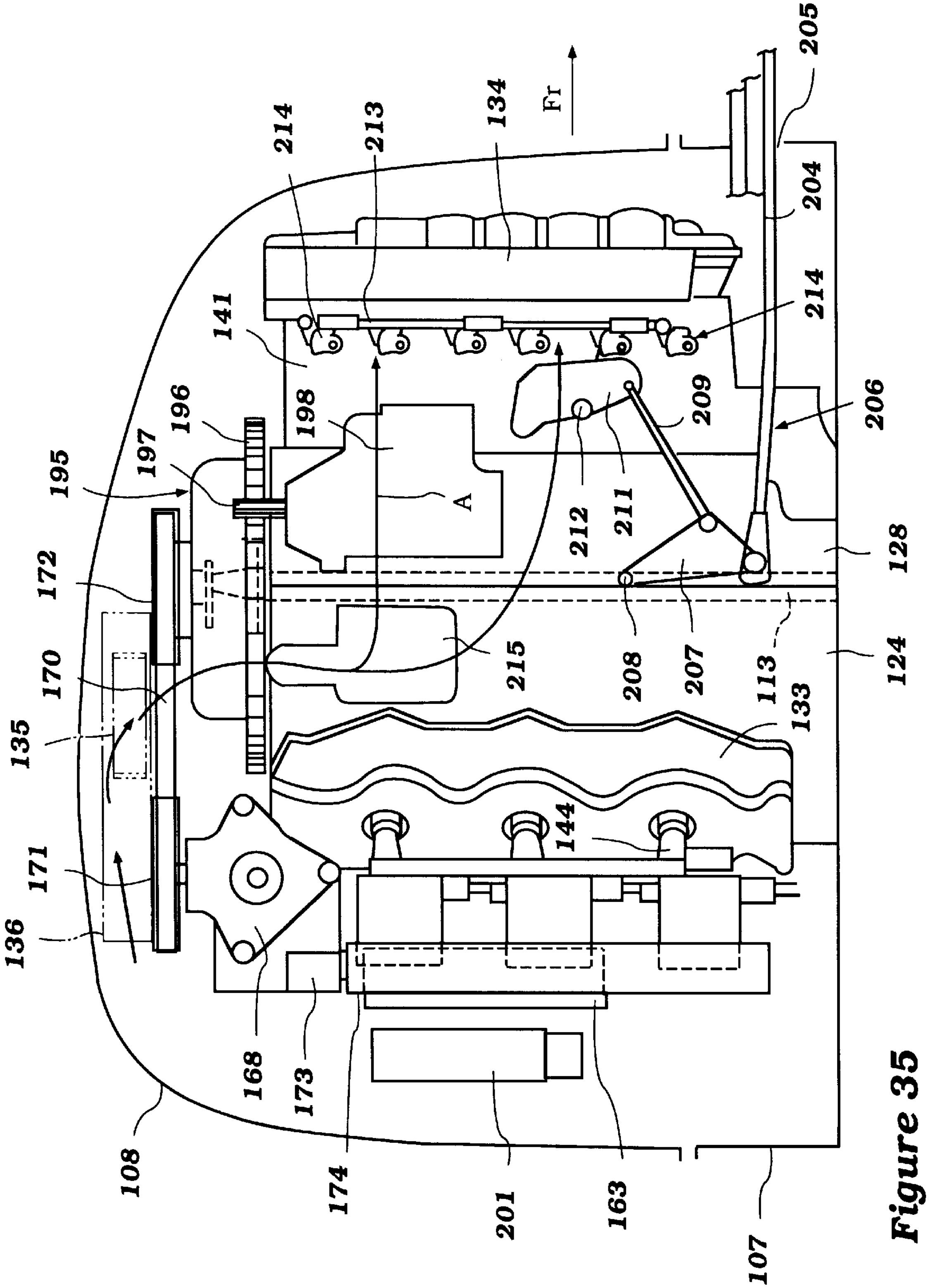
FIG. 35 is a side elevational view of the opposite side of this twelfth embodiment and is in part similar to FIGS. 5, 8, 11, 14, 17, 20, 23, 26, 29 and 32.

Embodiment of FIGS. 33–35

This embodiment is like the embodiments of FIGS. 27–29 and 30–32 and differs from those embodiments in the positioning of the vapor separator 163, the ECU 139, and the fuel injector solenoid driver 201. In this embodiment, like the embodiment of FIG. 30, the vapor separator 163 is mounted below the main fuel manifold 173 and between the fuel rails 174 in the area between the cylinder banks. The injector solenoid driver 201 is also mounted in this area to the rear of the vapor separator 163 and in proximity to the fuel injectors 144.

The ECU 139, on the other hand, is mounted in the area adjacent the intake manifold 141 where the engine will be cooler.

In all other regards, this embodiment is the same as those previously described and, therefore, further description of this embodiment is not believed to be necessary to permit those skilled in the art to practice the invention.

Figure 36:
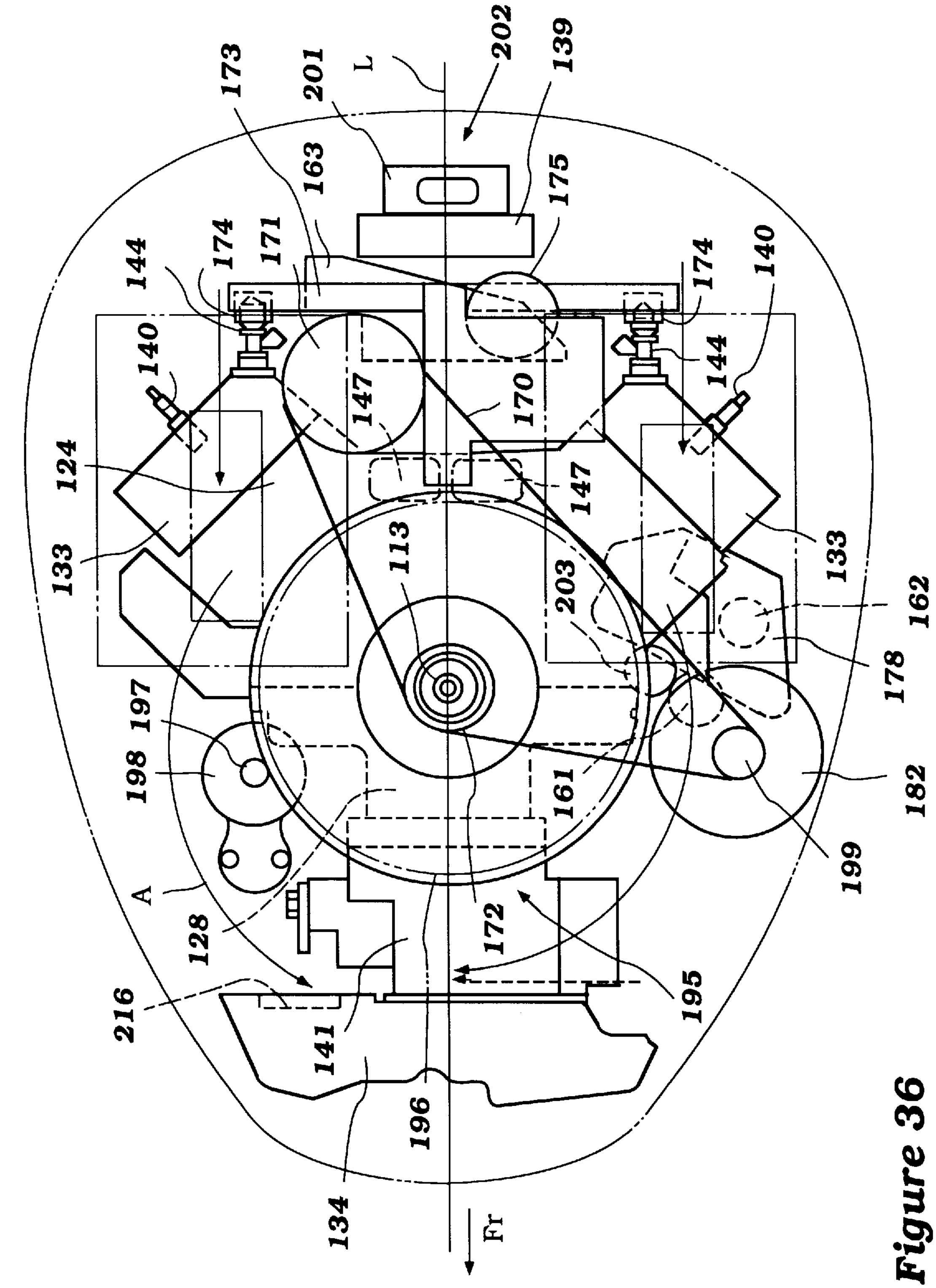
FIG. 36 is a top plan view, in part similar to FIGS. 3, 6, 9, 12, 15, 18, 21, 24, 27, 30 and 33, and shows a thirteenth embodiment of the invention.
Figure 37:
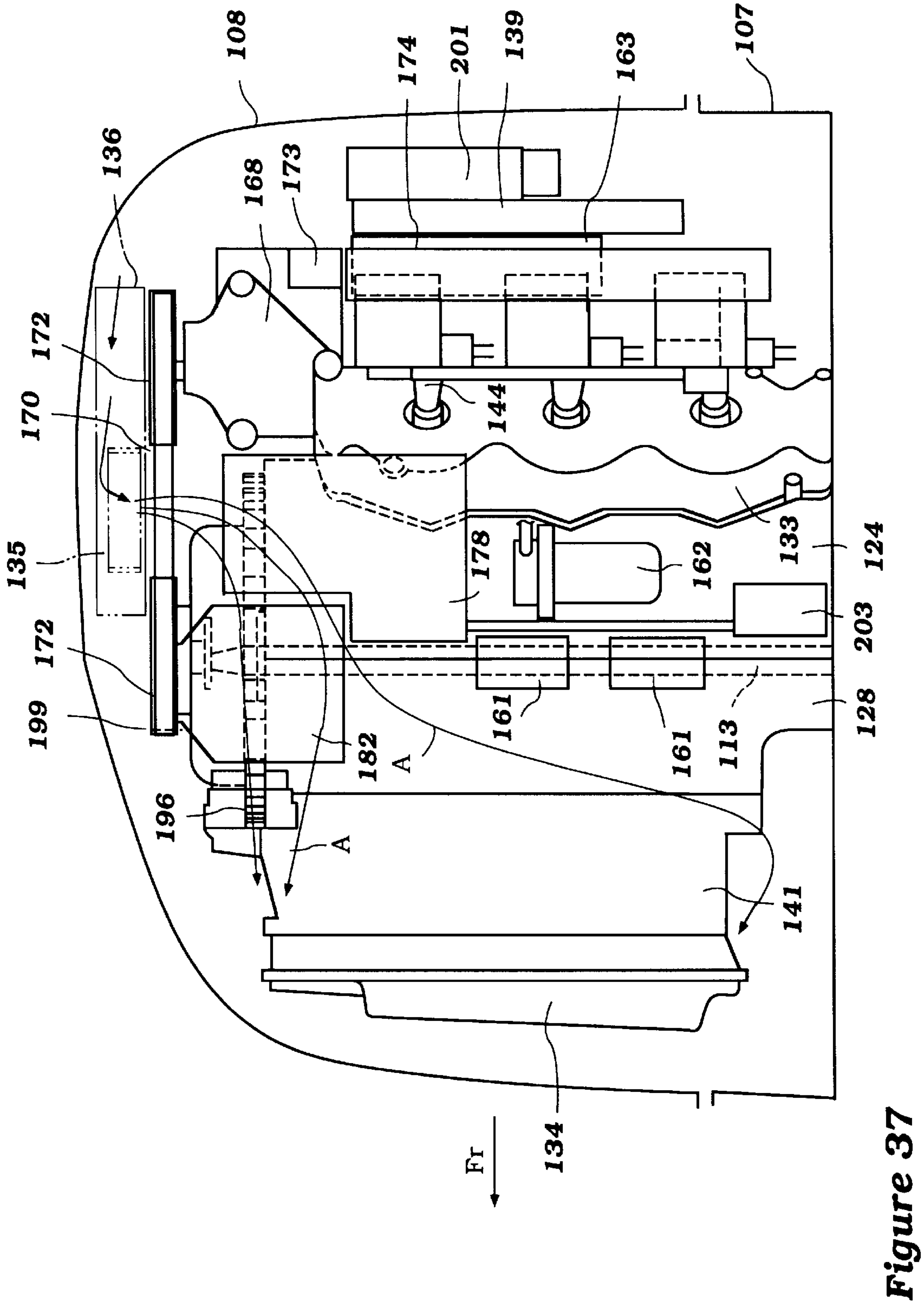
FIG. 37 is a right side elevational view of this thirteenth embodiment and is in part similar to FIGS. 4, 7, 10, 13, 16, 19, 22, 25, 28, 31 and 34.
Figure 38:
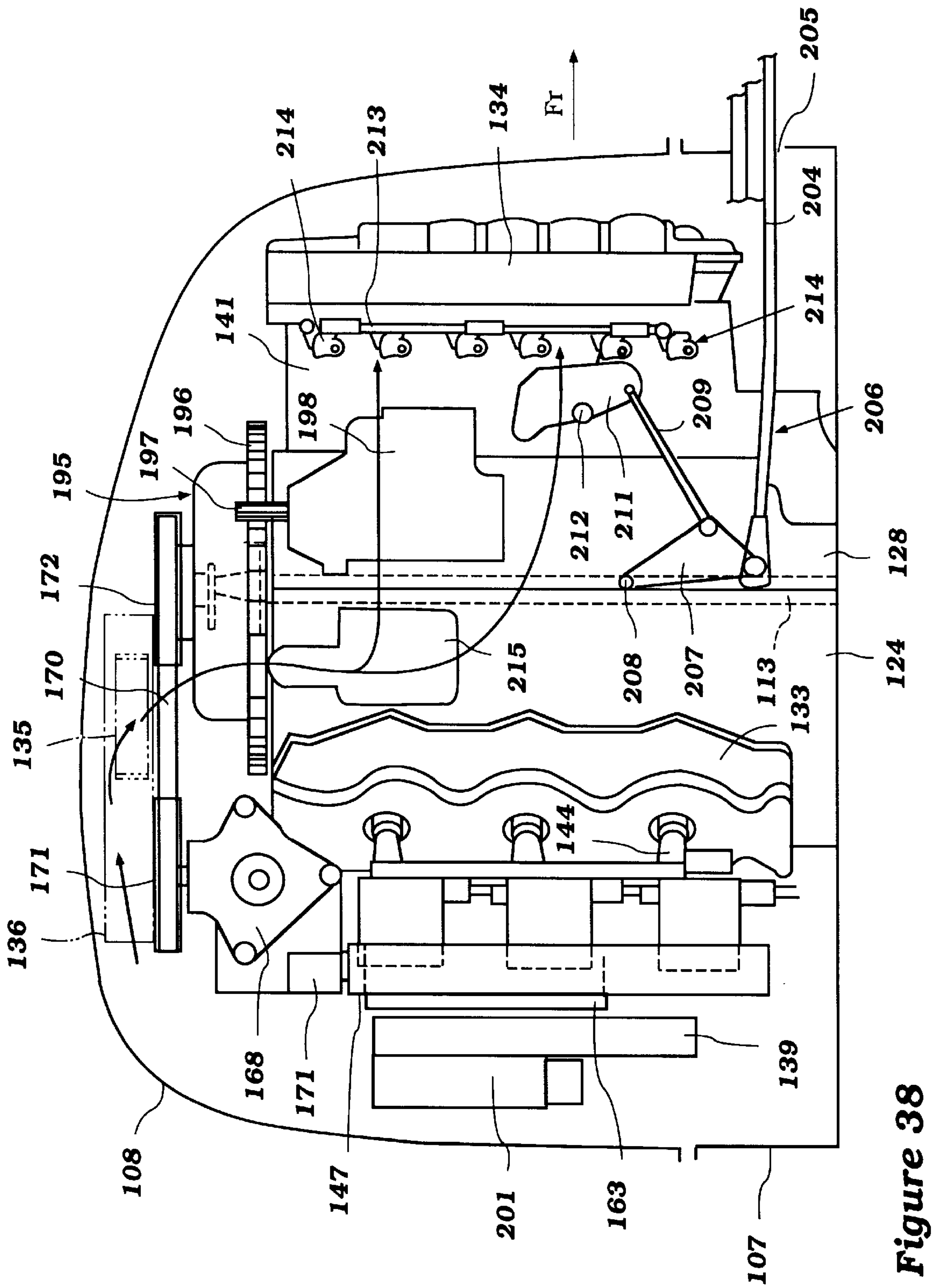
FIG. 38 is a side elevational view of the opposite side of this thirteenth embodiment and it is in part similar to FIGS. 5, 8, 11, 14, 17, 20, 23, 26, 29, 32 and 35.

Embodiment of FIGS. 36–38

This embodiment is like the embodiments of FIGS. 27–29, 30–32 and 33–35. Again, however, the location of the vapor separator 163, ECU 139 and fuel injector solenoid driver 201 are different.

In this embodiment, the vapor separator 163 is again positioned below the main fuel manifold 173 and between the fuel rails 174.

The ECU 139 and fuel injector solenoid driver 201 form the control unit 202 and are mounted as a unit adjacent to and rearwardly of the vapor separator 163.

In all other regards, this embodiment is the same as those previously described and, therefore, further description of this embodiment is not believed to be necessary to permit those skilled in the art to practice the invention.

Figure 39:
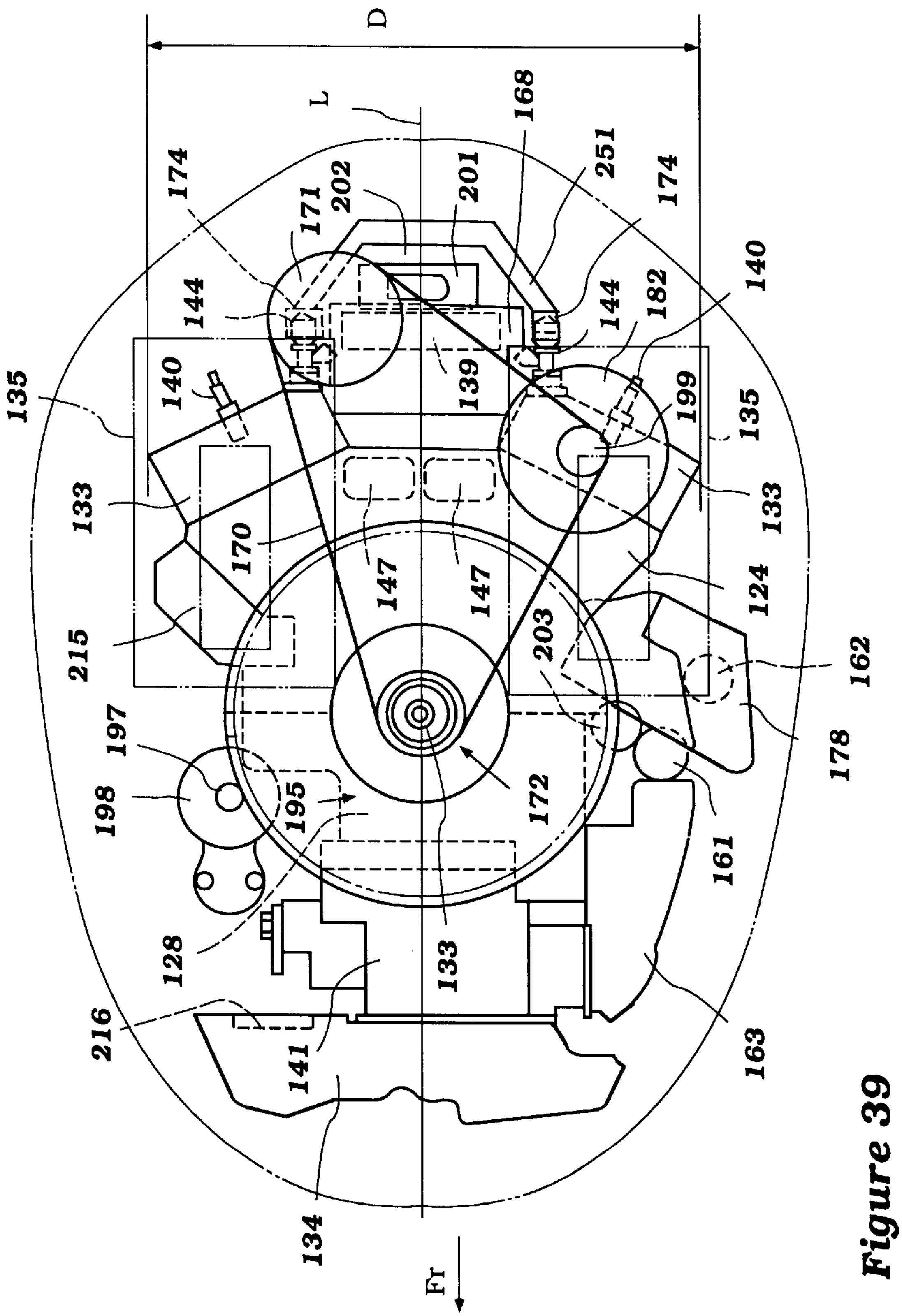
FIG. 39 is a top plan view, in part similar to FIGS. 3, 6, 9, 12, 15, 18, 21, 24, 27, 30, 33 and 36, and shows a fourteenth embodiment of the invention.
Figure 40:
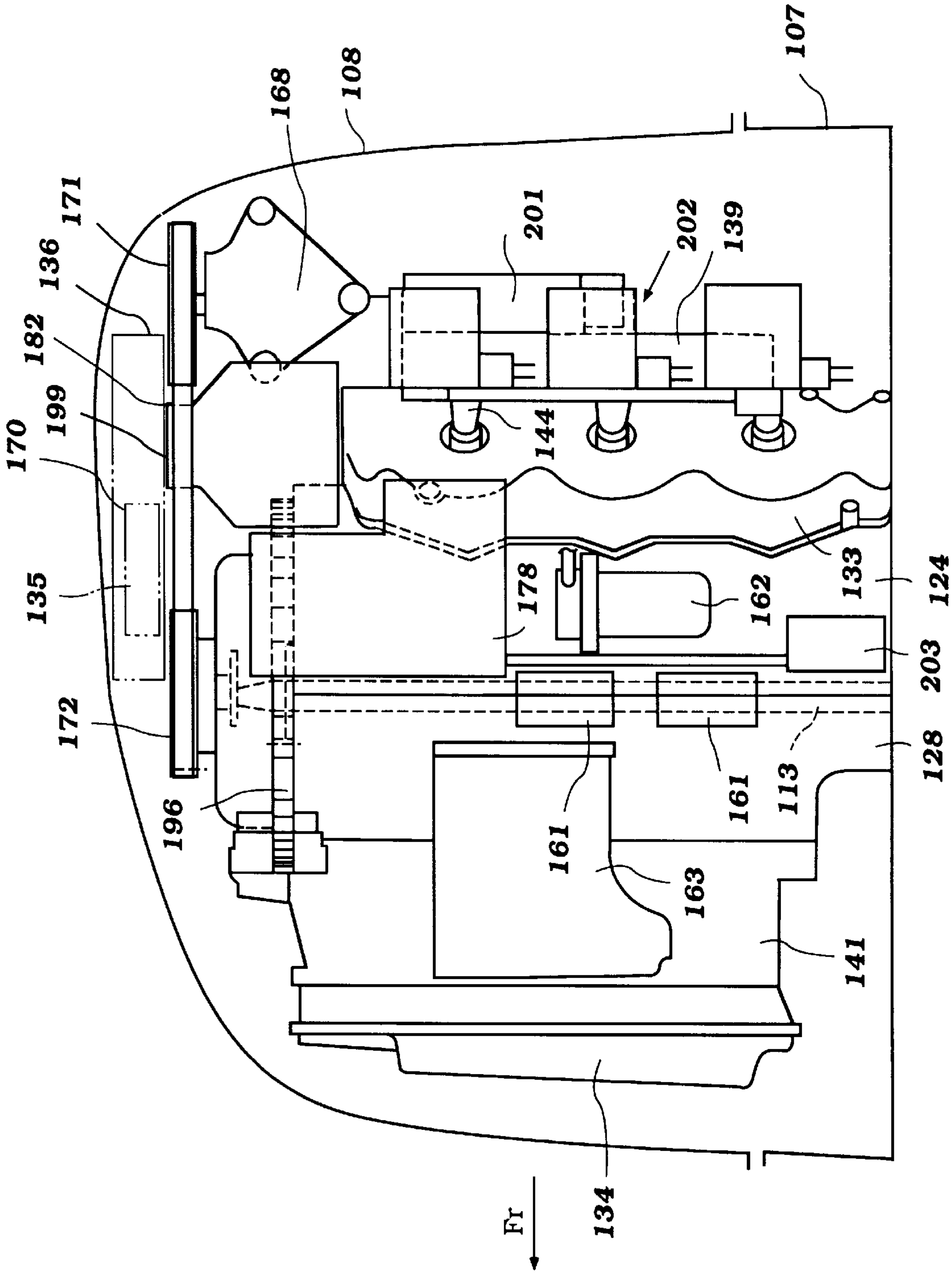
FIG. 40 is a right side elevational view of this fourteenth embodiment and is in part similar to FIGS. 4, 7, 10, 11, 16, 19, 22, 25, 28, 31, 34 and 37.
Figure 41:
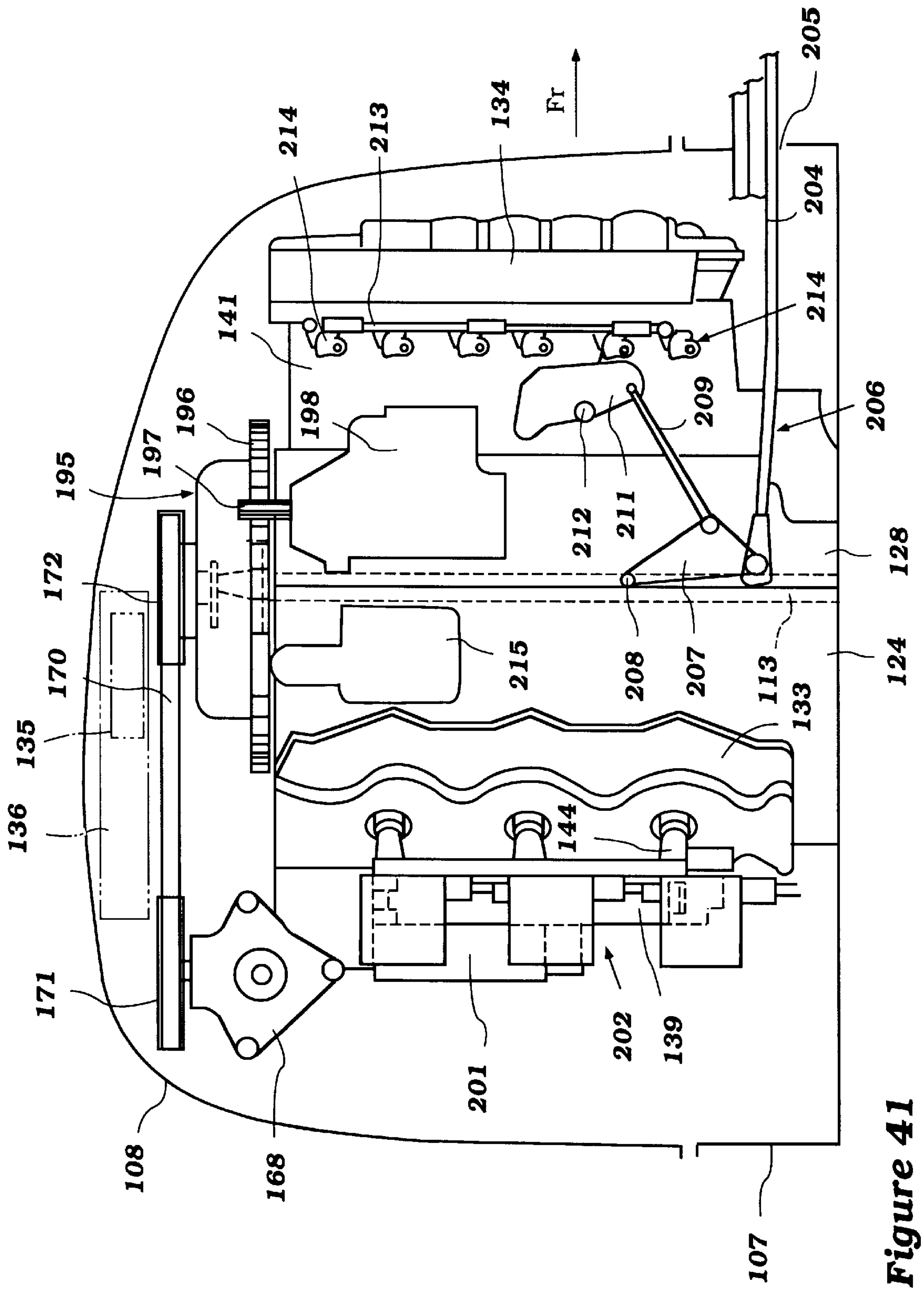
FIG. 41 is a side elevational view of the opposite side of this fourteenth embodiment and is in part similar to FIGS. 5, 8, 11, 14, 17, 20, 23, 26, 29, 32, 35 and 38.

Embodiment of FIGS. 39–41

This embodiment differs from all of the embodiments thus far described in that it employs a main fuel manifold which is of a slightly different configuration than those previously described. This fuel manifold, indicated by the reference numeral 251 has a somewhat V-shape and thus can extend rearwardly from the engine and connected at its opposite ends to the two fuel rails 174.

As a result of this positioning, the drive pulley 171 for the high pressure fuel injection pump 168 can be moved rearwardly further away from the incoming air flow. This permits the fuel injection pump 168 to be mounted at the upper portion of the V between the cylinder banks and slightly rearwardly of those previous embodiments.

In this embodiment, the various components including the starter motor 198, fuel vapor separator 163 and control unit 202 are positioned in the same locations as that of the embodiment of FIGS. 3–5. Therefore, further description of this embodiment is not believed to be necessary to permit those skilled in the art to practice the invention.

However, as shown in FIG. 39, this other form of fuel manifold and arrangement permits all of the components of the fuel injection system to lie within a dimension D which is confined inwardly between the outer periphery of the engine as defined by the outer peripheral edges of the cylinder head assemblies 133. Thus, the power head may be kept quite narrow in this arrangement.

Figure 42:
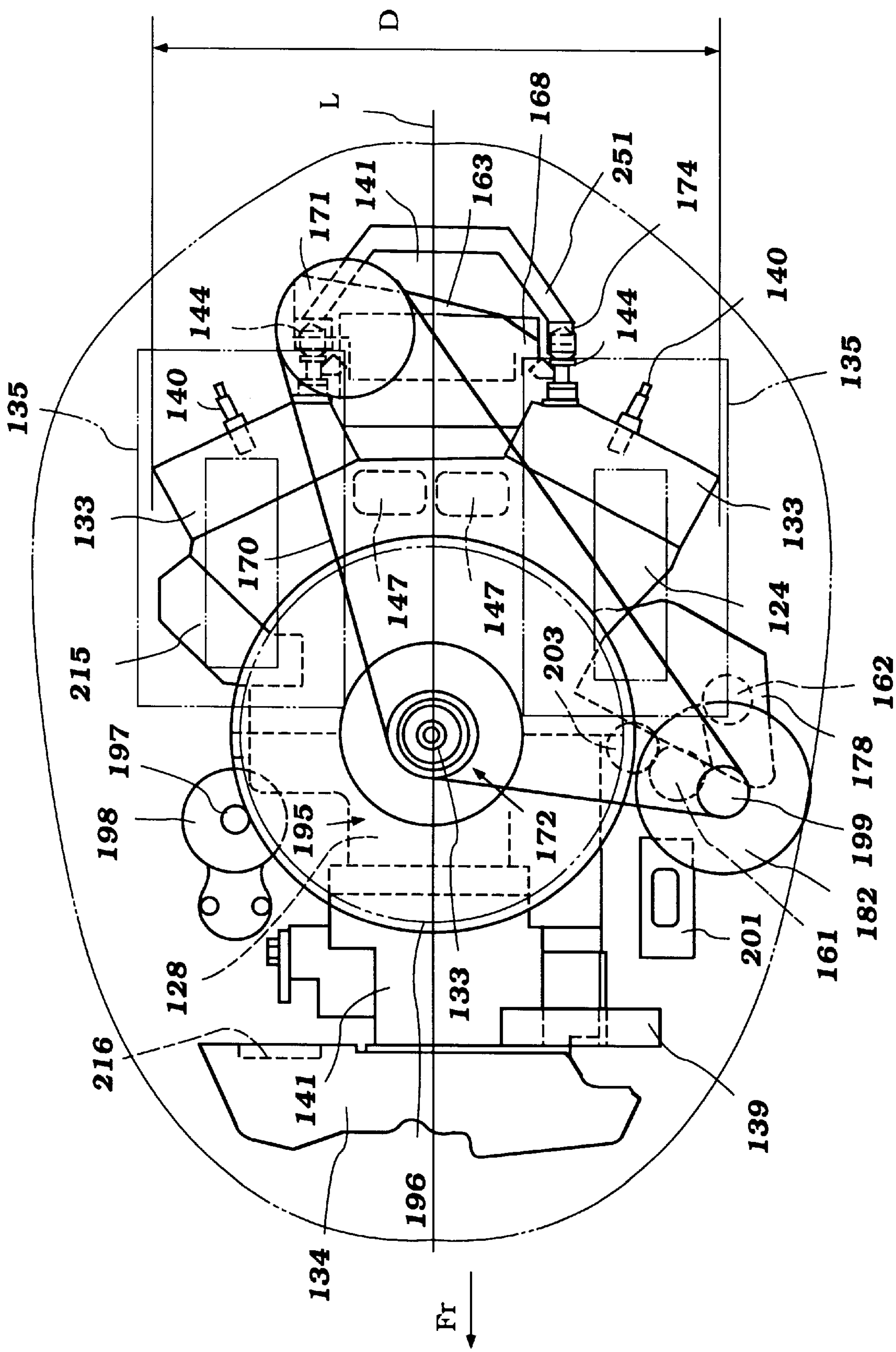
FIG. 42 is a top plan view, in part similar to FIGS. 3, 6, 9, 12, 15, 18, 21, 24, 27, 30, 33, 36 and 39, and shows a fifteenth embodiment of the invention.
Figure 43:
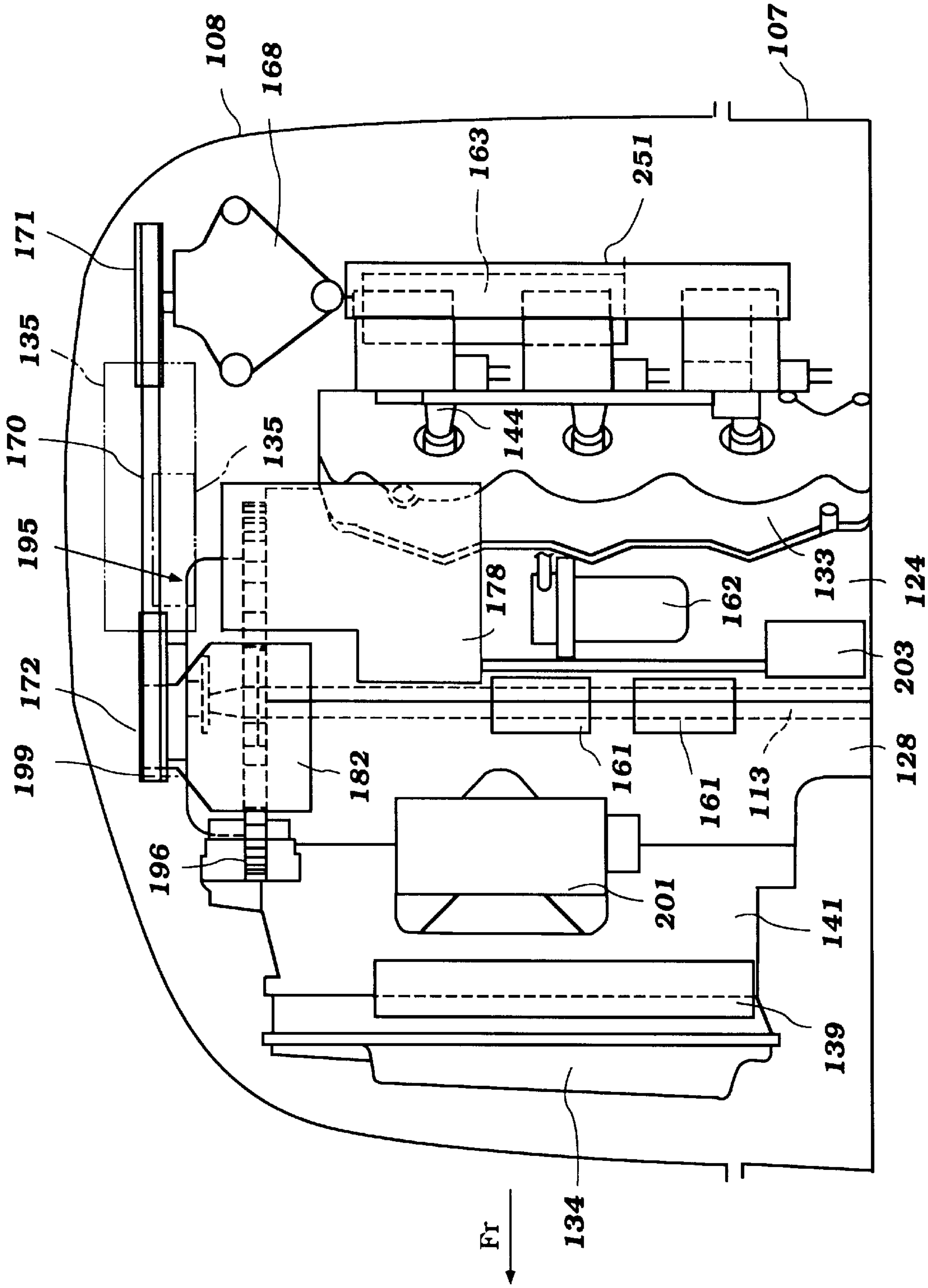
FIG. 43 is a right side elevational view of this fifteenth embodiment of the invention and is in part similar to FIGS. 4, 7, 10, 13, 16, 19, 22, 25, 28, 31, 34, 37 and 40.
Figure 44:
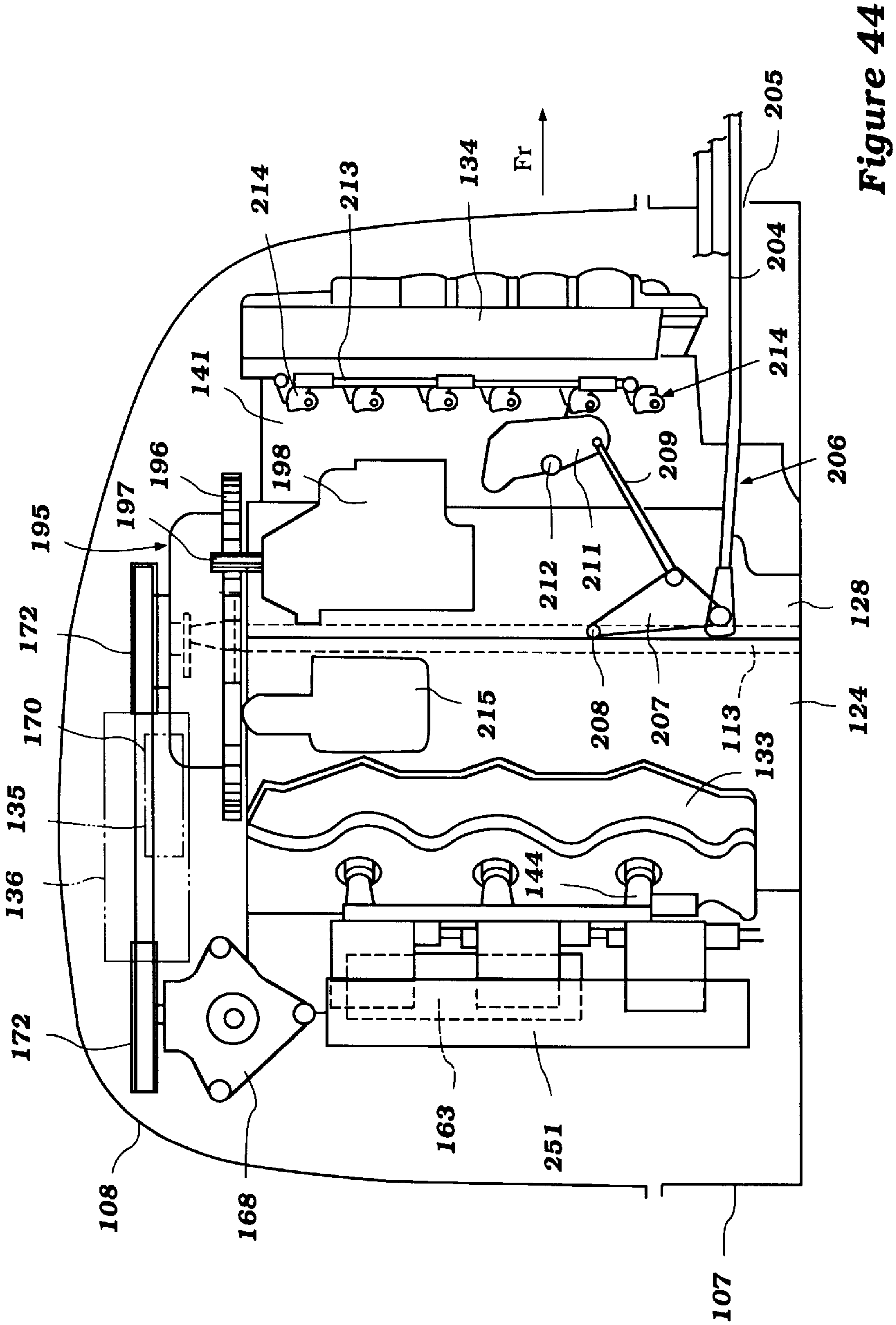
FIG. 44 is a side elevational view of the opposite side of this fifteenth embodiment of the invention and is in part similar to FIGS. 5, 8, 11, 14, 17, 20, 23, 26, 29, 32, 35, 38 and 41.

Embodiment of FIGS. 42–44

This embodiment uses the main fuel manifold configuration as shown in FIGS. 39–41 and hence the fuel manifold 251 has been identified by the same reference numeral. In addition, in this embodiment, the alternator 182 and its drive pulley 192 are positioned on one side of the intake manifold 141 and crankcase assembly 128 and spaced from the cylinder head assembly 133. This opens up a greater space to the rear of the engine and permits a greater airflow across the components to be cooled but not over the high pressure fuel injection pump 168.

In this embodiment, the ECU 139 is mounted on the rear of the air inlet device 134 while the fuel injector solenoid driver 201 is positioned contiguous to it but on one side of the intake manifold 141.

The remaining components are in the same locations as the embodiment of FIGS. 39–41 and thus further description of these components and their location is not believed to be necessary to permit those skilled in the art to practice the invention.

Figure 45:
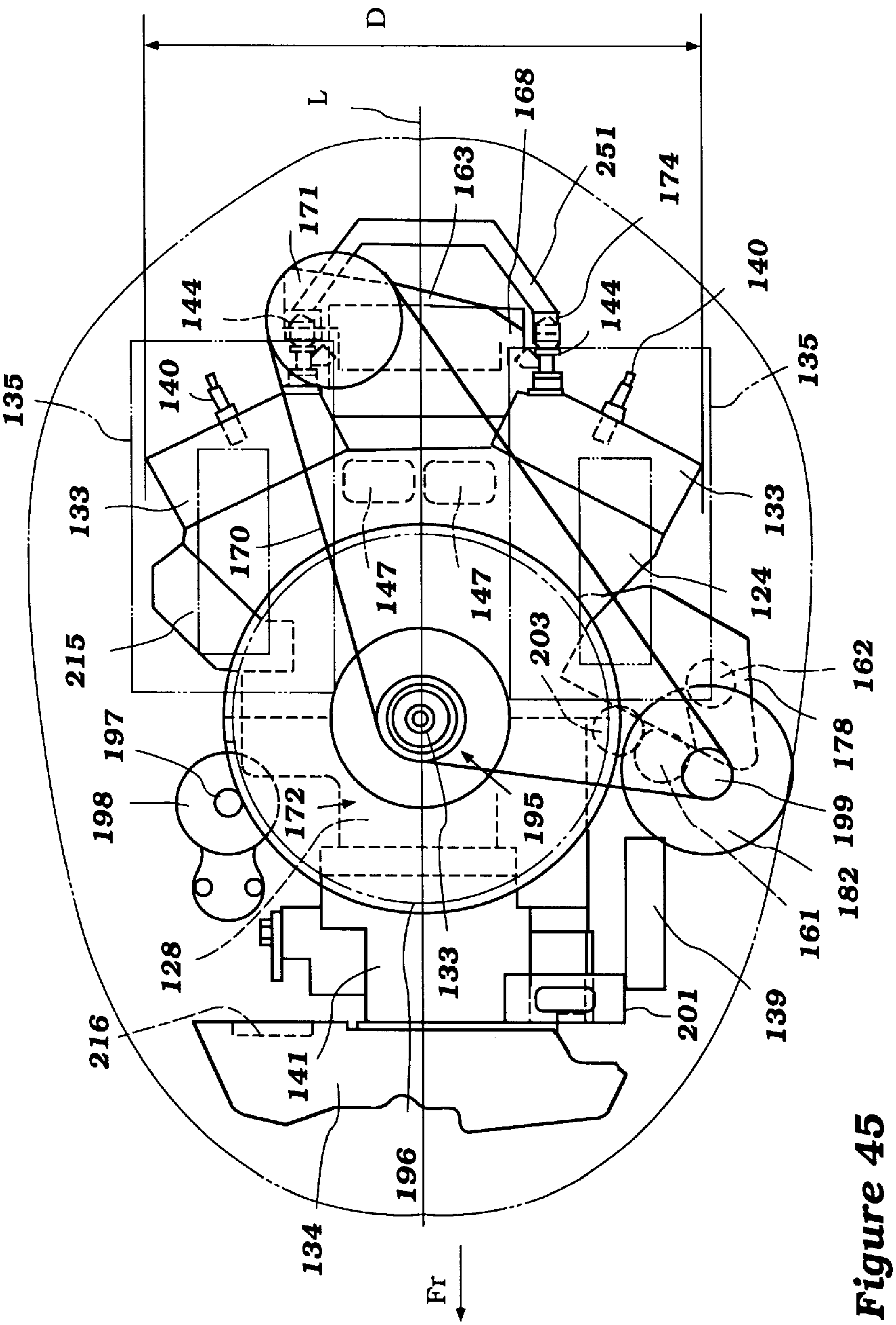
FIG. 45 is a top plan view, in part similar to FIGS. 3, 6, 9, 12, 15, 18, 21, 24, 27, 30, 33, 36, 39 and 42, and shows a sixteenth embodiment of the invention.
Figure 46:
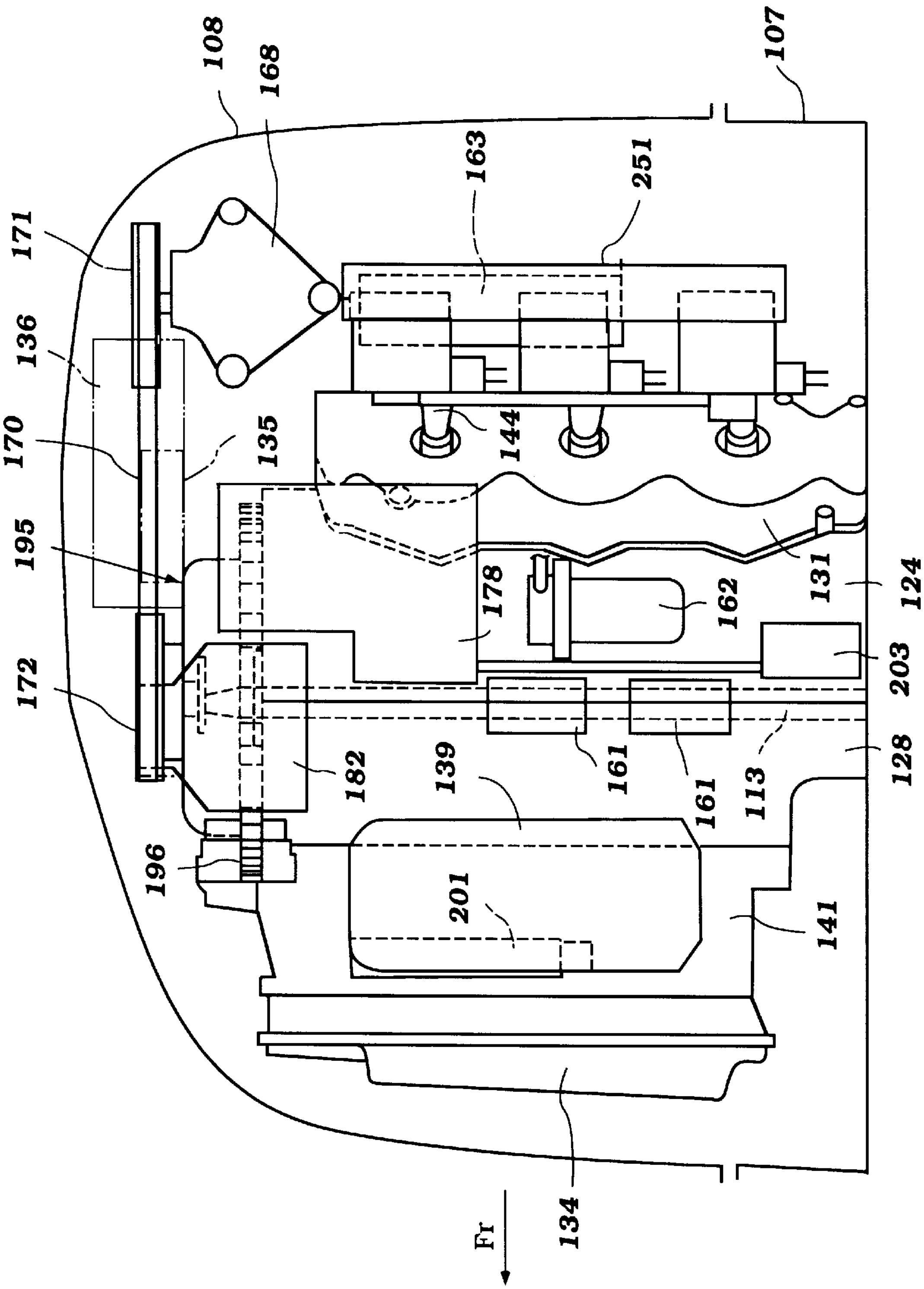
FIG. 46 is a right side elevational view of this sixteenth embodiment of the invention and is in part similar to FIGS. 4, 7, 10, 13, 16, 19, 22, 25, 28, 31, 34, 37, 40 and 43.
Figure 47:
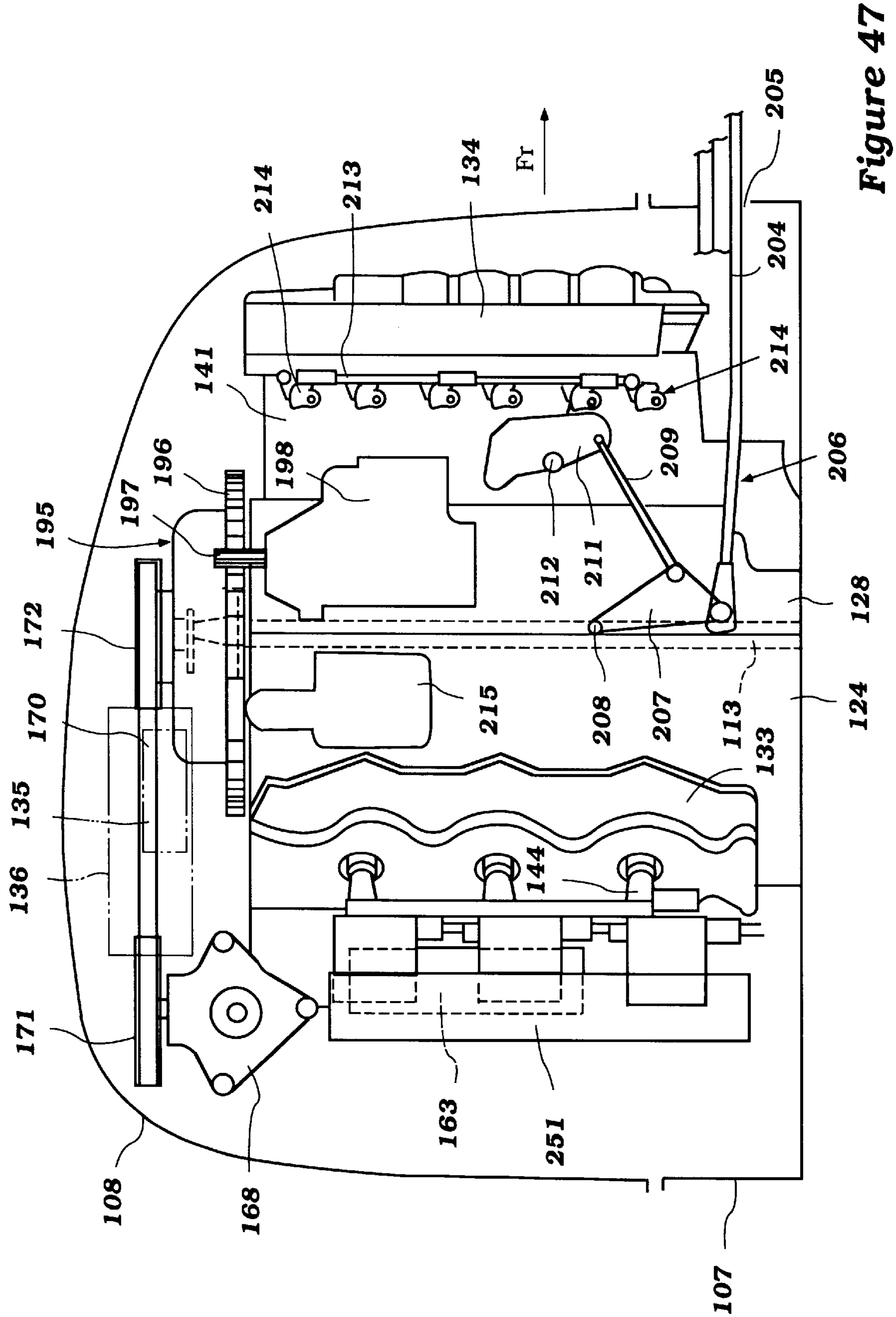
FIG. 47 is a side elevational view of the opposite side of this sixteenth embodiment of the invention and is in part similar to FIGS. 5, 8, 11, 14, 17, 20, 23, 26, 29, 32, 35, 38, 41 and 44.

Embodiment of FIGS. 45–47

This embodiment uses a drive arrangement for the high pressure fuel pump 168 and the alternator 182 as in the embodiment of FIGS. 42–44. Therefore, discussion of these components is not believed to be necessary to those skilled in the art to practice the invention of this embodiment. This embodiment differs from the embodiment of FIGS. 42–44 in the positioning of the components of the control unit. In this embodiment, the fuel injector solenoid driver 201 is mounted on the backside of the air inlet/air silencer device 134. The ECU 139 is mounted contiguous to it and on the side of the intake manifold 141. In all other regards, this embodiment is the same as that of FIGS. 42–44 and, therefore, further description of this embodiment is not believed to be necessary to permit those skilled in the art to practice the invention.

Figure 48:
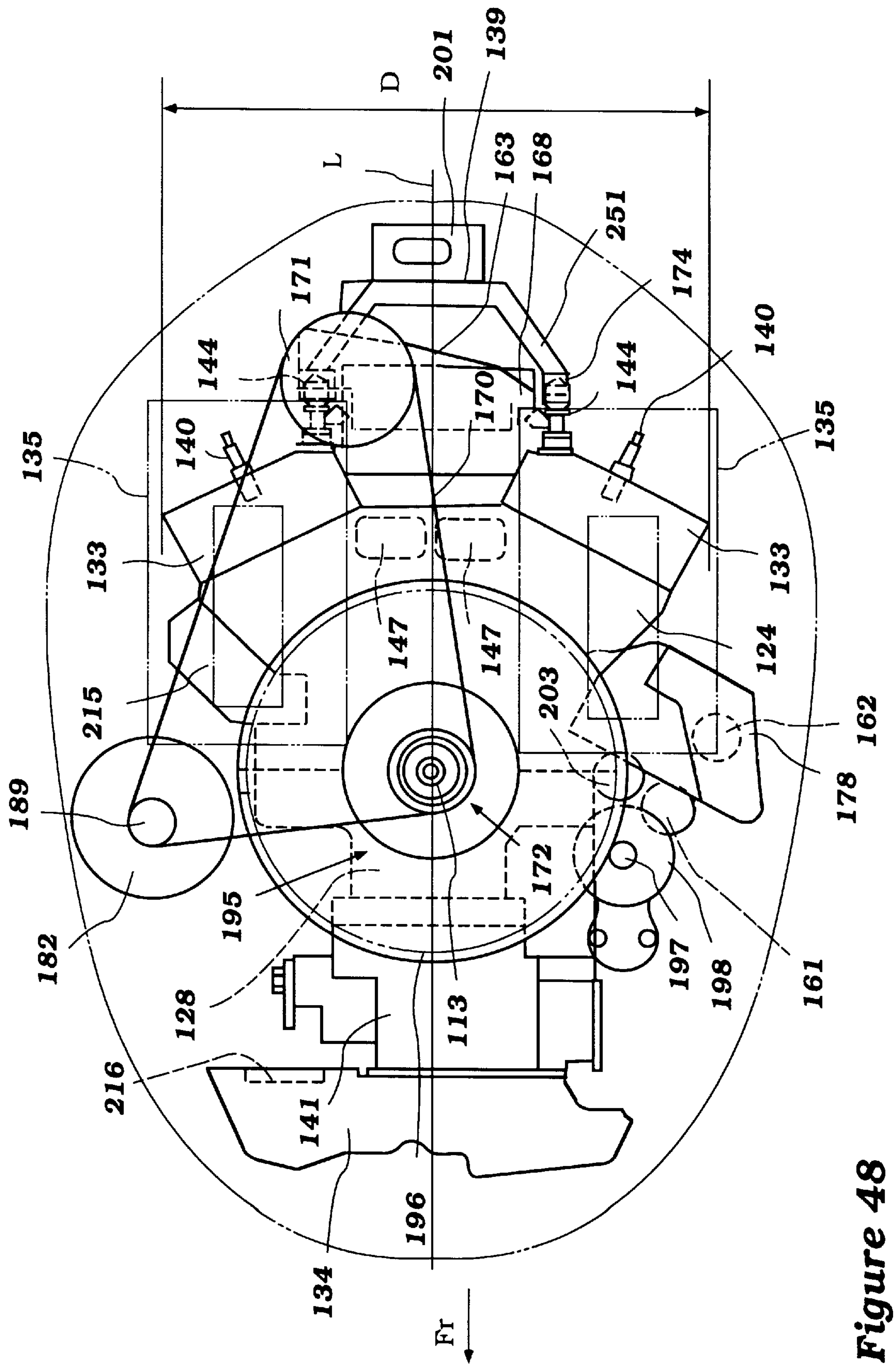
FIG. 48 is a top plan view, in part similar to FIGS. 3, 6, 9, 12, 15, 18, 21, 24, 27, 30, 33, 36, 39, 42 and 45, and shows a seventeenth embodiment of the invention.
Figure 49:
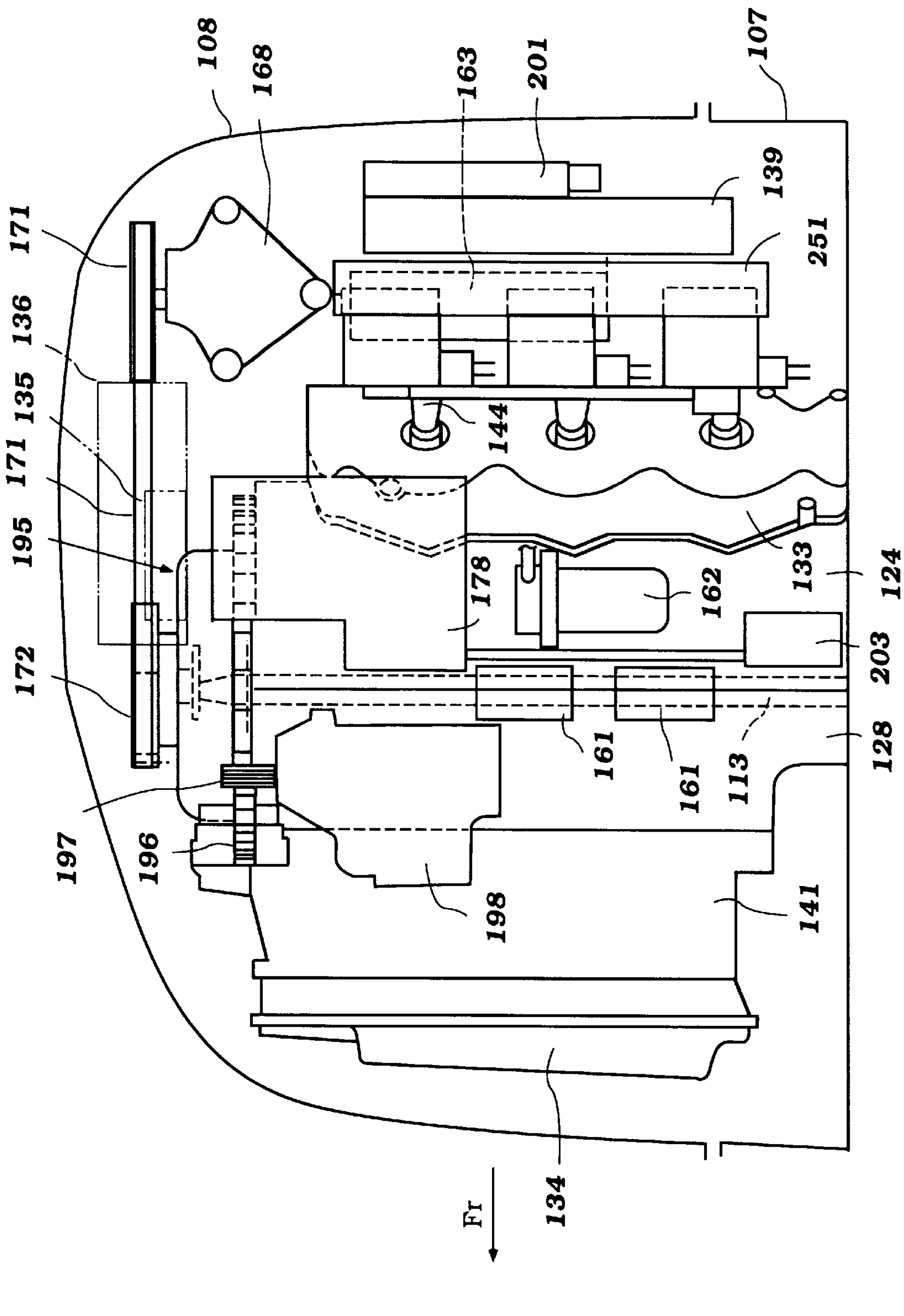
FIG. 49 is a right side elevational view of this seventeenth embodiment of and is in part similar to FIGS. 4, 7, 10, 13, 16, 19, 22, 25, 28, 31, 32, 37, 40, 43 and 46.
Figure 50:
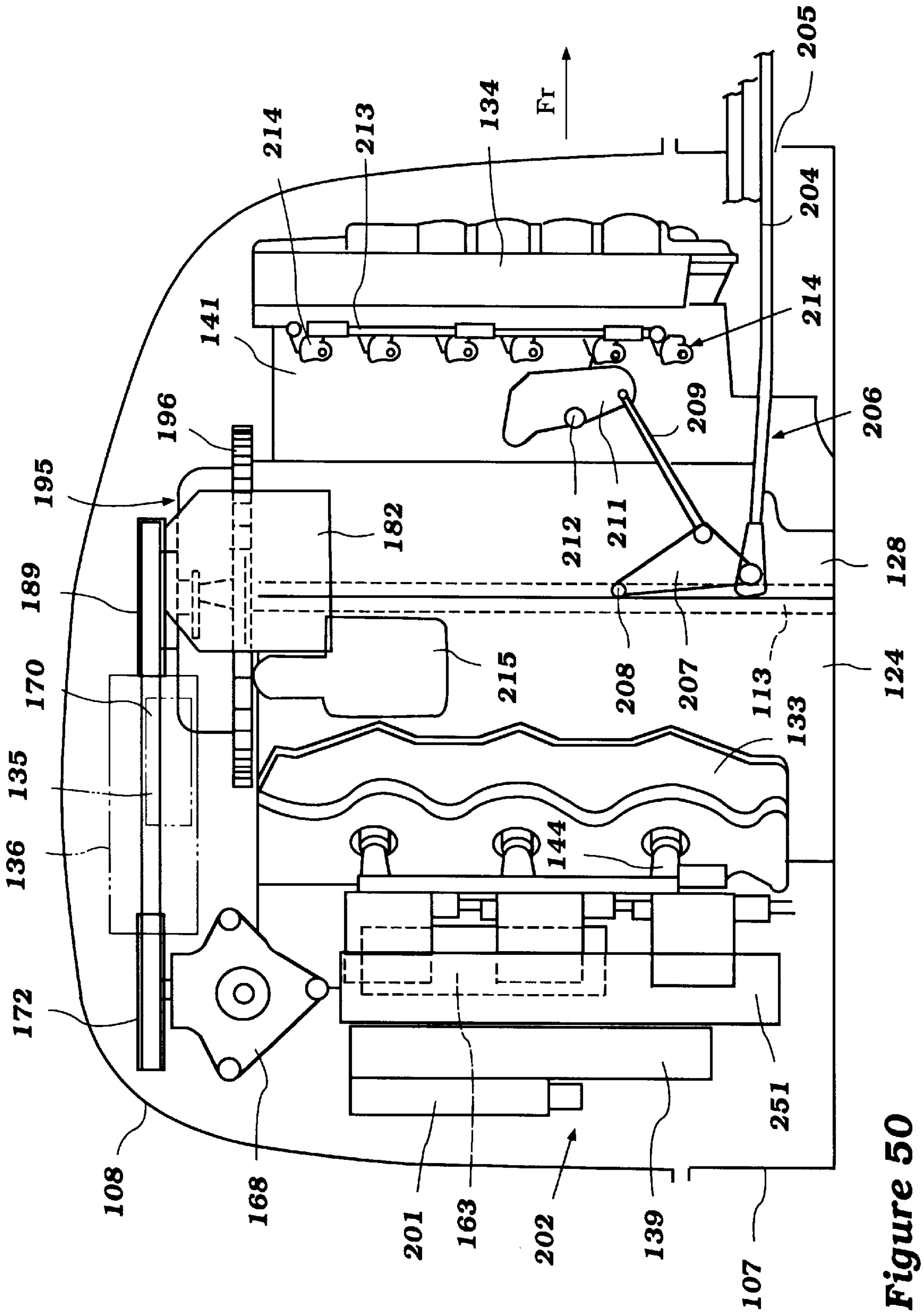
FIG. 50 is a side elevational view of the opposite side of this seventeenth embodiment and is in part similar to FIGS. 5, 8, 11, 14, 17, 20, 23, 26, 29, 32, 35, 38, 41, 44 and 47.

Embodiment of FIGS. 48–50

This embodiment employs a main fuel manifold 251 like the embodiments of FIGS. 39–41 and 42–44 and 45–47. However, the positioning of the alternator 182 relative to the high pressure fuel injection pump 168 is similar to the embodiment of FIGS. 15–17 and reference may be had to that figure for the description of these drives and locations.

With this embodiment, however, the vapor separator 163 is mounted in the area between the fuel rails 174 and the control unit 202 comprised of the ECU 139 and the fuel injector solenoid driver 201 is disposed to the rear of the vapor separator 168. The remaining components of this embodiment are located as in the embodiment of FIGS. 15–17 and, for that reason, these components will not be described again.

Embodiment of FIGS. 51–55

This embodiment is generally similar to the embodiment of FIGS. 48–50. It differs from that embodiment in the location of the control unit 202 and specifically the components of it. In this embodiment, the ECU 139 is still mounted in the valley between the cylinder heads to the rear of the fuel/vapor separator 163. However, the fuel injector solenoid driver 201 is located forwardly and on one side of the intake manifold 141 to separate this element from the other elements of the control unit and also to place it in a less highly heated area around the engine.

Figure 54:
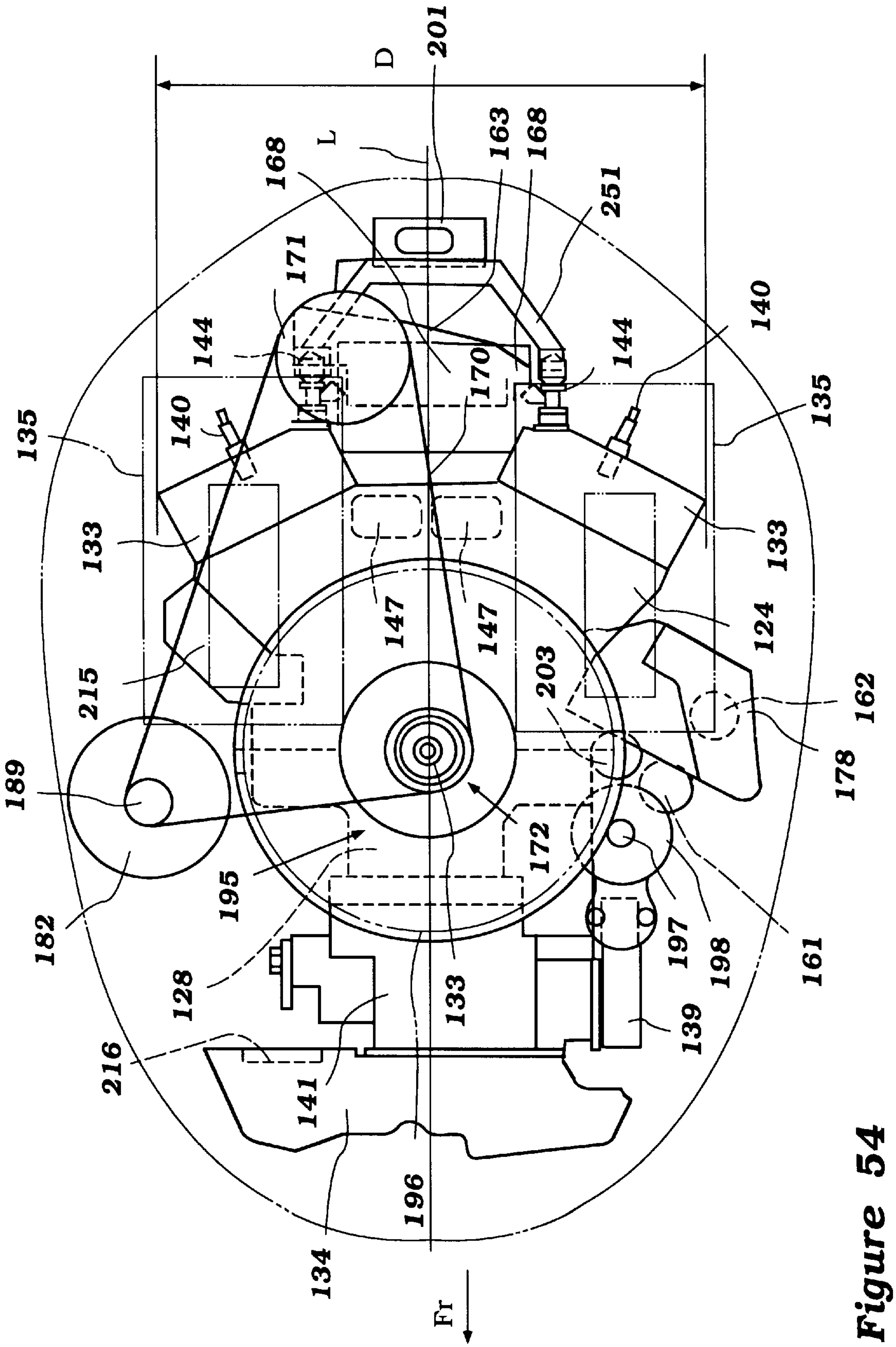
FIG. 54 is a top plan view, in part similar to FIGS. 3, 6, 9, 12, 15, 18, 21, 24, 27, 30, 33, 36, 39, 42, 45, 48 and 51, and shows a nineteenth embodiment of the invention.
Figure 55:
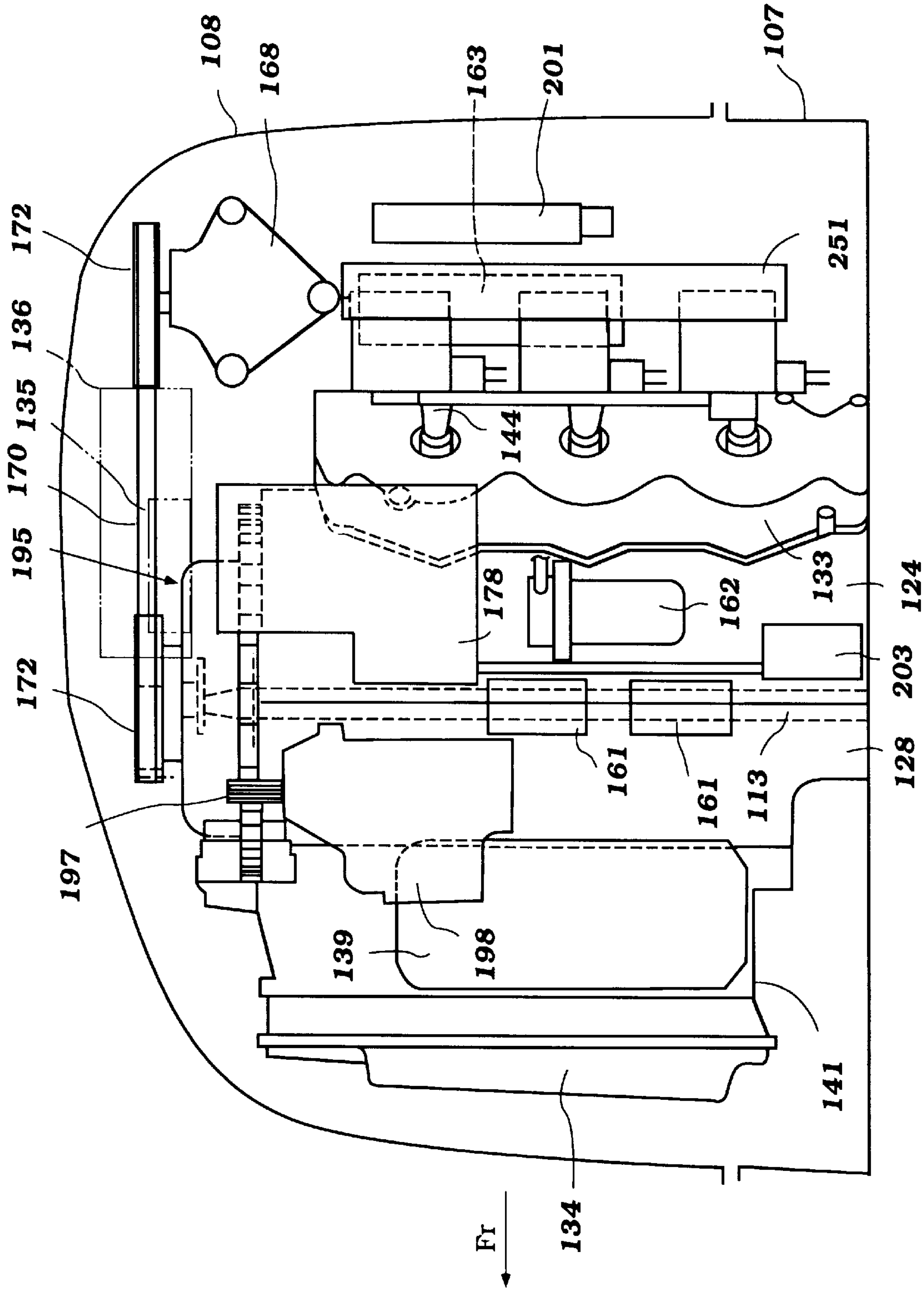
FIG. 55 is a right side elevational view of this nineteenth embodiment and is in part similar to FIGS. 4, 7, 10, 13, 16, 19, 22, 25, 28, 31, 34, 37, 40, 43, 46, 49 and 52.
Figure 56:
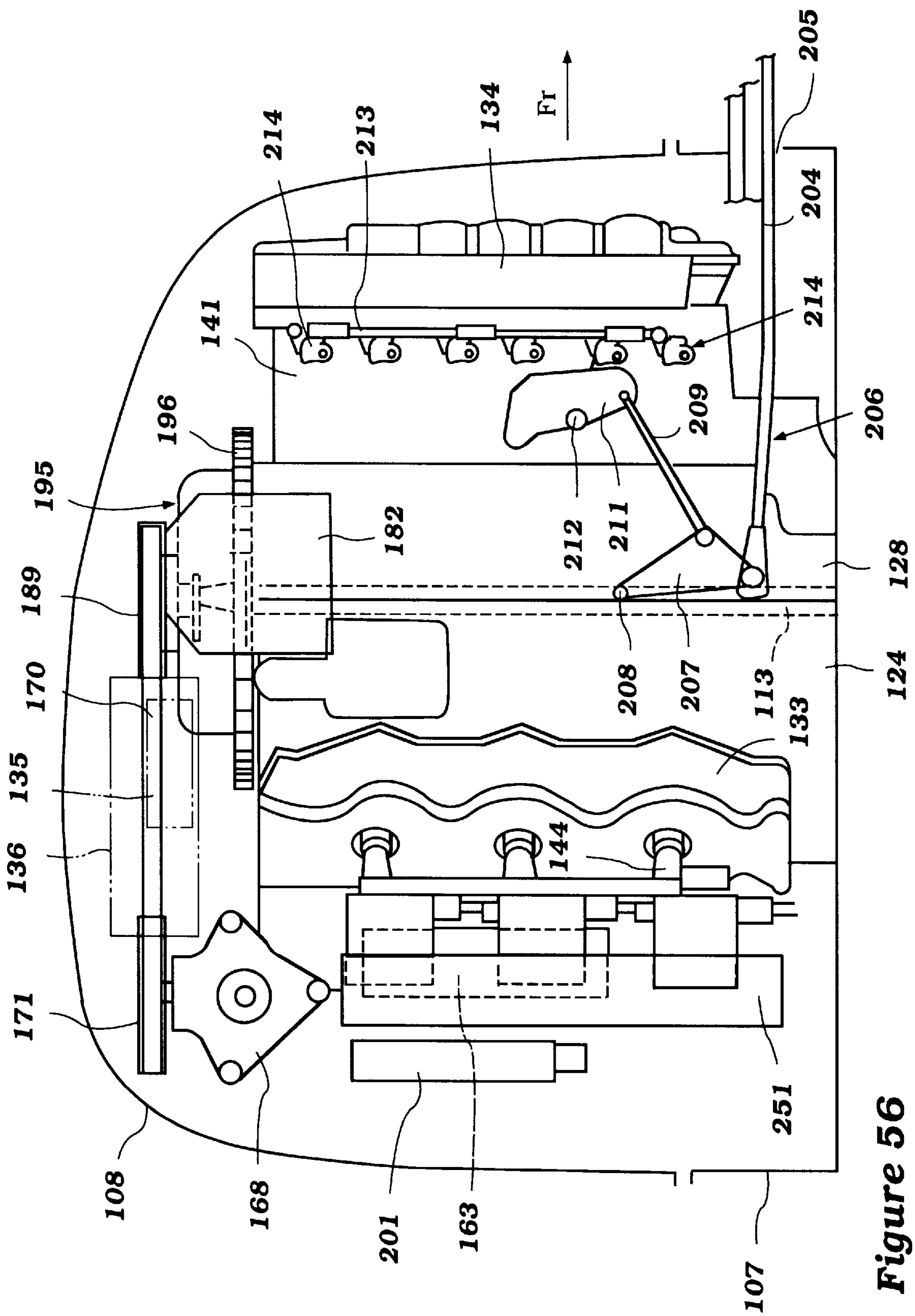
FIG. 56 is a side elevational view of the opposite side of this nineteenth embodiment and is in part similar to FIGS. 5, 8, 11, 14, 17, 20, 23, 26, 29, 32, 35, 38, 41, 44, 47, 50 and 53.

Embodiment of FIGS. 54–56

Figure 51:
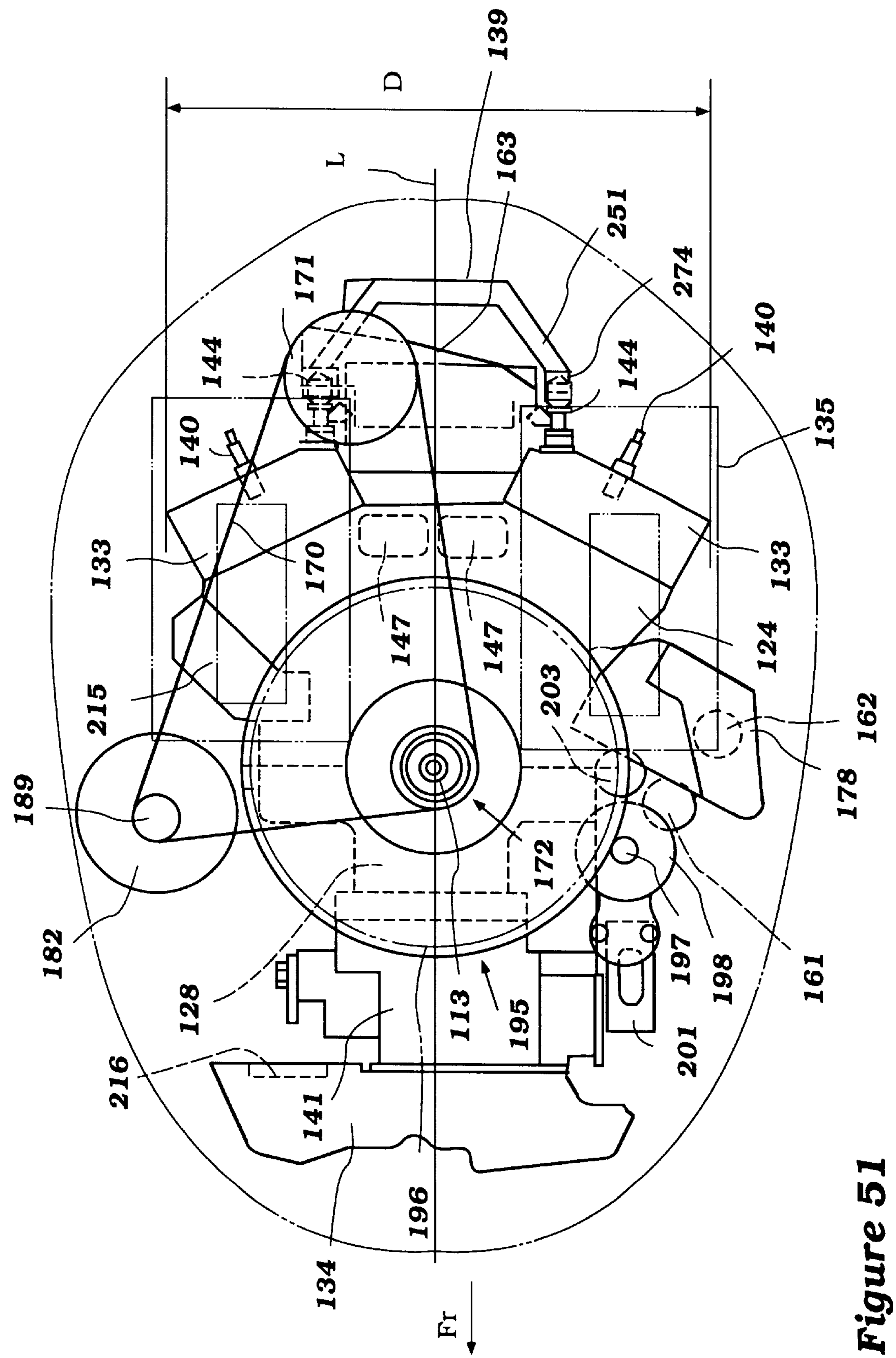
FIG. 51 is a top plan view, in part similar to FIGS. 3, 6, 9, 12, 15, 18, 21, 24, 27, 30, 33, 36, 39, 42, 45 and 48, and shows a eighteenth embodiment of the invention.
Figure 52:
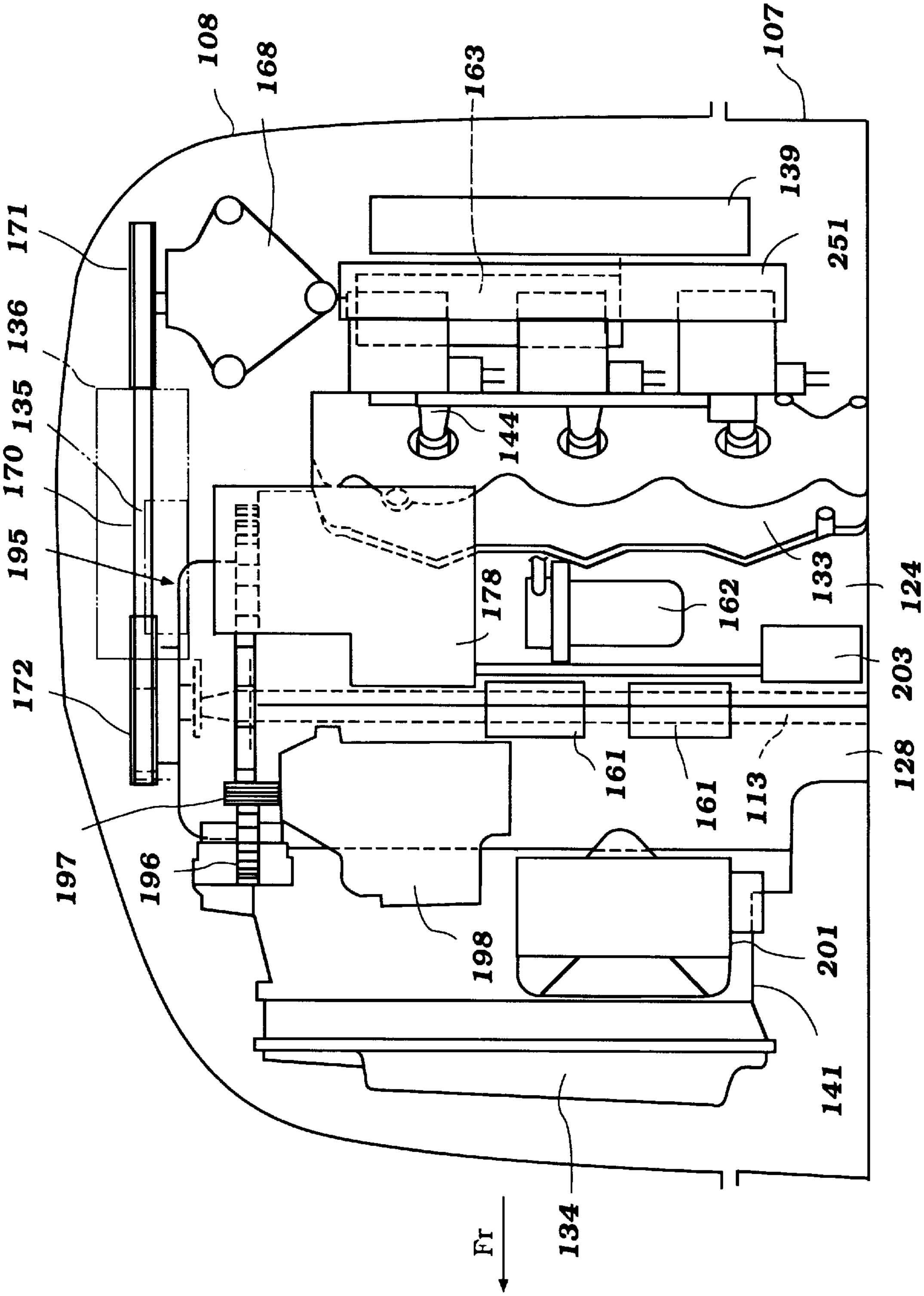
FIG. 52 is a right side elevational view of this eighteenth embodiment and is in part similar to FIGS. 6, 7, 10, 13, 16, 19, 22, 25, 28, 31, 34, 37, 40, 43, 46 and 49.
Figure 53:
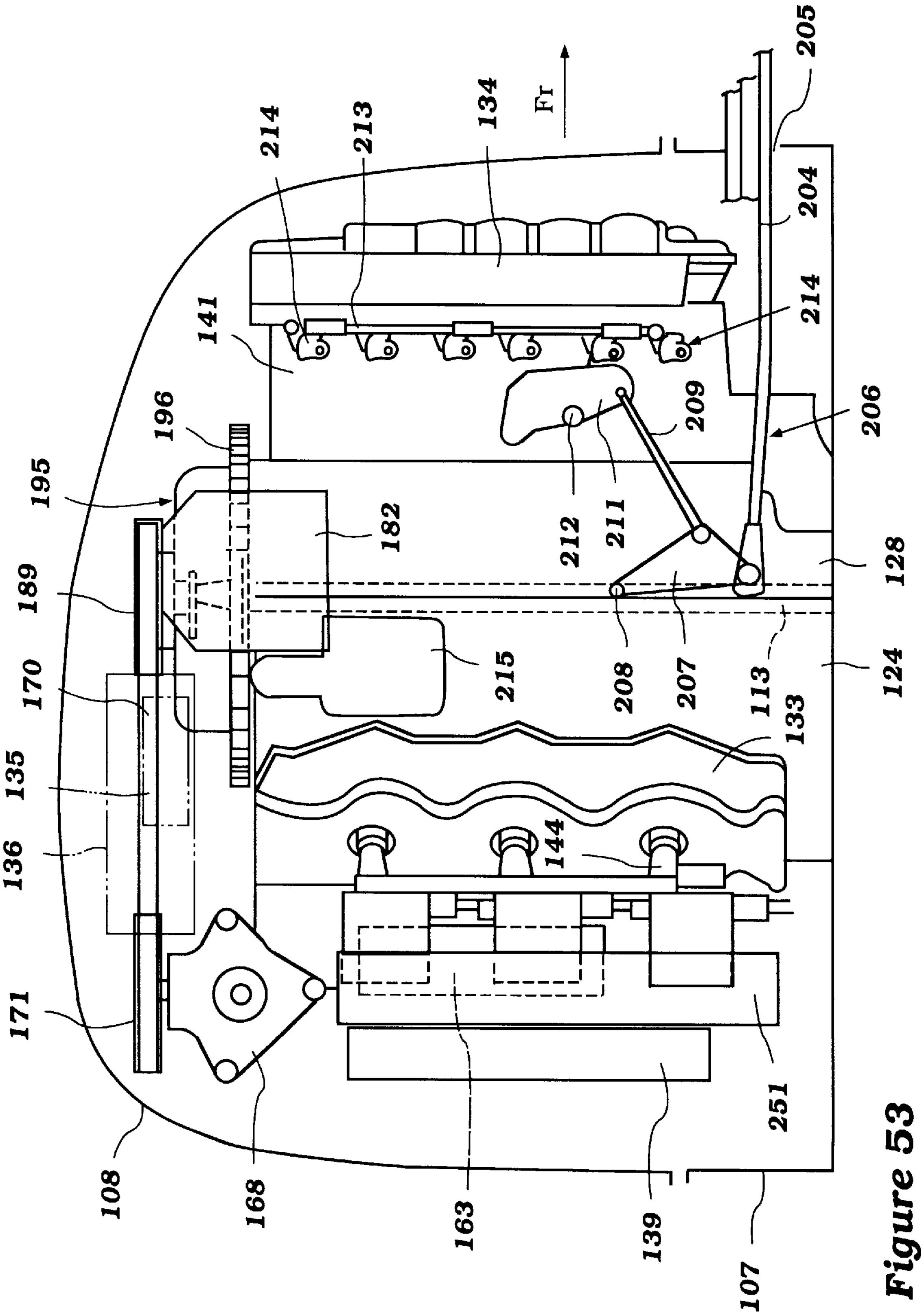
FIG. 53 is a side elevational view of the opposite side of this eighteenth embodiment and is in part similar to FIGS. 5, 8, 11, 14, 17, 20, 23, 26, 29, 32, 35, 38, 41, 44, 47 and 50.

This embodiment is basically the same as the embodiment of FIGS. 51–53 and only differs from it in the reversal of the locations of the elements of the control unit 202. In this embodiment, the ECU 139 is mounted in the cool location on one side of the intake manifold 141. The fuel injector solenoid driver 201 is, on the other hand, mounted to the rear of the vapor separator 169 and in an area where it is more closely positioned to the fuel injectors 144 which it drives.

Figure 57:
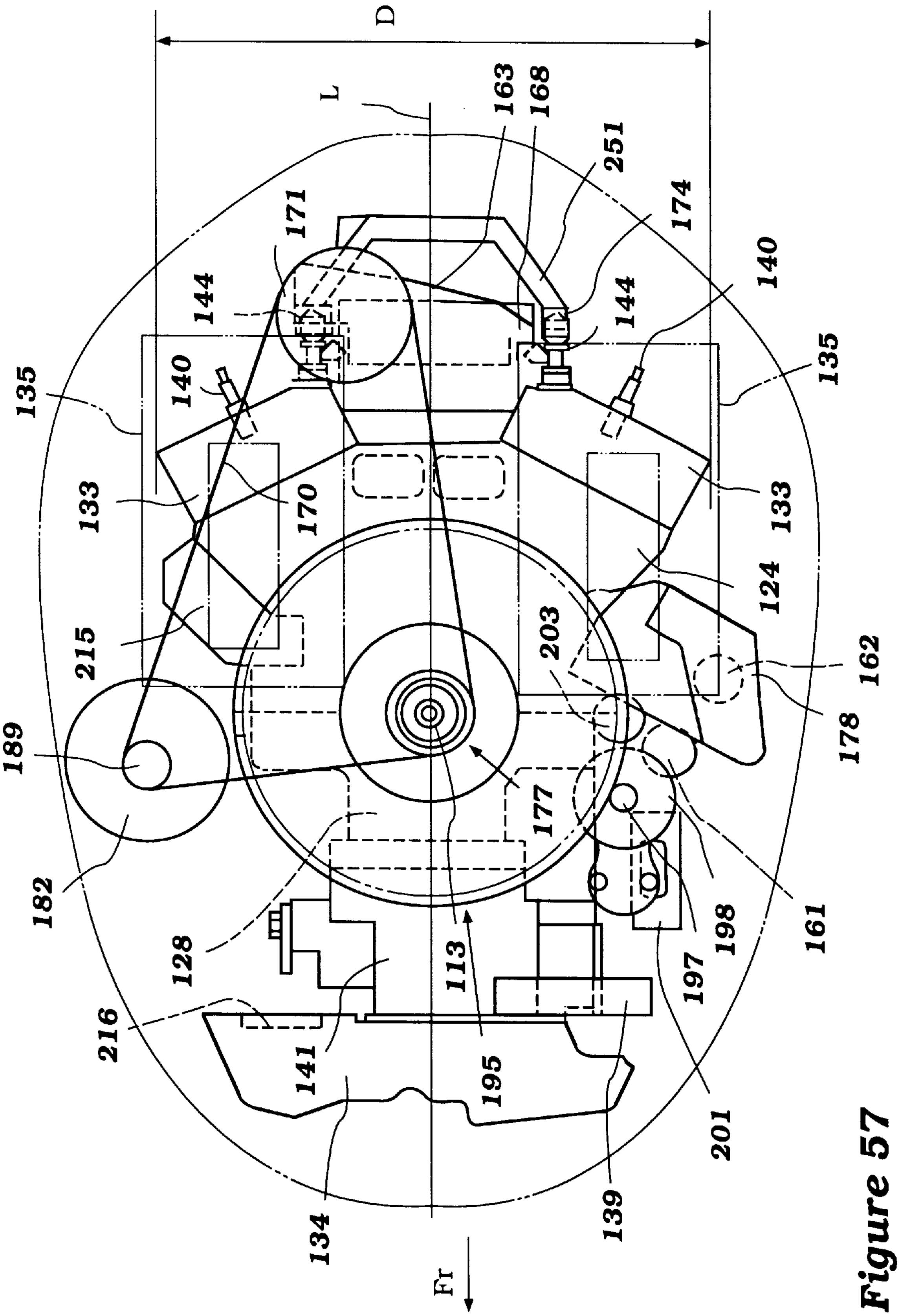
FIG. 57 is a top plan view, in part similar to FIGS. 3, 6, 9, 12, 15, 18, 21, 24, 27, 30, 33, 36, 39, 42, 45, 48, 51 and 54, and shows a twentieth embodiment of the invention.
Figure 58:
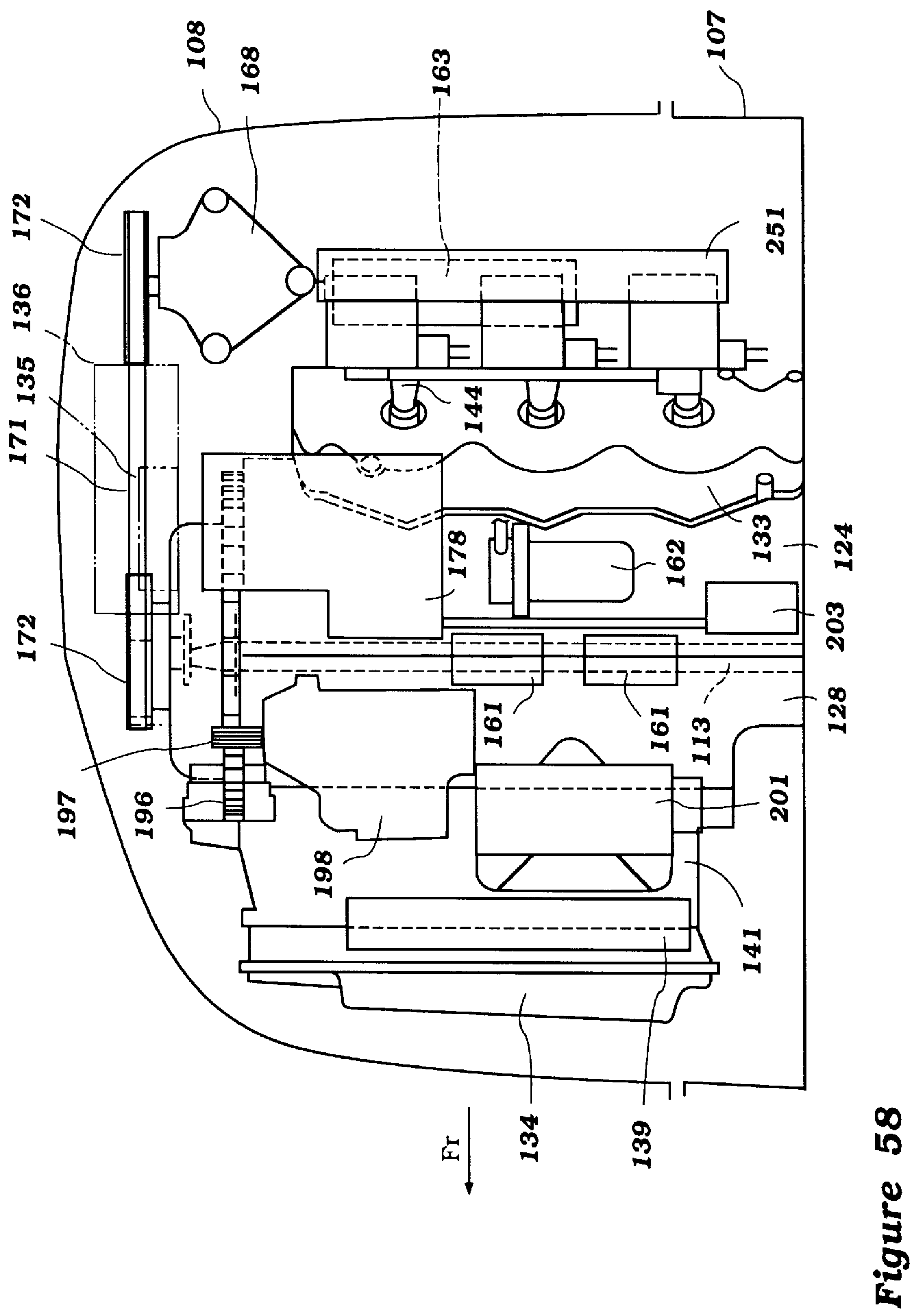
FIG. 58 is a right side elevational view of this twentieth embodiment and is in part similar to FIGS. 4, 7, 10, 13, 16, 19, 22, 25, 28, 31, 34, 37, 40, 43, 49, 52 and 55.
Figure 59:
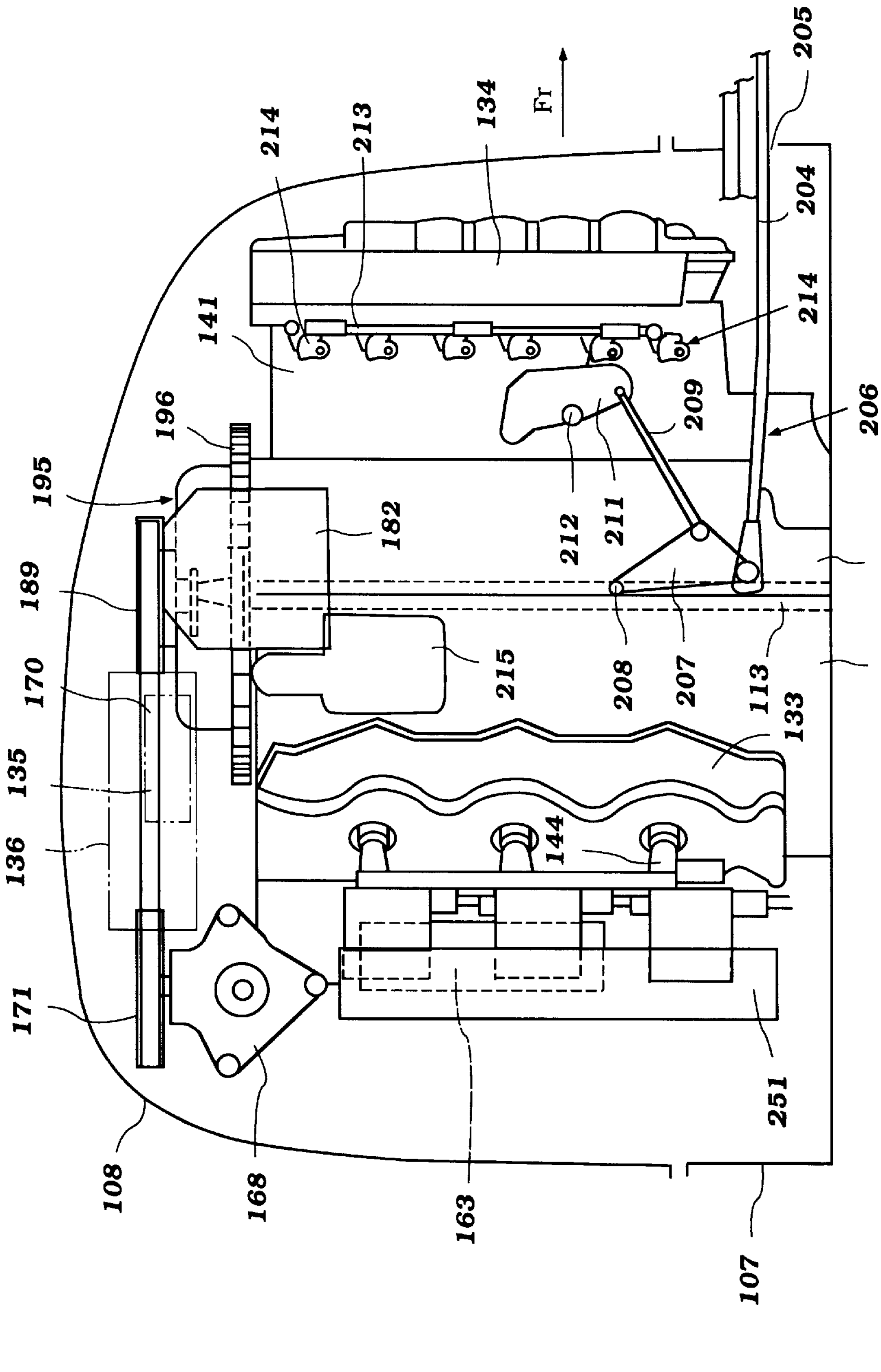
FIG. 59 is a side elevational view of the opposite side of this twentieth embodiment and is in part similar to FIGS. 5, 8, 11, 14, 17, 20, 23, 26, 29, 32, 35, 38, 41, 44, 47, 50, 53 and 56.

Embodiment of FIGS. 57–59

This embodiment employs the same driving arrangement for the high pressure fuel pump 168 and alternator 182 as the embodiments of FIGS. 48–50, 51–53, and 54–57. This differs from the previous embodiments again only in the location of the ECU 139 and the fuel injector solenoid driver 201. In this embodiment, both of these components are mounted adjacent the intake manifold 141.

The ECU 139 is mounted on the rear of the air inlet device 134. The fuel injector solenoid driver 201 is mounted on the side of the intake manifold 141. Since these are the only differences from the previous embodiments, it is not believed that a further description of this embodiment is necessary to permit those skilled in the art to practice the invention.

Figure 60:
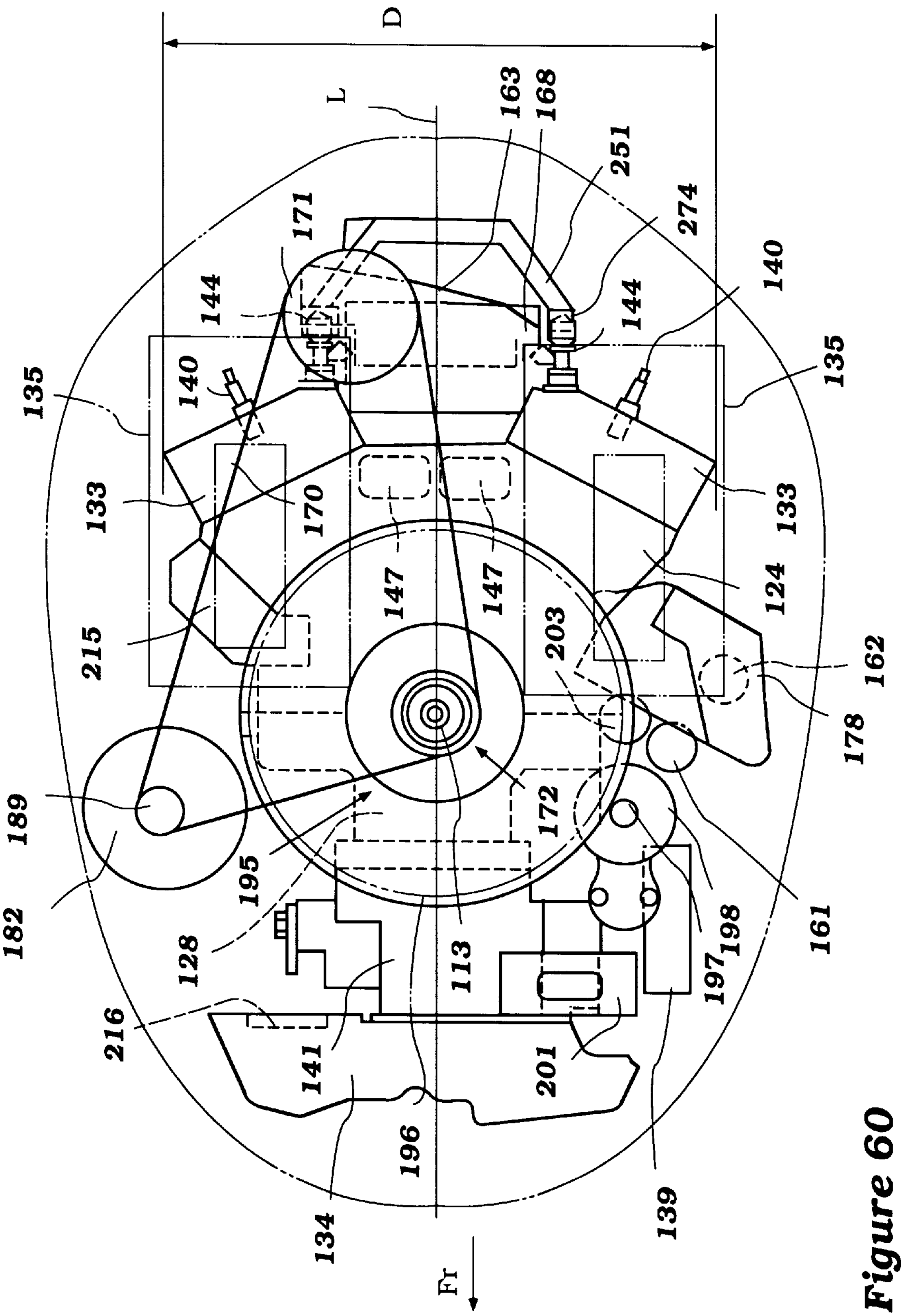
FIG. 60 is a top plan view, in part similar to FIGS. 3, 6, 9, 12, 15, 18, 21, 24, 27, 30, 33, 36, 39, 42, 45, 48, 51, 54 and 57, and shows a twenty-first embodiment of the invention
Figure 61:
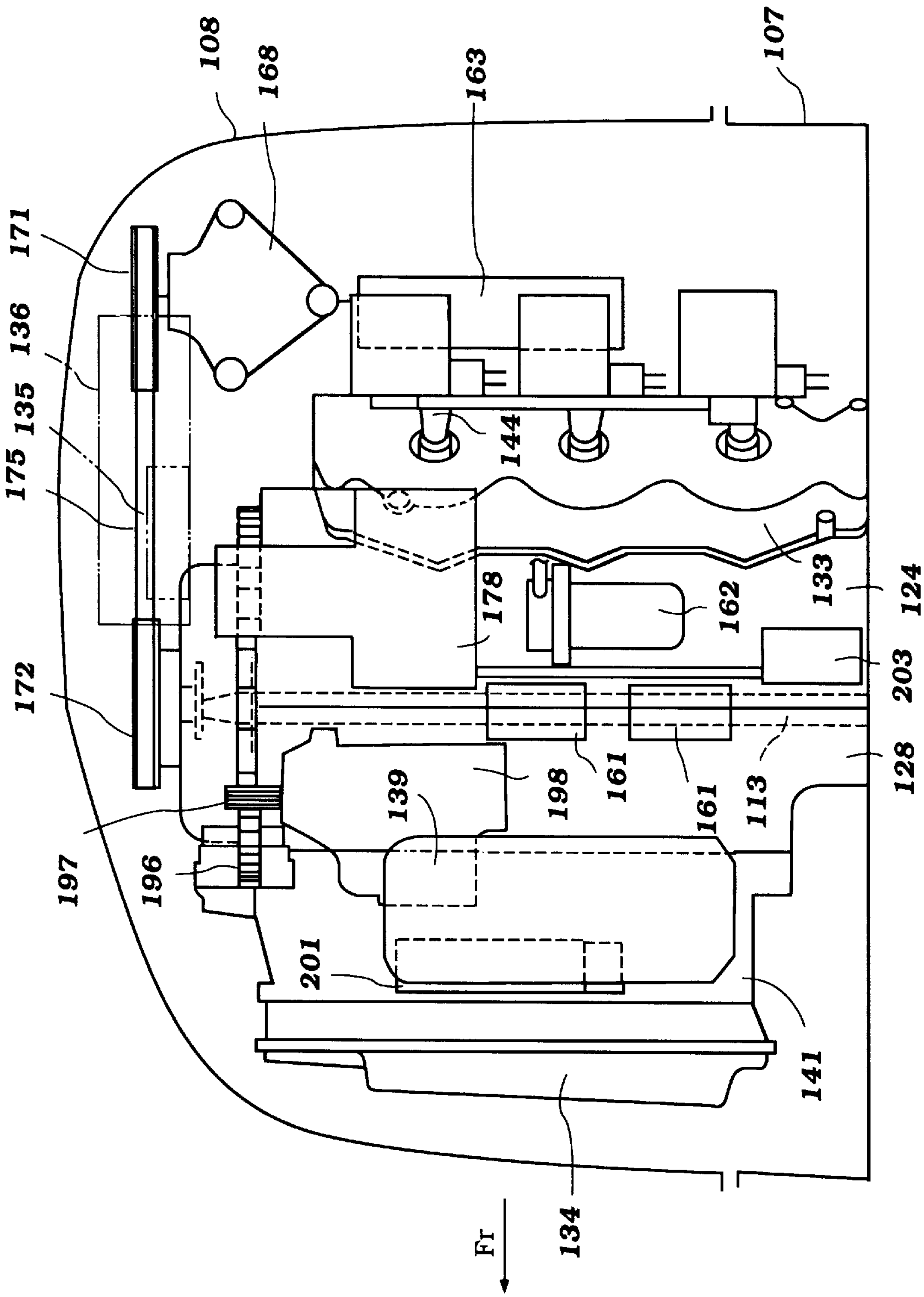
FIG. 61 is a right side elevational view of this twenty-first embodiment and is in part similar to FIGS. 4, 7, 10, 13, 16, 19, 22, 25, 28, 31, 34, 37, 40, 43, 46, 49, 52, 55 and 58.
Figure 62:
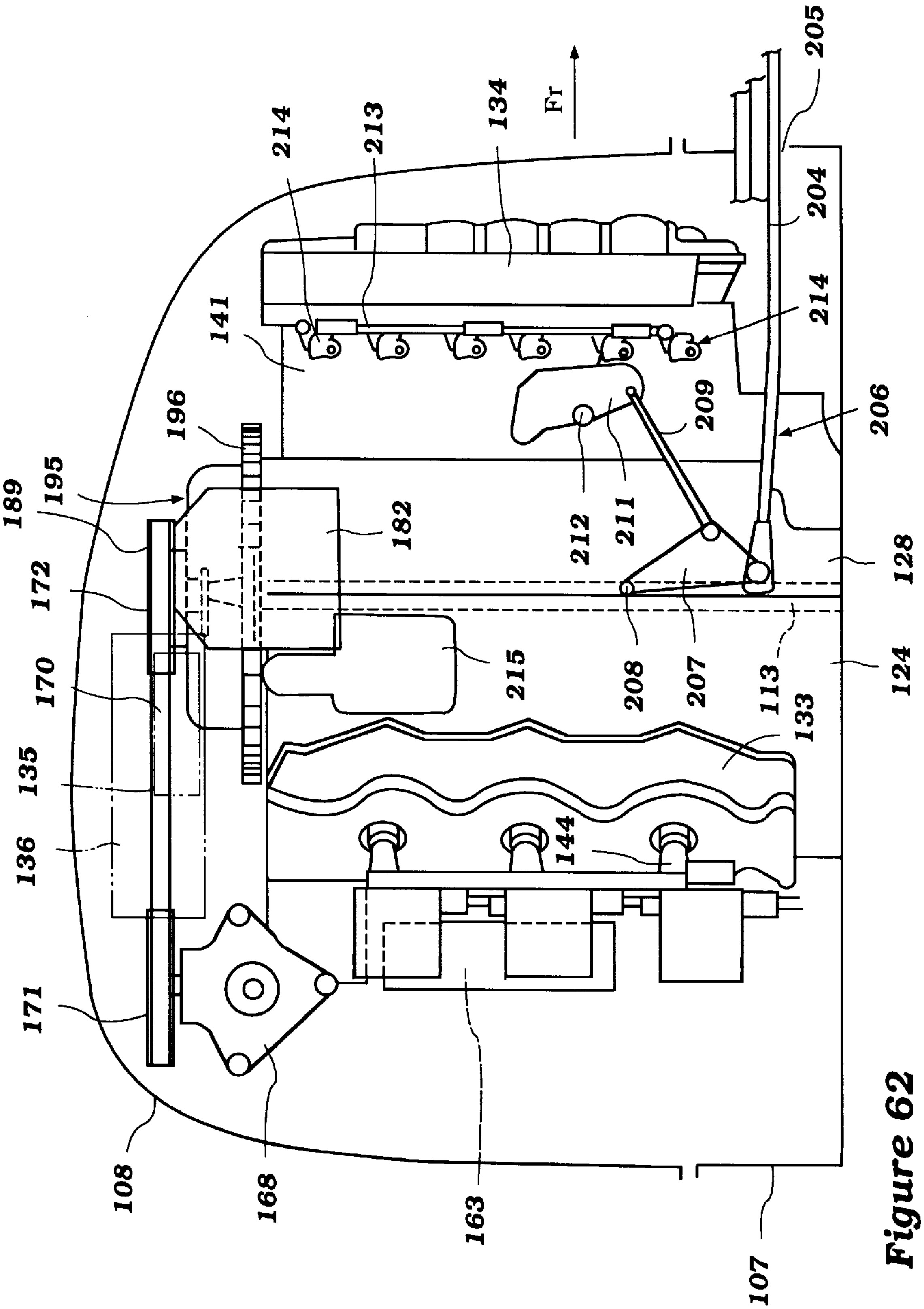
FIG. 62 is a side elevational view of the opposite side of this twenty-first embodiment and is in part similar to FIGS. 5, 8, 11, 14, 17, 20, 23, 26, 29, 32, 35, 38, 41, 44, 47, 50, 53, 56 and 59.

Embodiment of FIGS. 60–62

This embodiment is basically the same as the embodiment of FIGS. 57–59 but mounts the ECU 139 and fuel injector solenoid driver 201 in reverse positions. That is, in this embodiment, the ECU 139 is mounted on the backside of the air inlet device 134. The solenoid driver 201 is, on the other hand, mounted adjacent one side of the intake manifold 141 but in proximity to the ECU 139.

Figure 63:
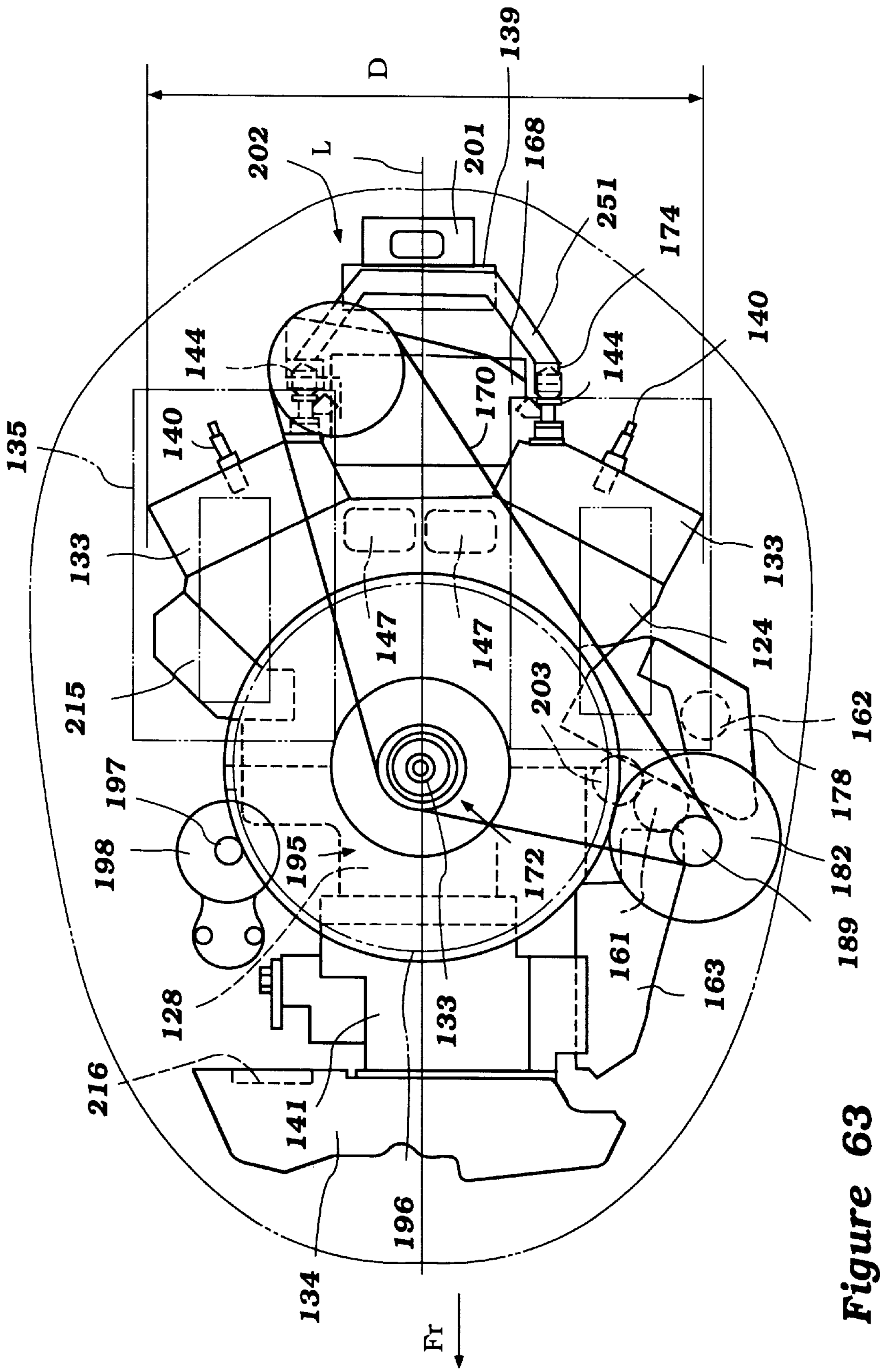
FIG. 63 is a top plan view, in part similar to FIGS. 3, 6, 9, 12, 15, 18, 21, 24, 27, 30, 33, 36, 39, 42, 45, 48, 51, 54, 57 and 60, and shows a twenty-second embodiment of the invention.
Figure 64:
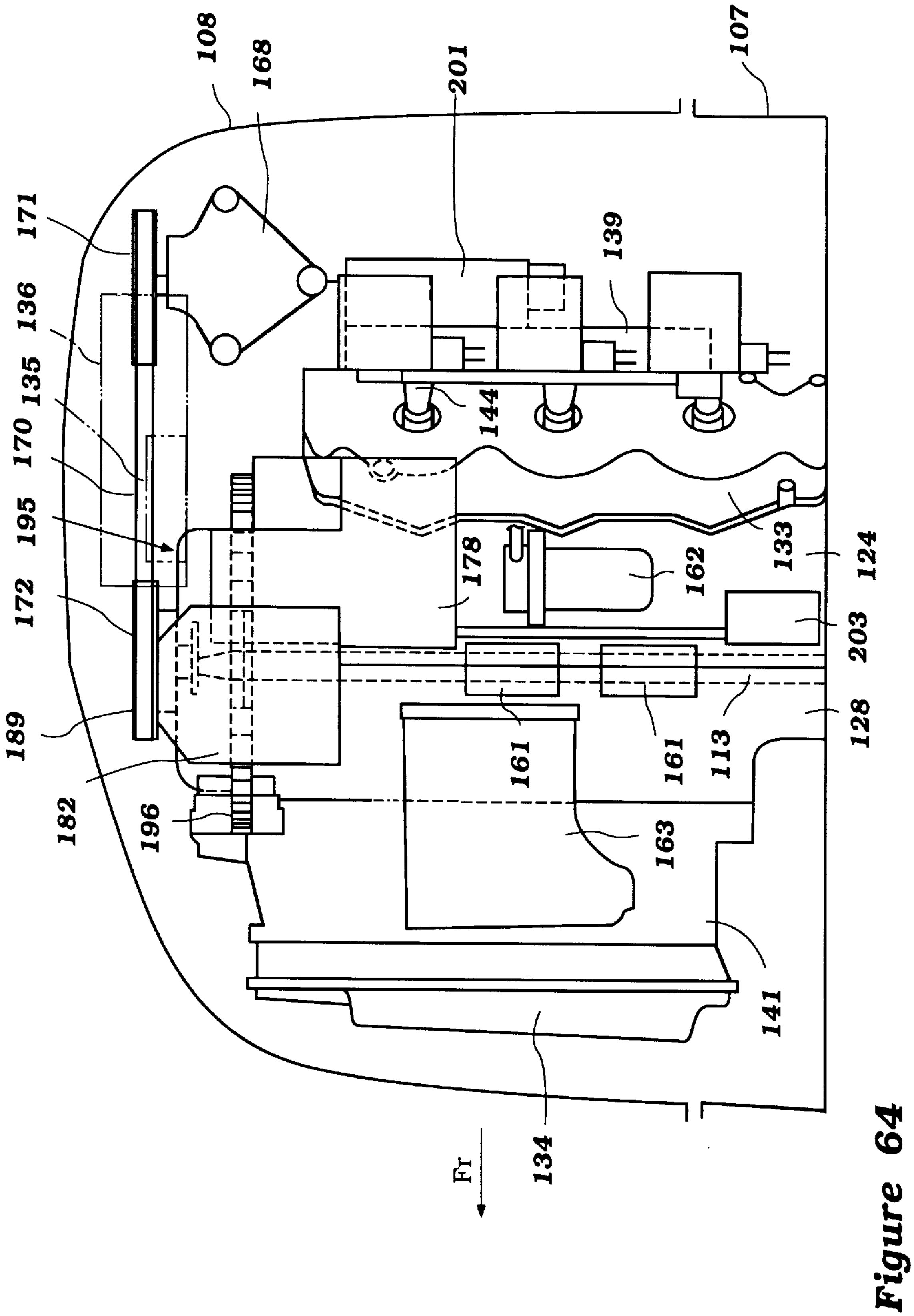
FIG. 64 is a right side elevational view of this twenty-second embodiment and is in part similar to FIGS. 4, 7, 10, 13, 16, 19, 22, 25, 28, 31, 34, 37, 40, 43, 46, 49, 52, 55, 58 and 61.
Figure 65:
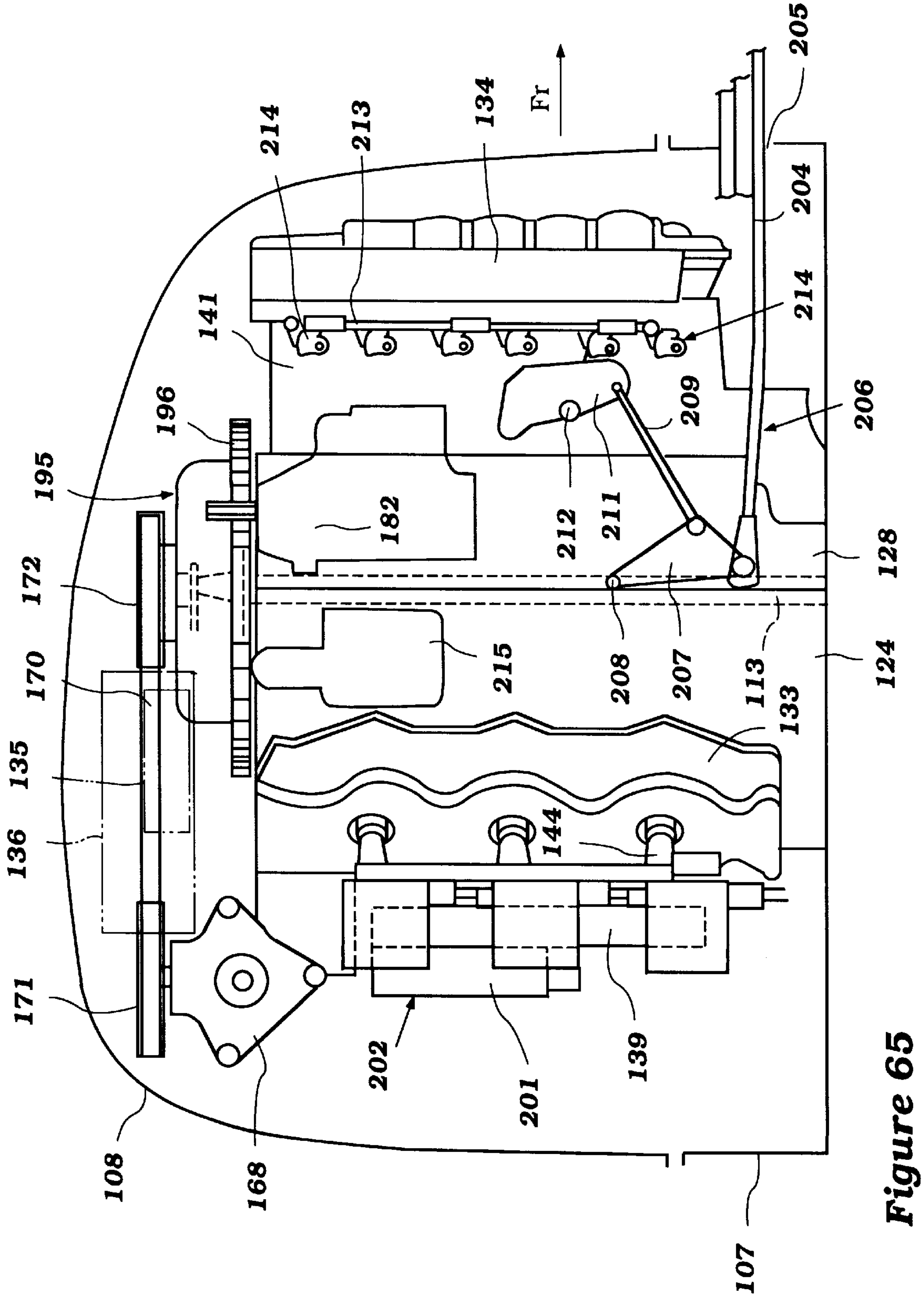
FIG. 65 is a side elevational view of the opposite side of this twenty-second embodiment and is in part similar to FIGS. 5, 8, 11, 14, 17 20, 23, 26, 29, 32, 35, 38, 44, 47, 50, 53, 56, 59 and 62.

Embodiment of FIGS. 63–65

Figure 6:
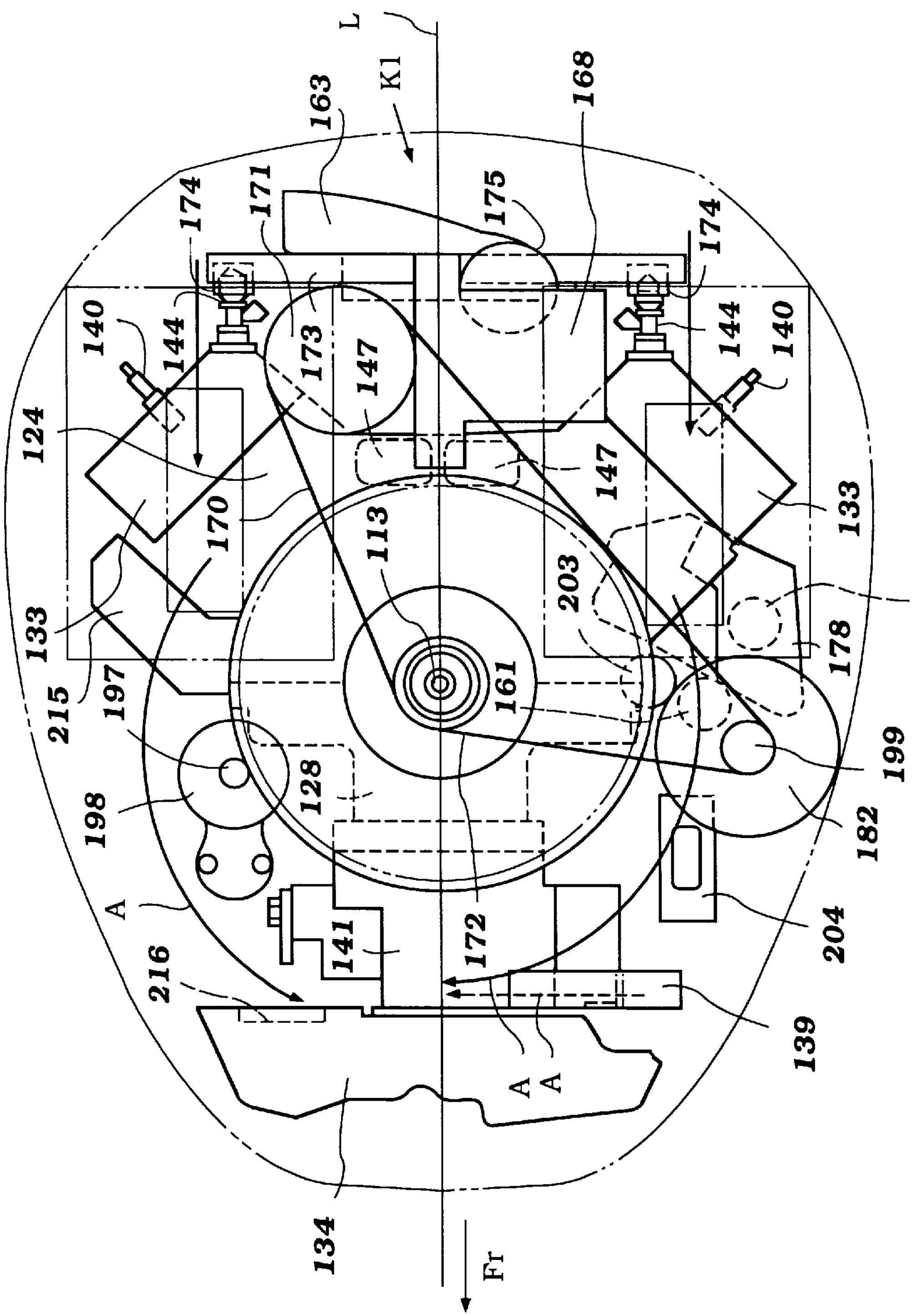
FIG. 6 is a top plan view, in part similar to FIG. 3 and shows a third embodiment of the invention.
Figure 7:
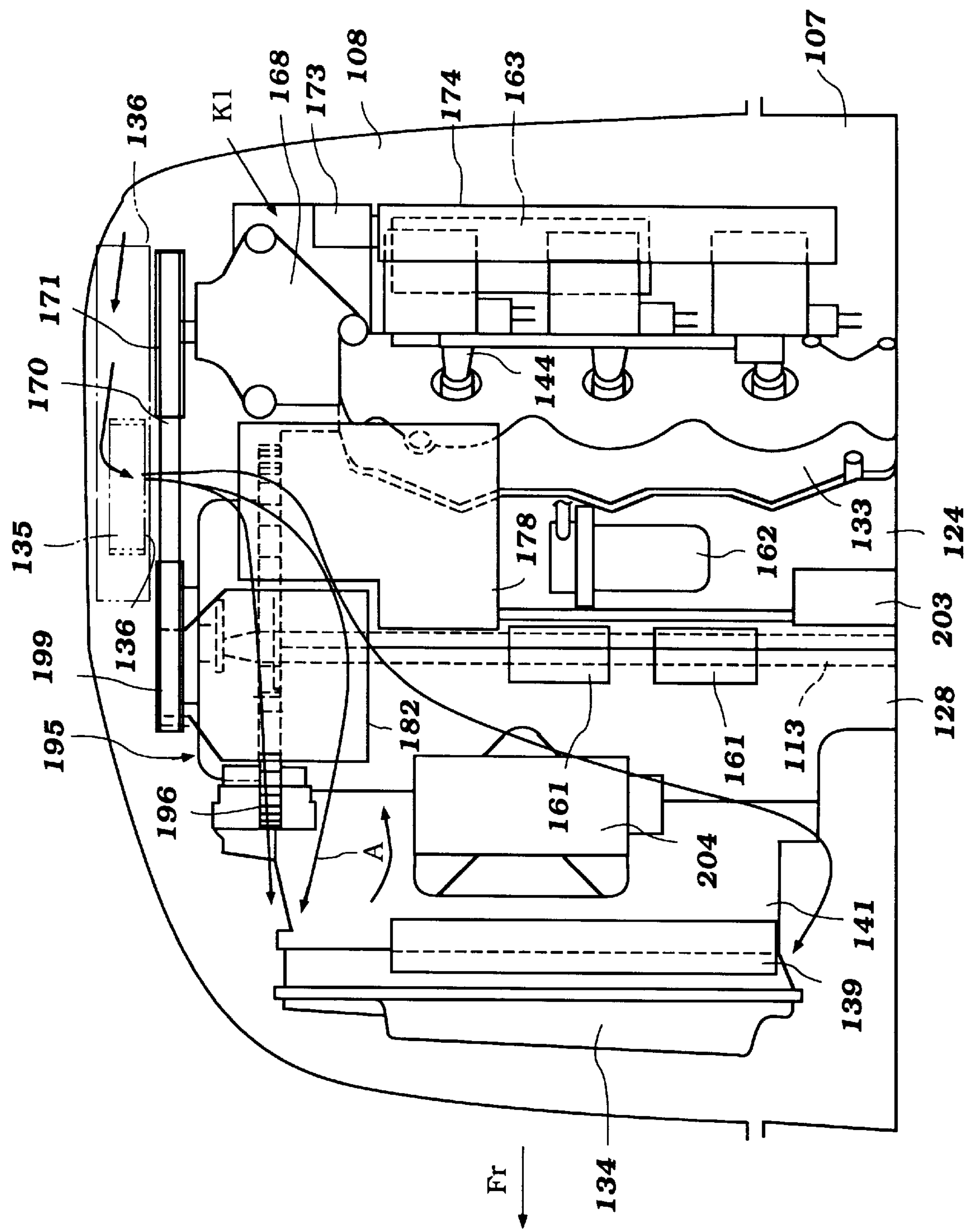
FIG. 7 is a side elevational view in part similar to FIG. 4 for this third embodiment of the invention.
Figure 8:
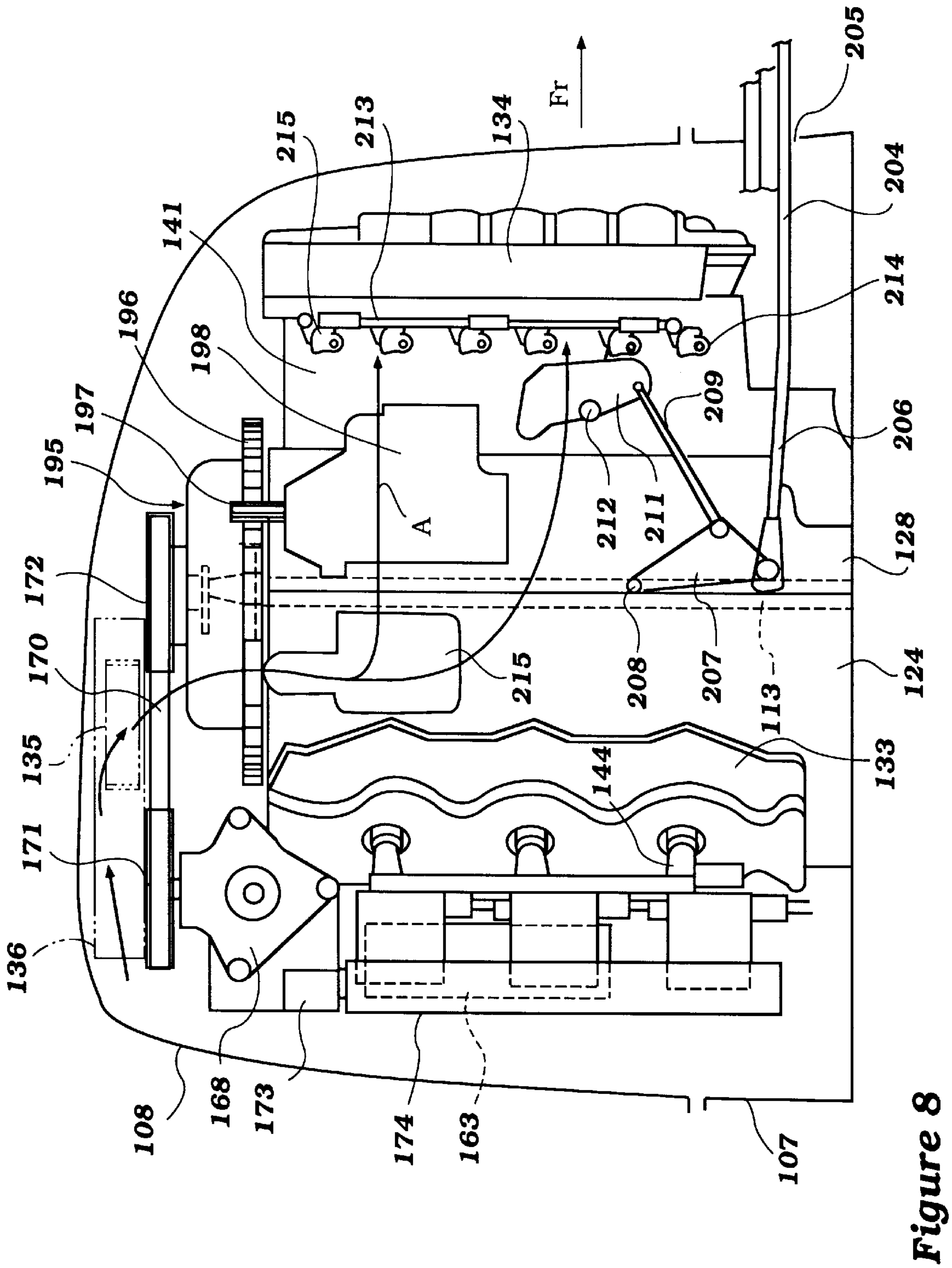
FIG. 8 is a side elevational view looking in the opposite direction, in part similar to FIG. 5 but for this embodiment.

Next will be described a series of embodiments that are similar in driving relationship for the alternator 182 and the high pressure fuel injection pump 168 of the embodiment of FIGS. 6–8. These embodiments, however, use the more rearward positioning of the high pressure fuel injection pump 168 permitted by the main fuel manifold 251.

In the first of these embodiments as seen in FIGS. 63–65, the vapor separator 163 is positioned on one side of the intake manifold 141 and thus is located in a cool area. The ECU 139 and fuel injector solenoid driver 201 are mounted as the control unit 202 to the rear of the engine and in proximity to the fuel injectors 144 and spark plugs 140. This minimizes the length of electrical conduits and also of fuel supply conduits.

Figure 66:
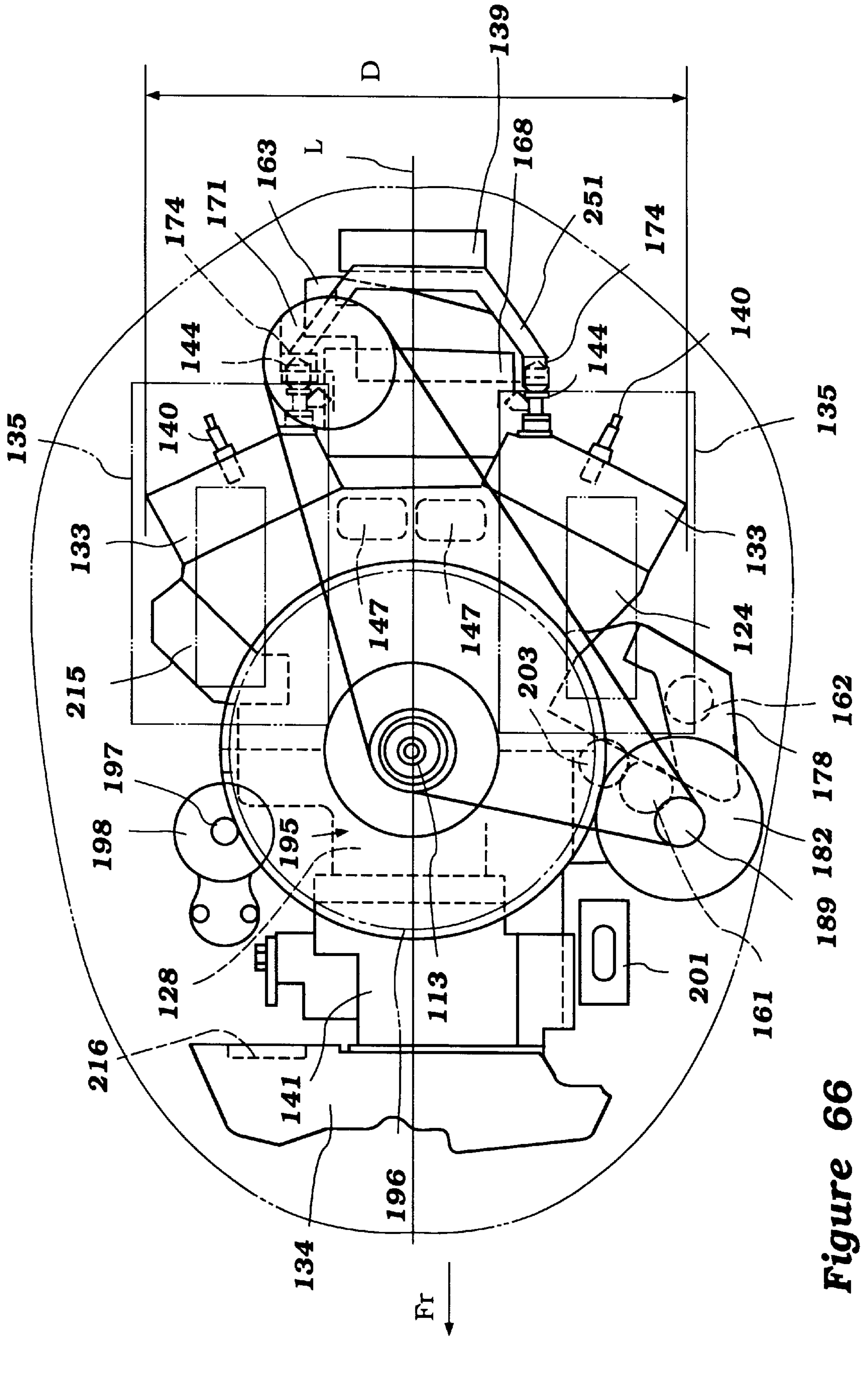
FIG. 66 is a top plan view, in part similar to FIGS. 3, 6, 9, 12, 15, 18, 21, 24, 27, 30, 33, 36, 39, 42, 45, 48, 51, 54, 57, 60 and 63, and shows a twenty-third embodiment of the invention.
Figure 67:
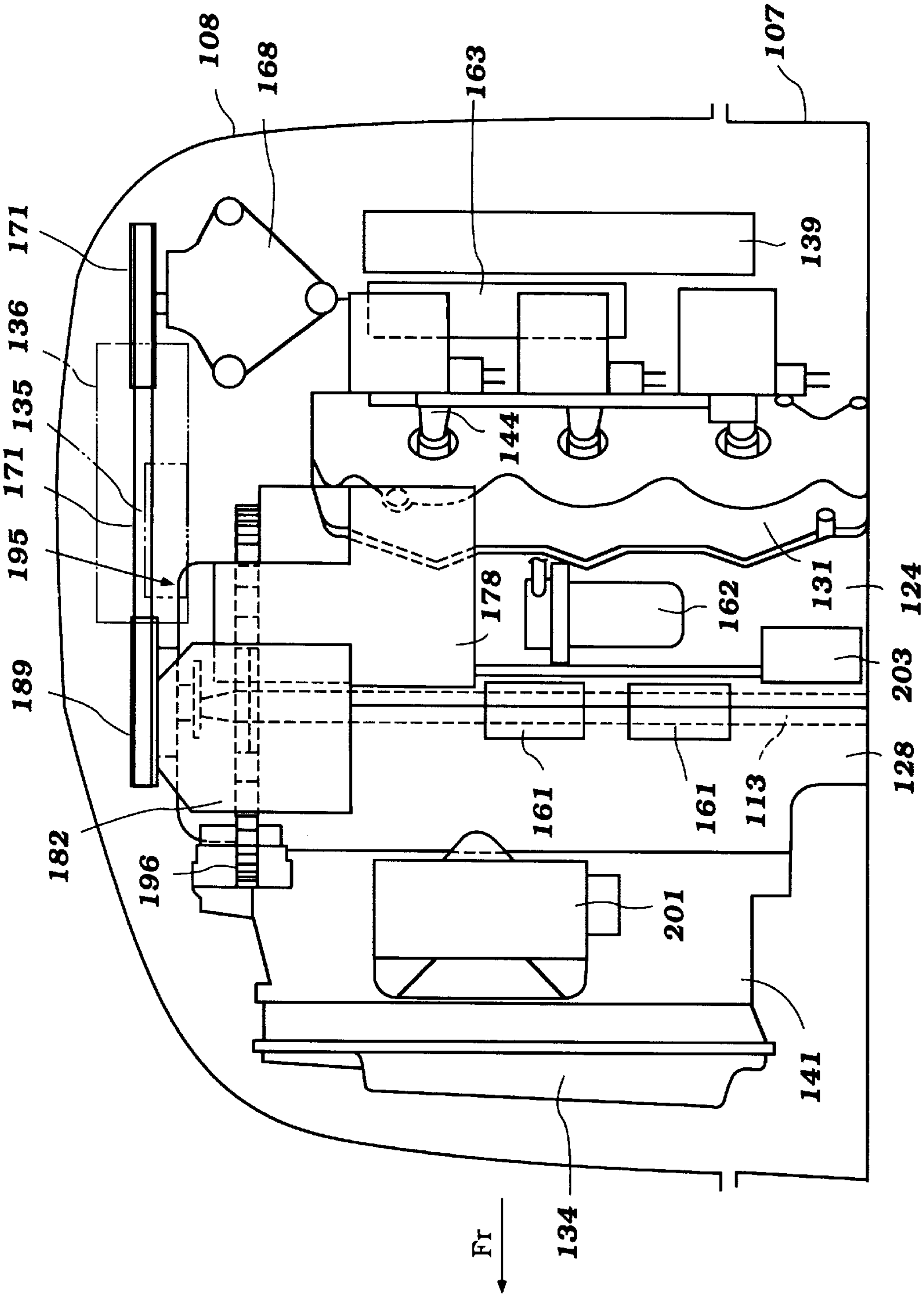
FIG. 67 is a right side elevational view of this twenty-third embodiment and is in part similar to FIGS. 4, 7, 10, 13, 16, 19, 22, 25, 28, 31, 34, 37, 40, 43, 46, 49, 52, 55, 58, 61 and 64.
Figure 68:
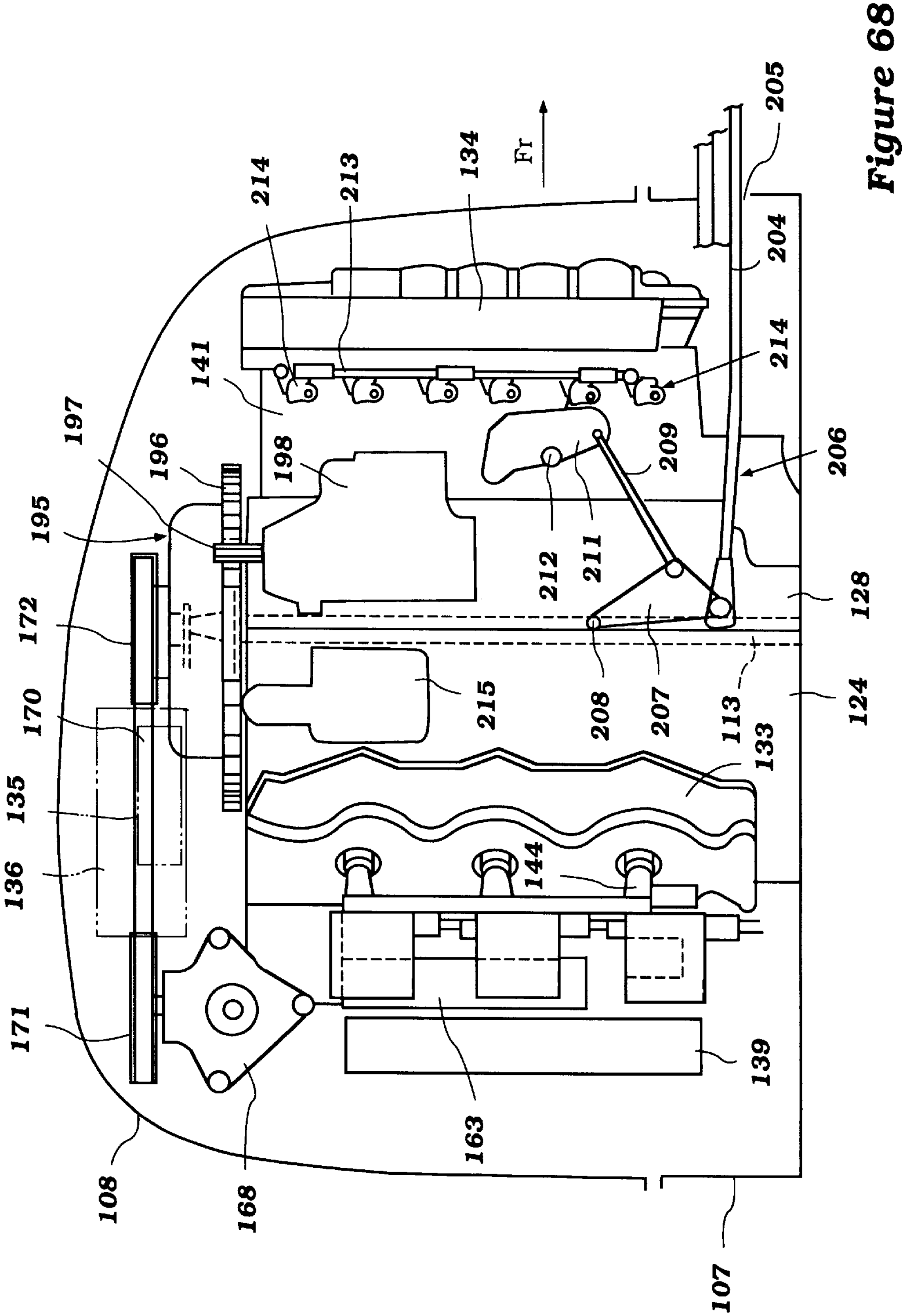
FIG. 68 is an opposite side elevational view of this twenty-third embodiment and is in part similar to FIGS. 5, 8, 11, 14, 17, 20, 23, 26, 29, 32, 35, 38, 41, 44, 47, 50, 53, 56, 59, 62 and 65.

Embodiment of FIGS. 66–68

This embodiment is basically the same as the embodiment of FIGS. 64–65. However, with this embodiment, the fuel injector solenoid driver 201 is moved forwardly and positioned on one side of the intake manifold 141. The vapor separator 163 is moved to the rear and positioned between the fuel rails 174. In all other regards, this embodiment is the same as that of FIGS. 63–65 and, therefore, further description of this embodiment is not believed necessary to permit those skilled in the art to practice the invention.

Figure 69:
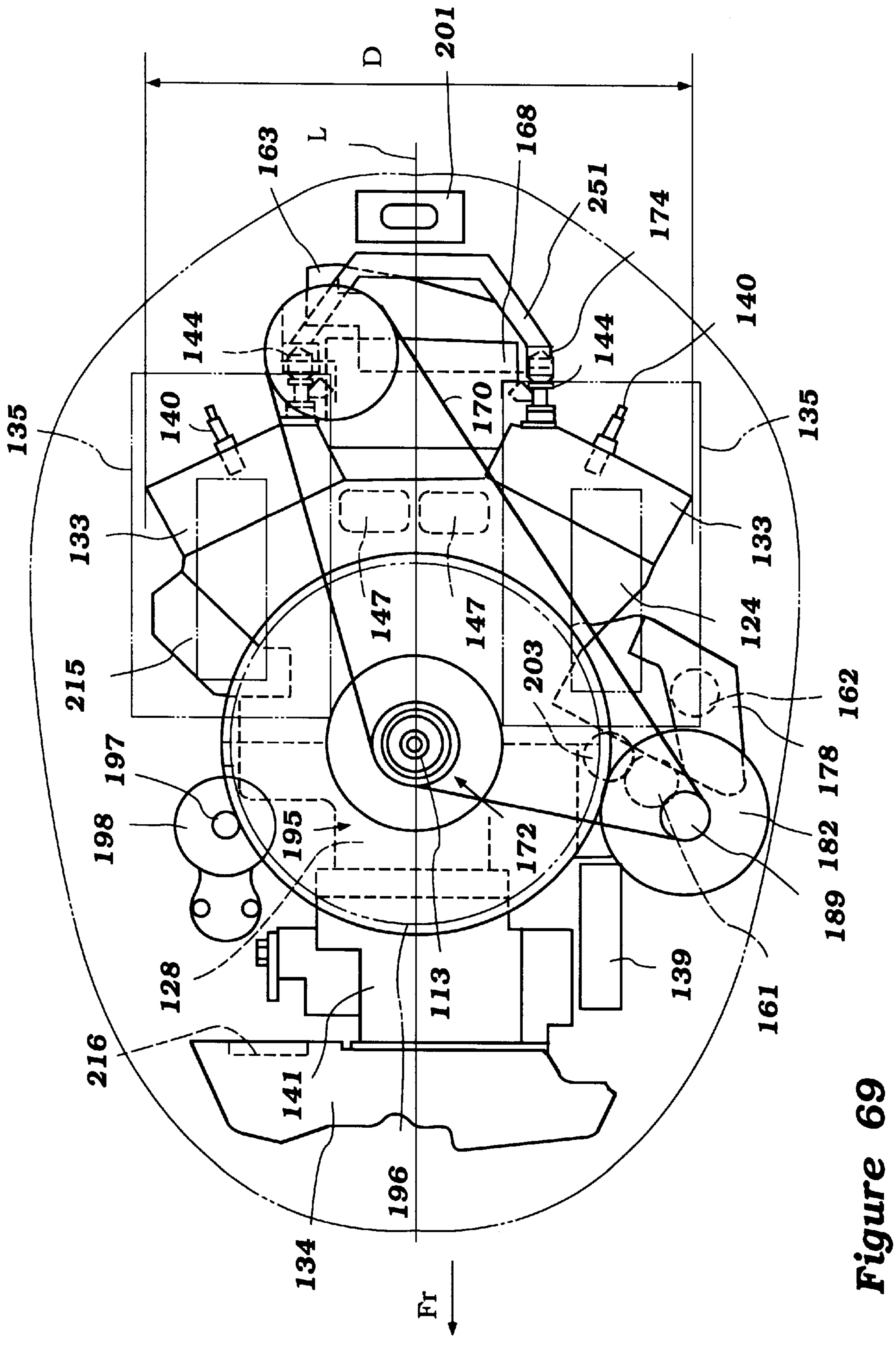
FIG. 69 is a top plan view, in part similar to FIGS. 3, 6, 9, 12, 15, 18, 21, 24, 27, 30, 33, 36, 39, 42, 45, 48, 51, 54, 57, 60, 63 and 66, and shows a twenty-fourth embodiment of the invention.
Figure 70:
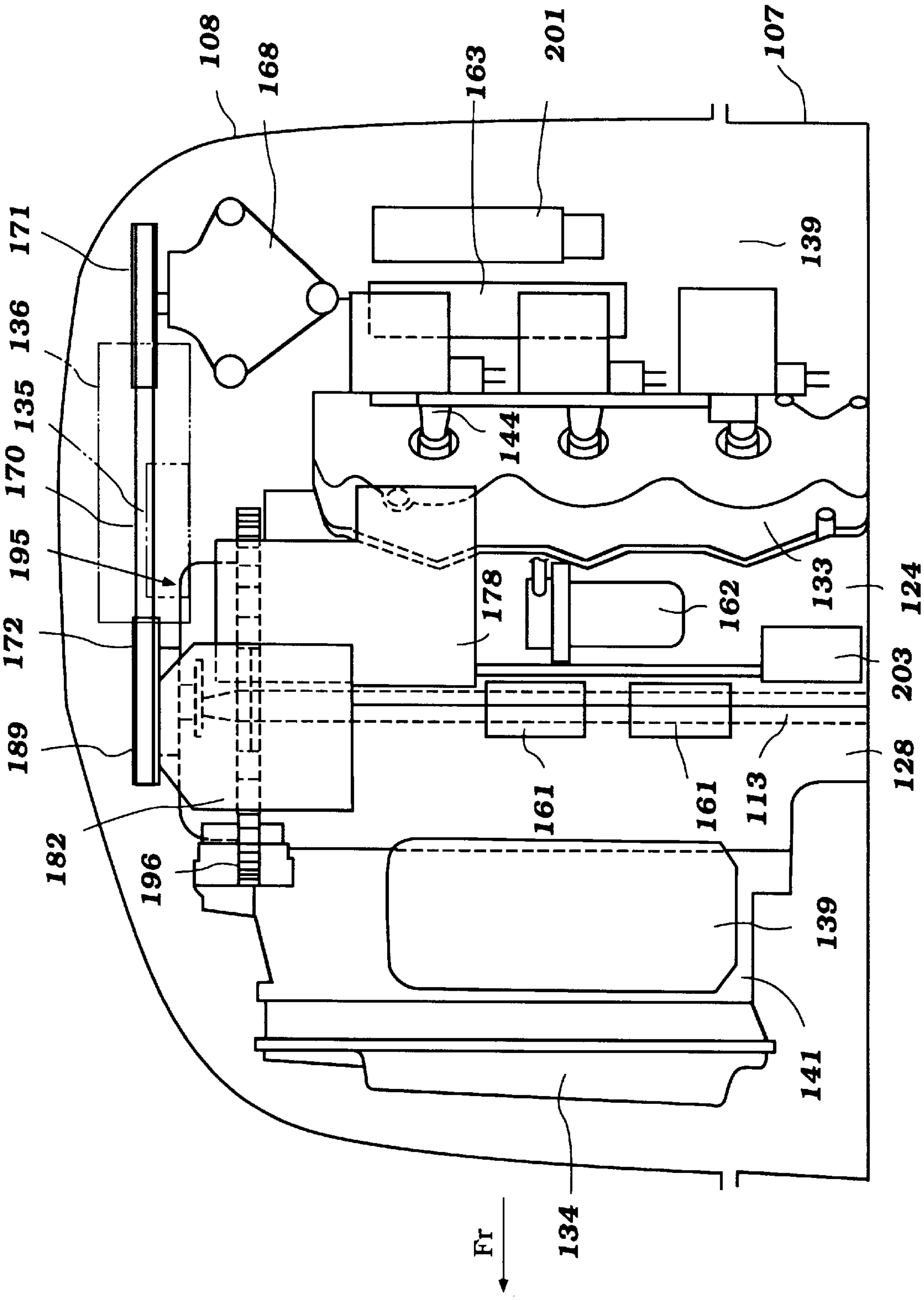
FIG. 70 is a right side elevational view of this twenty-fourth embodiment and is in part similar to FIGS. 4, 7, 10, 13, 16, 19, 22, 25, 28, 31, 34, 37, 40, 43, 46, 49, 52, 55, 58, 61, 64 and 67.
Figure 71:
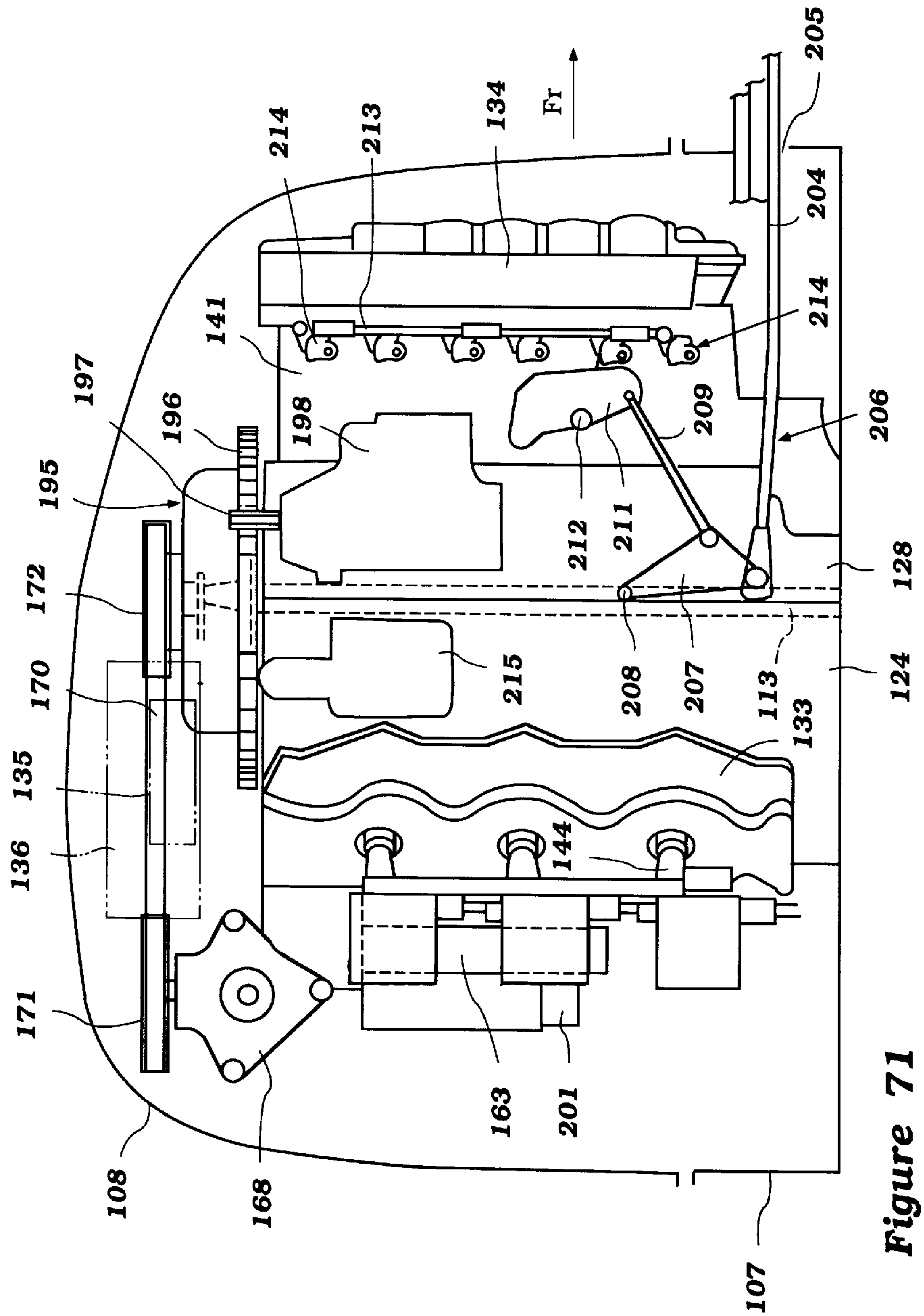
FIG. 71 is an opposite side elevational view of the twenty-fourth embodiment and is in part similar to FIGS. 5, 8, 11, 14, 17, 20, 23, 26, 29, 32, 35, 38, 41, 44, 47, 50, 53, 56, 59, 62, 65 and 68.

Embodiment of FIGS. 69–71

This embodiment is basically the same as the embodiment of FIGS. 66–68 and only reverses the two control element positions. In this embodiment, the ECU 163 is positioned on one side of the intake manifold 141. The fuel injector solenoid driver 201 is positioned rearwardly of the vapor separator 163 and in close proximity to the fuel injectors 144 which it serves.

Figure 72:
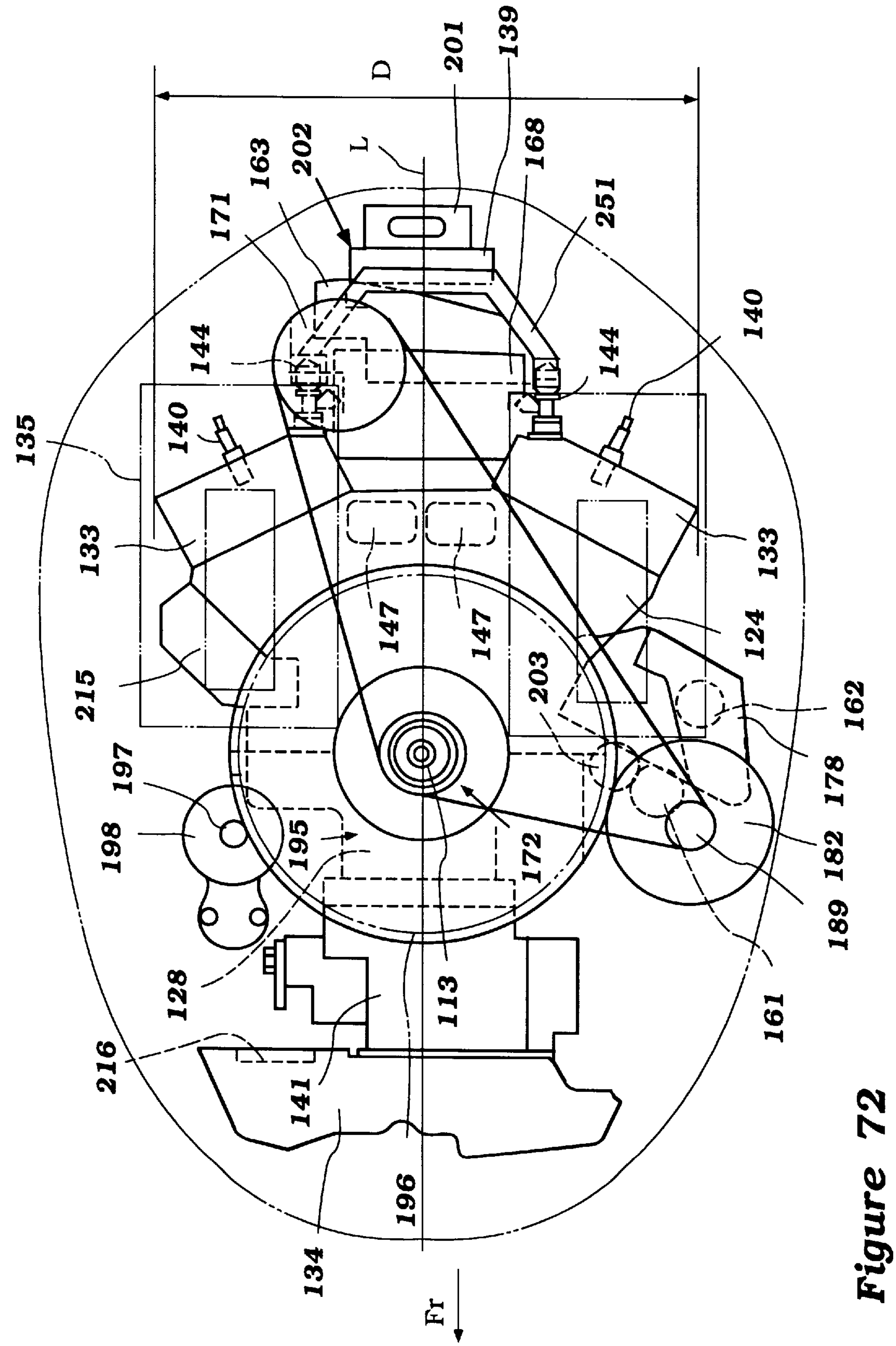
FIG. 72 is a top plan view, in part similar to FIGS. 3, 6, 9, 12, 15, 18, 21, 24, 27, 30, 35, 36, 39, 42, 45, 48, 51, 54, 57, 60, 63, 66 and 69, and shows a twenty-fifth embodiment of the invention.
Figure 73:
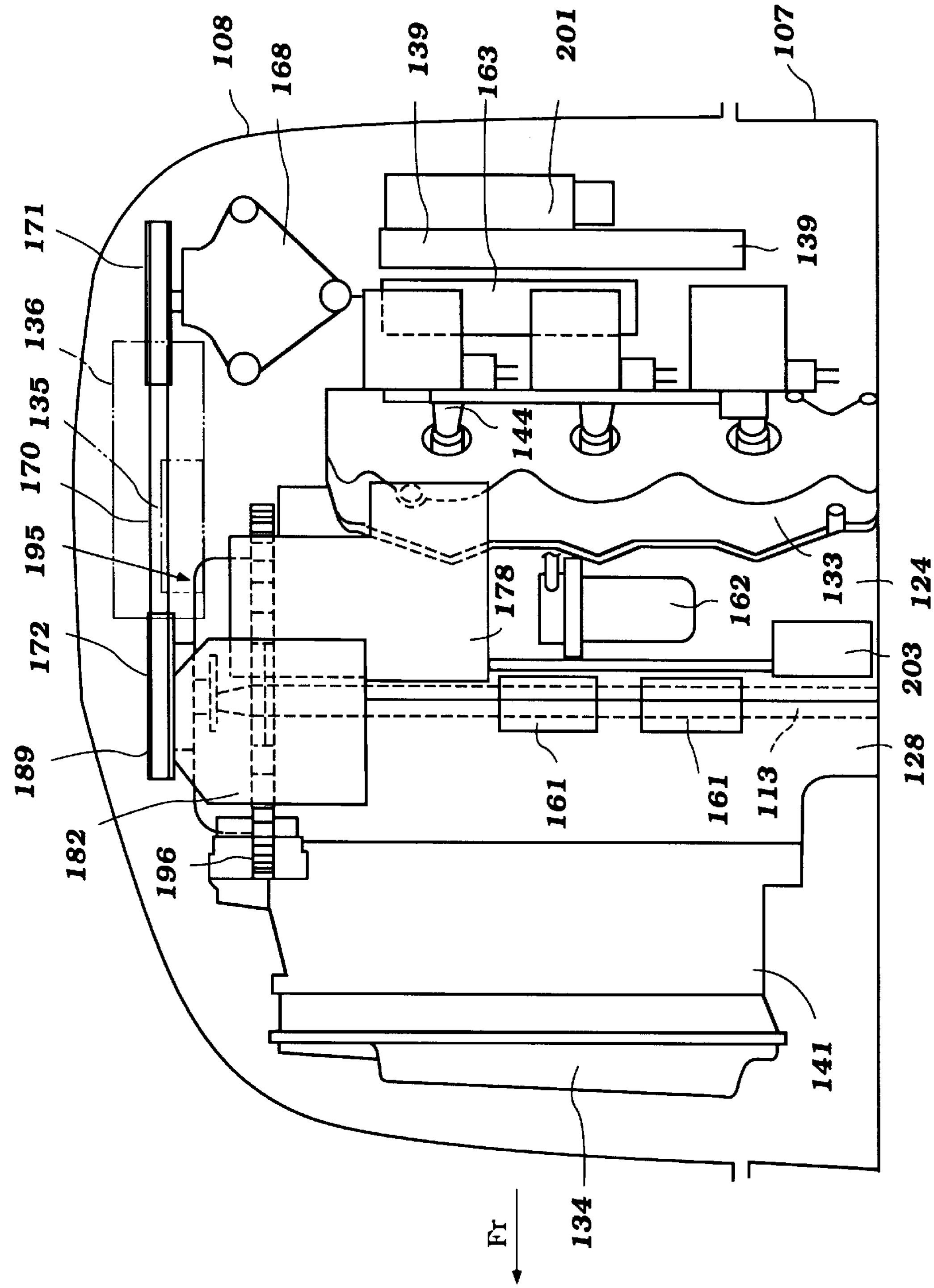
FIG. 73 is a right side elevational view of this twenty-fifth embodiment and is in part similar to FIGS. 4, 7, 10, 13, 16, 19, 22, 25, 28, 31, 34, 37, 40, 43, 46, 49, 52, 55, 58, 61, 64, 67 and 70.
Figure 74:
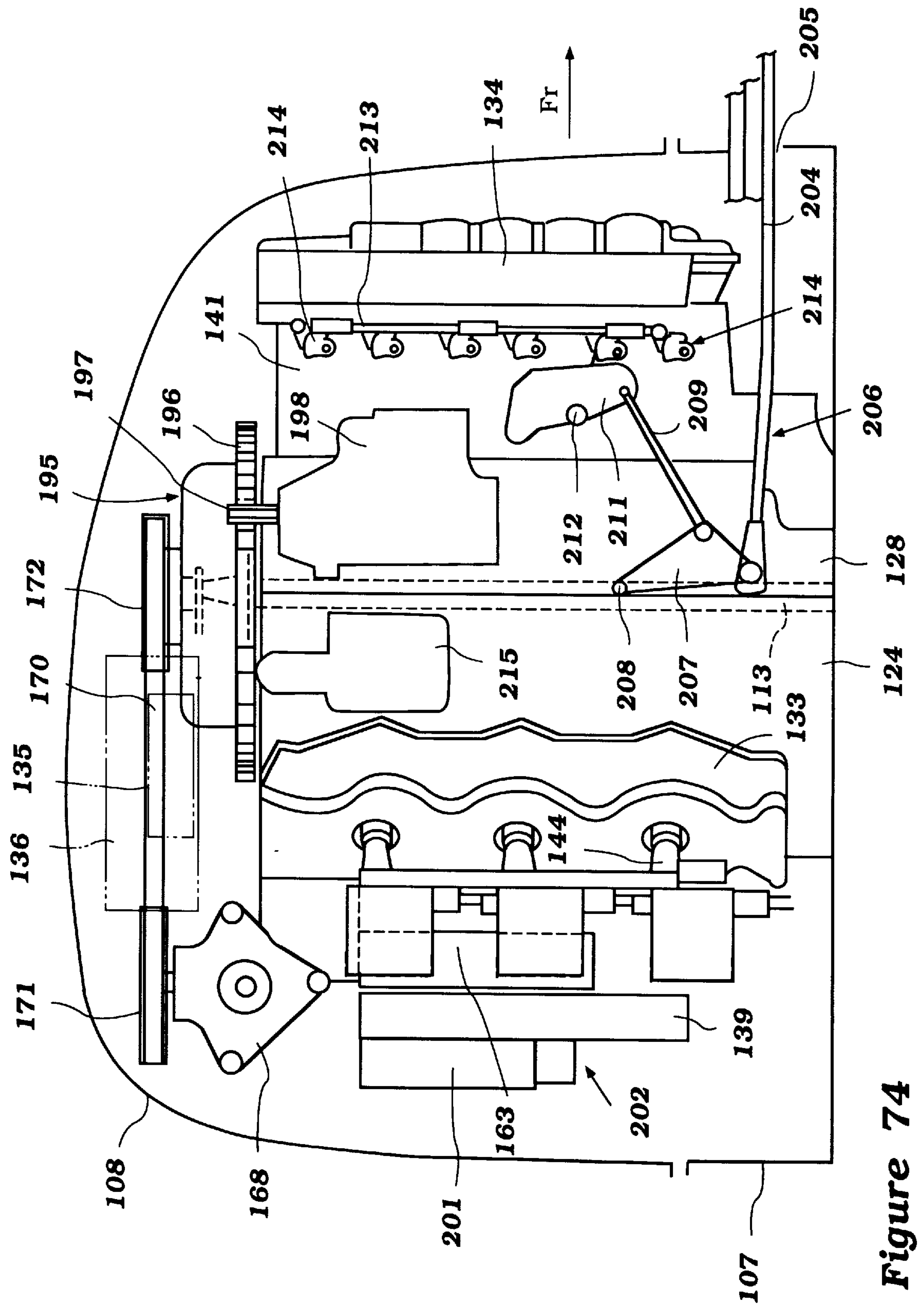
FIG. 74 is an opposite side elevational view of this twenty-fifth embodiment and is in part similar to FIGS. 3, 5, 8, 11, 14, 17, 20, 23, 26, 29, 32, 35, 38, 40, 41, 44, 47, 50, 53, 56, 59, 62, 65, 68 and 71.

Embodiment of FIGS. 72–74

This embodiment again differs from the embodiments of FIGS. 63–65, 66–68 and 69–71 in the positioning of the vapor separator 164, ECU 139, and fuel injector solenoid driver 201. In this embodiment, each of these components is mounted in the valley between the cylinder banks and in the void area K1 to the rear of the engine.

The vapor separator 163 is mounted forwardly while the ECU 139 is mounted to the rear of it with a fuel injector solenoid driver 201 positioned to the rear of that.

Summary

From the foregoing description, it should be readily apparent that the several embodiments of the invention illustrated and described all permit the use of an engine driven, high pressure fuel injection pump. This fuel injection pump is driven off the upper end of the crankshaft and is positioned at a high level in the engine compartment so that it will be isolated from the inflow of air to the engine induction system while its drive will be cooled. Various layouts for the associated components of the fuel injection system and control therefor have been disclosed each of which positions the components in a location where they can be easily serviced and will be cooled with minimum heat transfer between the engine and these various components.

Of course, the foregoing description is that of preferred embodiments of the invention. Various changes and modifications may be made without departing from the spirit and scope of the invention, as defined by the appended claims.

We claim:

1. An outboard motor comprised of a power head consisting of a multi-cylinder internal combustion engine and a surrounding protective cowling and a driveshaft housing and lower unit containing a propulsion device within said lower unit depending from said power head, said engine being mounted within said protective cowling so that its crankshaft rotates about a vertically-extending axis, a flywheel affixed contiguous to the upper end of said crankshaft, the lower end of said crankshaft being coupled to a drive shaft that depends into said driveshaft housing and lower unit for driving said propulsion device, said engine being formed with a number of combustion chambers, a plurality of fuel injectors each of which injects fuel directly into a respective one of said combustion chambers, a high pressure fuel pump contained within said protective cowling and disposed at the upper end of said engine, said high pressure fuel pump being driven by a drive on the upper end of said crankshaft above said flywheel for delivering high pressure fuel to said fuel injectors through a fuel supply system.

2. An outboard motor as set forth in claim 1, wherein the high pressure pump is disposed radially outwardly of the outer periphery of the flywheel.

3. An outboard motor as set forth in claim 2, wherein the flywheel has a ring gear affixed to its outer periphery and further including an electric starter motor mounted on the engine and engaged with the flywheel ring gear for electric starting of said engine.

4. An outboard motor as set forth in claim 3, wherein the drive for the high pressure pump is via a flexible transmitter.

5. An outboard motor as set forth in claim 4, wherein the flexible transmitter also drives a further accessory for the engine.

6. An outboard motor as set forth in claim 5, wherein the further accessory comprises an alternator.

7. An outboard motor as set forth in claim 6, wherein the alternator and electric starter motor are disposed on opposite sides of a longitudinal plane containing the rotational axis of the crankshaft.

8. An outboard motor as set forth in claim 1, wherein the engine is of the V-type and has a pair of cylinder banks each containing at least one combustion chamber and wherein the cylinder banks define a valley therebetween.

9. An outboard motor as set forth in claim 8, wherein the high pressure pump is disposed in the valley between the cylinder banks.

10. An outboard motor as set forth in claim 9, wherein the high pressure pump delivers fuel to a main fuel manifold.

11. An outboard motor as set forth in claim 10, wherein the main fuel manifold supplies fuel to a pair of fuel rails each associated with a respective one of the cylinder banks.

12. An outboard motor as set forth in claim 1, wherein the fuel supply system for the fuel injectors which includes a vapor separator, a pressure regulator and a main fuel rail associated with a plurality of the fuel injectors.

13. An outboard motor as set forth in claim 12, further including an ECU for controlling the firing of spark plugs associated with each of the combustion chambers and a solenoid driver for operating the fuel injectors, said ECU also controlling said solenoid driver.

14. An outboard motor as set forth in claim 13, wherein the engine is a crankcase compression, two-cycle, internal combustion engine.

15. An outboard motor as set forth in claim 14, further including an induction system for delivering an air charge to a crankcase chamber of the engine at a point disposed on the opposite side from the valley between the cylinder banks.

16. An outboard motor as set forth in claim 15, wherein the induction system includes a plurality of vertically spaced throttle valves and a linkage system for operating said throttle valves in synchronism.

17. An outboard motor as set forth in claim 12, wherein the main cowling member defines an air inlet opening for admitting air to the engine induction system.

18. An outboard motor as set forth in claim 17, wherein the drive for the high pressure fuel pump is disposed in a path of air flow from the protective cowling air inlet opening to the induction system for the engine and the high pressure fuel pump is out of the air flow.

19. An outboard motor as set forth in claim 18, wherein at least one of the vapor separator, pressure regulator, main fuel manifold, fuel rails, solenoid driver, ECU, alternator and starter motor is also disposed in a path of air flow from the protective cowling air inlet opening to the induction system.

20. An outboard motor as set forth in claim 19, wherein the alternator and starter motor are disposed in a path of air flow from the protective cowling air inlet opening to the induction system.

21. An outboard motor as set forth in claim 20, wherein the vapor separator is also disposed in a path of air flow from the protective cowling air inlet opening to the induction system.

22. An outboard motor as set forth in claim 20, wherein at least the ECU is also disposed in a path of air flow from the protective cowling air inlet opening to the induction system.

23. An outboard motor as set forth in claim 20, wherein the solenoid driver is also disposed in a path of air flow from the protective cowling air inlet opening to the induction system.

24. An outboard motor as set forth in claim 16, wherein the linkage system for the throttle valves is positioned on one side of the induction system and at least one of the vapor separator, pressure regulator, main fuel rail, solenoid driver, and ECU is disposed on the other side of the induction system.

25. An outboard motor as set forth in claim 24, wherein at least the vapor separator is disposed on the other side of the induction system.

26. An outboard motor as set forth in claim 24, wherein at least the solenoid driver, is disposed on the other side of the induction system.

27. An outboard motor as set forth in claim 24, wherein at least the ECU is disposed on the other side of the induction system.

28. An outboard motor as set forth in claim 24, wherein both the solenoid driver and ECU is disposed on the other side of the induction system.

29. An outboard motor as set forth in claim 18, wherein at least one of the vapor separator, pressure regulator, main fuel manifold and fuel rails is disposed in proximity to the high pressure pump.

30. An outboard motor as set forth in claim 29, wherein all of the vapor separator, pressure regulator, main fuel manifold and fuel rails are disposed in proximity to the high pressure pump.

31. An outboard motor as set forth in claim 29, wherein the pressure regulator, main fuel manifold and fuel rails are all disposed in proximity to the high pressure pump.

32. An outboard motor as set forth in claim 2, wherein the main cowling member defines an air inlet opening for admitting air to an air induction system for the engine.

33. An outboard motor as set forth in claim 32, wherein the drive for the high pressure fuel pump is disposed in a path of air flow from the protective cowling air inlet opening to the induction system for the engine and the high pressure fuel pump is out of the air flow.

34. An outboard motor as set forth in claim 33, wherein the engine is of the V-type and has a pair of cylinder banks each containing at least one combustion chamber and wherein the cylinder banks define a valley therebetween.

35. An outboard motor as set forth in claim 34, wherein the high pressure pump is disposed in the valley between the cylinder banks.

36. An outboard motor as set forth in claim 35, wherein the engine is a crankcase compression, two-cycle, internal combustion engine.

37. An outboard motor as set forth in claim 36, wherein the induction system delivers an air charge to a crankcase chamber of the engine at a point disposed on the opposite side from the valley between the cylinder banks.

* * * * *